(12) United States Patent
McCombe et al.

(10) Patent No.: US 11,995,902 B2
(45) Date of Patent: *May 28, 2024

(54) FACIAL SIGNATURE METHODS, SYSTEMS AND SOFTWARE

(71) Applicant: MINE ONE GmbH, Berlin (DE)

(72) Inventors: James A. McCombe, San Francisco, CA (US); Rolf Herken, San Francisco, CA (US); Brian W. Smith, San Francisco, CA (US)

(73) Assignee: MINE ONE GmbH, Berlin (DE)

(*) Notice: Subject to any disclaimer, the term of this patent is extended or adjusted under 35 U.S.C. 154(b) by 146 days.

This patent is subject to a terminal disclaimer.

(21) Appl. No.: 17/107,413

(22) Filed: Nov. 30, 2020

(65) Prior Publication Data

US 2021/0192188 A1 Jun. 24, 2021

Related U.S. Application Data

(63) Continuation-in-part of application No. 16/749,989, filed on Jan. 22, 2020, now Pat. No. 11,106,275, and (Continued)

(51) Int. Cl.
*G06V 20/64* (2022.01)
*G06V 10/75* (2022.01)
(Continued)

(52) U.S. Cl.
CPC ............ *G06V 20/64* (2022.01); *G06V 10/758* (2022.01); *G06V 20/647* (2022.01);
(Continued)

(58) Field of Classification Search
CPC .... G06V 40/172; G06V 10/758; G06V 20/64; G06V 20/647; G06V 40/166; G06V 40/171; G06V 40/50
See application file for complete search history.

(56) References Cited

U.S. PATENT DOCUMENTS 5,867,591 A 2/1999 Onda
5,973,732 A 10/1999 Guthrie
(Continued)

FOREIGN PATENT DOCUMENTS

EP 1418766 A2 5/2004
EP 2847738 B1 7/2017
(Continued)

OTHER PUBLICATIONS 3D human FR using point signature, Chua et al., 2000; https://ieeexplore.ieee.org/document/840640 (Year: 2000).*
(Continued)

*Primary Examiner* — Jianxun Yang
(74) *Attorney, Agent, or Firm* — Gesmer Updegrove LLP

(57) ABSTRACT

Methods, systems and computer program products ("software") enable a virtual three-dimensional visual experience (referred to herein as "V3D") in videoconferencing and other applications; the capturing, processing and displaying of images and image streams; and generation of a facial signature based on images of a given human user's or subject's face, or face and head, for accurate, reliable identification or authentication of a human user or subject, in a secure, difficult to forge manner.

18 Claims, 73 Drawing Sheets

Related U.S. Application Data a continuation of application No. 15/573,475, filed on May 29, 2018, now Pat. No. 10,853,625, said application No. 16/749,989 is a continuation of application No. 15/560,019, filed as application No. PCT/US2016/032213 on May 12, 2016, now Pat. No. 10,551,913, which is a continuation-in-part of application No. PCT/US2016/023433, filed as application No. PCT/US2016/023433 on Mar. 21, 2016.

(60) Provisional application No. 62/160,563, filed on May 12, 2015, provisional application No. 62/136,494, filed on Mar. 21, 2015.

(51) Int. Cl.
*G06V 40/16* (2022.01)
*G06V 40/50* (2022.01)

(52) U.S. Cl.
CPC .......... *G06V 40/166* (2022.01); *G06V 40/171* (2022.01); *G06V 40/172* (2022.01); *G06V 40/50* (2022.01)

(56) References Cited

U.S. PATENT DOCUMENTS

| | | | |
|---|---|---|---|
| 5,991,464 A | 11/1999 | Hsu et al. | |
| 6,297,844 B1 | 10/2001 | Schatz et al. | |
| 6,751,340 B2 | 6/2004 | Prokoski | |
| 7,372,981 B2 | 5/2008 | Lai et al. | |
| 7,689,043 B2 * | 3/2010 | Austin | G06V 40/16 382/118 |
| 8,547,374 B1 | 10/2013 | Sadjadi et al. | |
| 8,547,375 B2 | 10/2013 | Sadjadi et al. | |
| 8,903,191 B2 | 12/2014 | Nestares et al. | |
| 9,047,504 B1 * | 6/2015 | Ramaswamy | G06V 10/754 |
| 9,280,821 B1 | 3/2016 | Choe et al. | |
| 9,298,974 B1 | 3/2016 | Kuo et al. | |
| 9,332,285 B1 | 5/2016 | Grant et al. | |
| 9,819,914 B2 | 11/2017 | Kong et al. | |
| 2004/0223630 A1 | 11/2004 | Waupotitsch et al. | |
| 2004/0240711 A1 | 12/2004 | Hamza et al. | |
| 2005/0019325 A1 | 1/2005 | Carter et al. | |
| 2005/0063566 A1 | 3/2005 | Beek et al. | |
| 2005/0078866 A1 | 4/2005 | Criminisi et al. | |
| 2005/0129325 A1 | 6/2005 | Wu | |
| 2005/0185054 A1 | 8/2005 | Edwards et al. | |
| 2006/0056727 A1 | 3/2006 | Jones et al. | |
| 2006/0083421 A1 | 4/2006 | Weiguo et al. | |
| 2006/0152609 A1 | 7/2006 | Prentice et al. | |
| 2006/0193179 A1 | 8/2006 | England et al. | |
| 2006/0193509 A1 | 8/2006 | Criminisi et al. | |
| 2007/0126921 A1 | 6/2007 | Gallagher et al. | |
| 2007/0167702 A1 | 7/2007 | Hasser et al. | |
| 2007/0183653 A1 | 8/2007 | Medioni et al. | |
| 2007/0254640 A1 | 11/2007 | Bliss | |
| 2008/0077596 A1 | 3/2008 | Patton et al. | |
| 2009/0116695 A1 | 5/2009 | Anchyshkin et al. | |
| 2009/0210491 A1 | 8/2009 | Thakkar et al. | |
| 2009/0278961 A1 | 11/2009 | Mohanty et al. | |
| 2010/0094800 A1 | 4/2010 | Sharp | |
| 2010/0103249 A1 | 4/2010 | Lipton et al. | |
| 2010/0158387 A1 * | 6/2010 | Choi | G06V 40/161 382/195 |
| 2010/0165155 A1 | 7/2010 | Chang | |
| 2010/0165206 A1 | 7/2010 | Nestares et al. | |
| 2011/0018903 A1 | 1/2011 | Lapstun et al. | |
| 2011/0064299 A1 | 3/2011 | Zhang et al. | |
| 2011/0075025 A1 | 3/2011 | Cho et al. | |
| 2011/0115921 A1 | 5/2011 | Wang et al. | |
| 2011/0292227 A1 | 12/2011 | Nakazawa | |
| 2012/0045091 A1 | 2/2012 | Kaganovich | |
| 2012/0069005 A1 | 3/2012 | Seen et al. | |
| 2012/0106785 A1 | 5/2012 | Karafin et al. | |
| 2012/0121142 A1 | 5/2012 | Nagesh | |
| 2012/0209514 A1 * | 8/2012 | Chrysanthakopoulos | G06V 20/20 707/E17.089 |
| 2012/0249750 A1 | 10/2012 | Izzat et al. | |
| 2012/0262493 A1 | 10/2012 | Tsai et al. | |
| 2012/0262553 A1 | 10/2012 | Chen et al. | |
| 2012/0293608 A1 | 11/2012 | Doepke et al. | |
| 2013/0021490 A1 | 1/2013 | James et al. | |
| 2013/0070116 A1 | 3/2013 | Suzuki et al. | |
| 2013/0077880 A1 | 3/2013 | Venkataraman et al. | |
| 2013/0101160 A1 | 4/2013 | Woodfill et al. | |
| 2013/0169764 A1 | 7/2013 | Lu et al. | |
| 2013/0201301 A1 | 8/2013 | Huang et al. | |
| 2013/0215107 A1 | 8/2013 | Kimura et al. | |
| 2013/0258067 A1 | 10/2013 | Zhang et al. | |
| 2013/0278633 A1 | 10/2013 | Ahn et al. | |
| 2013/0293669 A1 | 11/2013 | Lucey | |
| 2013/0321564 A1 | 12/2013 | Smith et al. | |
| 2014/0038708 A1 | 2/2014 | Davison et al. | |
| 2014/0050372 A1 | 2/2014 | Qi et al. | |
| 2014/0071313 A1 | 3/2014 | Hiasa | |
| 2014/0200953 A1 | 7/2014 | Mun | |
| 2014/0219551 A1 | 8/2014 | Tang | |
| 2014/0226900 A1 | 8/2014 | Saban et al. | |
| 2014/0240587 A1 | 8/2014 | Cote et al. | |
| 2014/0267243 A1 | 9/2014 | Venkataraman et al. | |
| 2014/0270480 A1 | 9/2014 | Boardman et al. | |
| 2014/0337949 A1 | 11/2014 | Hoyos | |
| 2014/0341290 A1 | 11/2014 | Merkle et al. | |
| 2014/0375775 A1 | 12/2014 | Yeatman, Jr. et al. | |
| 2015/0049169 A1 * | 2/2015 | Krig | H04N 13/211 348/46 |
| 2015/0055821 A1 | 2/2015 | Fotland | |
| 2015/0066764 A1 | 3/2015 | Crowell et al. | |
| 2015/0098645 A1 | 4/2015 | Leung | |
| 2015/0110349 A1 * | 4/2015 | Feng | G06V 40/162 382/103 |
| 2015/0116317 A1 * | 4/2015 | Chen | H04N 13/111 345/419 |
| 2015/0229901 A1 | 8/2015 | Doba et al. | |
| 2015/0288856 A1 | 10/2015 | Vanam et al. | |
| 2015/0302592 A1 | 10/2015 | Bruls et al. | |
| 2016/0005154 A1 | 1/2016 | Meyers et al. | |
| 2016/0037059 A1 | 2/2016 | Lim et al. | |
| 2016/0037060 A1 | 2/2016 | Lim et al. | |
| 2016/0065795 A1 | 3/2016 | Baqai et al. | |
| 2016/0188995 A1 | 6/2016 | Somanath et al. | |
| 2016/0189387 A1 | 6/2016 | Kannan et al. | |
| 2016/0203579 A1 | 7/2016 | Griffin et al. | |
| 2016/0219267 A1 | 7/2016 | Chu et al. | |
| 2016/0337557 A1 | 11/2016 | Kong et al. | |
| 2016/0337628 A1 | 11/2016 | Kong et al. | |
| 2016/0342832 A1 | 11/2016 | Bud et al. | |
| 2017/0085733 A1 | 3/2017 | Ilic et al. | |
| 2018/0189550 A1 | 7/2018 | McCombe et al. | |
| 2018/0307310 A1 | 10/2018 | McCombe et al. | |

FOREIGN PATENT DOCUMENTS

| | | |
|---|---|---|
| EP | 1235439 A2 | 8/2022 |
| GB | 2449738 A | 12/2008 |
| WO | 0054181 A1 | 9/2000 |
| WO | 200054181 A1 | 9/2000 |
| WO | 2016154123 A2 | 9/2016 |
| WO | 2016183380 A1 | 11/2016 |
| WO | 2018164852 A1 | 9/2018 |
| WO | 2019067134 A1 | 4/2019 |
| WO | 2019109061 A1 | 6/2019 |
| WO | 2019113215 A1 | 6/2019 |

OTHER PUBLICATIONS

Avci et al., "Efficient disparity vector prediction schemes with modified p. frame for 2D camera arrays", J. Vis. Commun. Image R., vol. 23, No. 2, 2012, pp. 287-292, 7 pages.

(56) References Cited

OTHER PUBLICATIONS

Bhat et al., "Stereo in the Presence of Specular Reflection", Proceedings of Fifth International Conf. On Computer Vision, 1995, Cambridge, MA, pp. 1086-1092.
Carranza et al., Free-Viewpoint Video of Human Actors, ACM Transactions on Graphics, vol. 22, No. 3, pp. 569-577, Jul. 2003.
Choi et al., "Implementation of Real-Time Post-Processing for High-Quality Stereo Vision," ETRI Journal, vol. 37, No. 4, Aug. 2015, pp. 752-765, 14 pages.
Chu et al., OpenCV and TYZX: Video Surveillance for Tracking, Aug. 2008, Sandia Report SAND2008-5776.
Gordon et al., Person and Gesture Tracking with Smart Stereo Cameras, Proc. SPIE, vol. 6805, Jan. 2008.
Hannah, Computer Matching of Areas in Stereo Images, Jul. 1974 Thesis, Stanford University Computer Science Department Report STAN-CS-74-438.
Harrison et al., Pseudo-3D Video Conferencing with a Generic Webcam, 2008 IEEE 25 Int'l Symposium on Multimedia, pp. 236-241.
Hoppe et al., "Online Feedback for Structure-from-Motion Image Acquisition", Proceedings of the British Machine Vision Conference, Jan. 1, 2012, pp. 70.1-70.12.
Husken, "Strategies and Benefits of Fusion of 2D and 3D Face Recognition", Proc. Of 2005 IEEE Comput. Society Conf. on Comput. Vis., Jun. 20-25, 2005, vol. 3, pp. 174 et seq.
International Search Report and Written Opinion of the International Searching Authority (the United States Patent and Trademark Office) issued in related international application No. PCT/US2016/032213 on Sep. 27, 2016, 16 pages.
International Search Report and Written Opinion of the International Searching Authority (the United States Patent and Trademark Office) issued in related international application No. PCT/US2016/023433 on Sep. 16, 2016, 26 pages.
International Search Report and Written Opinion of the International Searching Authority (the United States Patent and Trademark Office) issued in related international application No. PCT/US2018/019243 on Jul. 31, 2018, 20 pages.
International Search Report and Written Opinion of the International Searching Authority (the United States Patent and Trademark Office) issued in related international application No. PCT/US2018/063699 on Mar. 27, 2019, 11 pages.
International Search Report and Written Opinion of the International Searching Authority (the United States Patent and Trademark Office) issued in related international application No. PCT/US2018/048197 on Feb. 14, 2019, 13 pages.
International Search Report and Written Opinion of the International Searching Authority (the United States Patent and Trademark Office) issued in related international application No. PCT/US2018/063531 on Feb. 26, 2019, 10 pages.
International Search Report and Written Opinion of the International Searching Authority (the United States Patent and Trademark Office) issued in related international application No. PCT/US2018/064077 on Feb. 26, 2019, 10 pages.
Luo et al., Hierarchical Genetic Disparity Estimation Algorithm for Multiview Image Synthesis, 2000 IEEE Int. Conf. on Image Processing, vol. 2, pp. 768-771.
MacCormick, J., "How Does the Kinect Work?", http://users.dickinson.edu/~jmac/selected-talk/kinect.pdf, Dec. 2011.
Melexis NV, "MLX75023 Time-of-Flight Sensor Array, Product Datasheet," http://www.melexis.com/General/General/MLX75023-832.aspx, copyright 2016.
Nanni et al., Effective and precise face detection based on color and depth data, Applied Computing and Informatics, vol. 10, Issues 1-2, Jan. 2014, pp. 1-13.
OpenCV (Open Source Compuer Vision library of programming functions), released Aug. 29, 2018; https://docs.opencv.org/3.4.3/.
Puetter et al., "Digital Imnage Reconstruction," Annual Review of Astron. Astrophysics, Jun. 16, 2005.
Sakamoto et al., "Multiple Baseline Stereo for Precise Human Face Acquisition", in "Serious Games", 1997, Springer International, vol. 1206, pp. 419-428.
Shin et al., "Virtual Viewpoint Disparity Estimation and Convergence Check for Real-Time View Synthesis", Jan. 1, 2012, Big Data Analytics in the Social and Ubiquitous Context: 5th International Workshop on Modeling Social Media, MSM 2014, 5th International Workshop on Minding Ubiquitous and Social Environments, Muse 2014 and First Inaternational Workshop in Machine LE, 11 pages.
Supplementary European Search Report issued by the European Patent Office in related European Patent Application No. 16793565 on Apr. 30, 2019, 5 pages.
Supplementary European Search Report issued by the European Patent Office in related European Patent Application No. 18764933 on Dec. 1, 2020, 4 pages.
Supplementary European Search Report issued by the European Patent Office in related European Patent Application No. 18884507 on Jul. 23, 2021, 2 pages.
Supplementary European Search Report issued by the European Patent Office in related European Patent Application No. 18862646 on Apr. 12, 2021, 3 pages.
Supplementary European Search Report issued in related European Patent Application No. EP16769502 on Oct. 30, 2018, 4 pages.
Supplementary European Search Report issued in related European Patent Application No. EP16769502 on Mar. 7, 2019, 6 pages.
Supplementary European Search Report issued in related European Patent Application No. EP18883932 on Jul. 22, 2021, 3 pages.
Supplementary European Search Report issued in related European Patent Application No. EP18885518 on Jul. 6, 2021, 1 page.
Supplementary Partial European Search Report issued by the European Patent Office in related European Patent Application No. 16793565 on Jan. 9, 2019, 5 pages.
Supplementary Partial European Search Report issued by the European Patent Office in related European Patent Application No. 18764933 on Dec. 1, 2020, 4 pages.
Teng et al., "Liveness Assurance in Face Authentication", In: "Encyclopedia of Biometrics", Jan. 1, 2009, pp. 908-916, 11 pages.
Time-of-flight camera, retrieved from the internet: http://en.wikipedia.org/wiki/Time-of-flight camera, on Nov. 17, 2023, 12 pages.
Tsung et al., "Cache-based integer motion/disparity estimation for quad-HD H.264/AVC and HD multiview viedeo coding", Acoustics, Speech and Signal Processing 2009, ICASSP 2009, IEEE International Conference On, IEEE, Piscataway, NJ, USA, Apr. 19, 2009, pp. 2013-2016, 4 pages.
U.S. Appl. No. 62/493,920 filed with the United States Patent and Trademark Office on Dec. 2, 2017, 39 pages.
U.S. Appl. No. 62/594,006 filed with the United States Patent and Trademark Office on Dec. 3, 2017, 42 pages.
U.S. Appl. No. 62/595,055 filed with the United States Patent and Trademark Office on Dec. 5, 2017, 41 pages.
Viola et al., The Viola Jones Face Detector, 2001, slides published by University of British Columbia, Dept. of Computer Science, https://www.cs.ubc.ca/lowe/425/slides/13-V.
Wagner et al., "Liveness Assurance in Face Authentication" in "Encyclopedia of Biometrics", 2009, Springer US, Boston, MA, pp. 908-916.
wikepedia.org., article re: Apple Inc. "Face ID", last edited Oct. 28, 2018; https://en.wikipedia.org/wiki/Face_ID.
wikipedia.org, article re: "Time-Of-Flight Camera," http://en.wikipedia.org/wiki/Time-of-flight camera, last edited Jun. 21, 2019.
wikipedia.org, article re: OpenCV, last edited Aug. 29, 2018; https://en.wikipedia.org/wiki/OpenCV.
Wu et al., Fast Rotation Invariant Multi-View Face Detection, Proceedings of Sixth IEEE International Conference on Automatic Face, 2004, vol. 1, pp. 79-84.
Zabih et al., Non-parametric Local Transforms for Computing Visual Correspondence, Proc. European Conf. on Computer Vision, May 1994, pp. 151-158.

\* cited by examiner

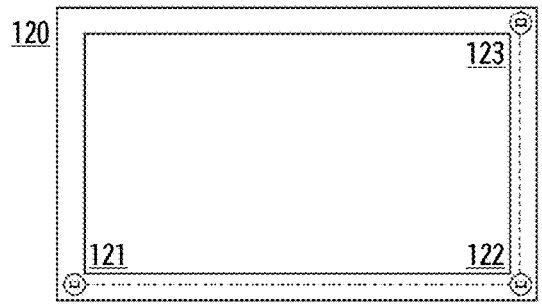
FIG. 12A
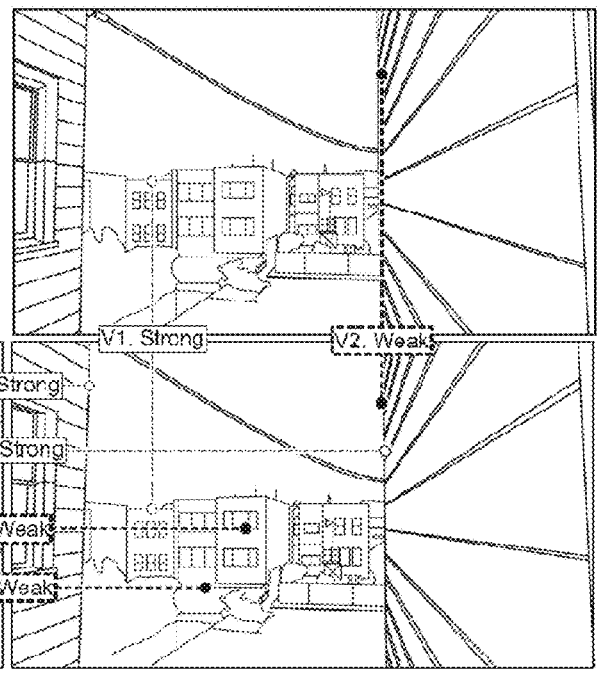
FIG. 12D
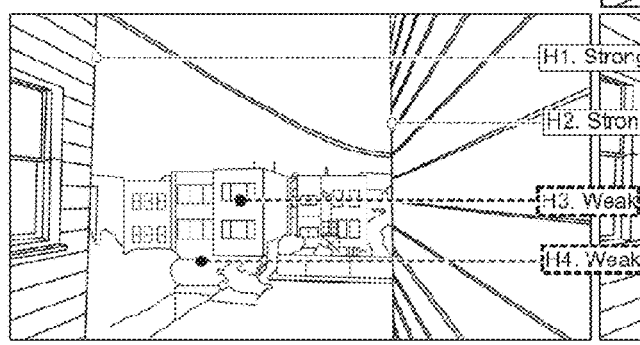
FIG. 12B  FIG. 12C
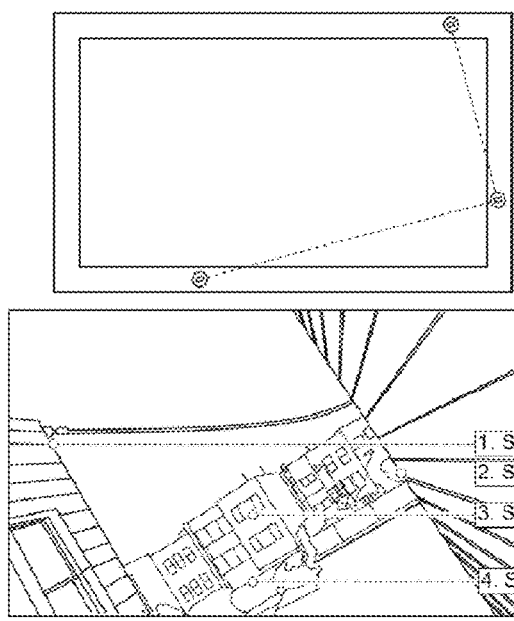
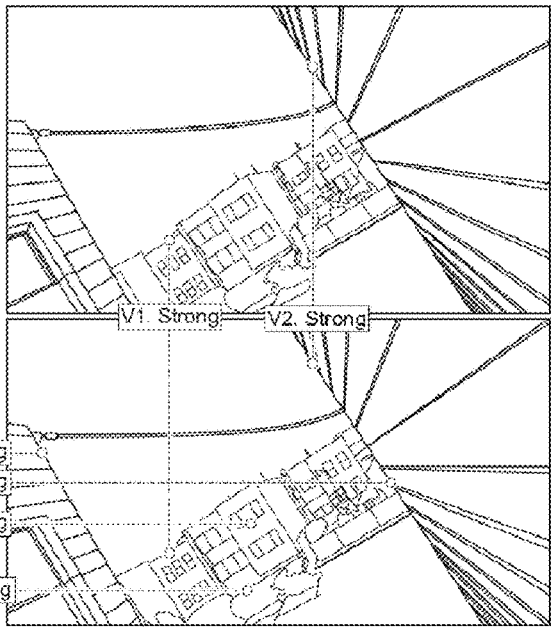
FIG. 13

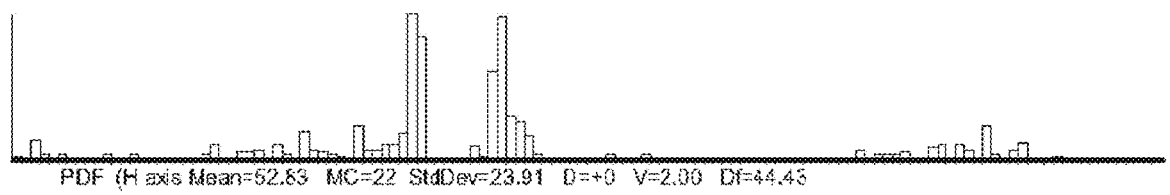
*FIG. 25*
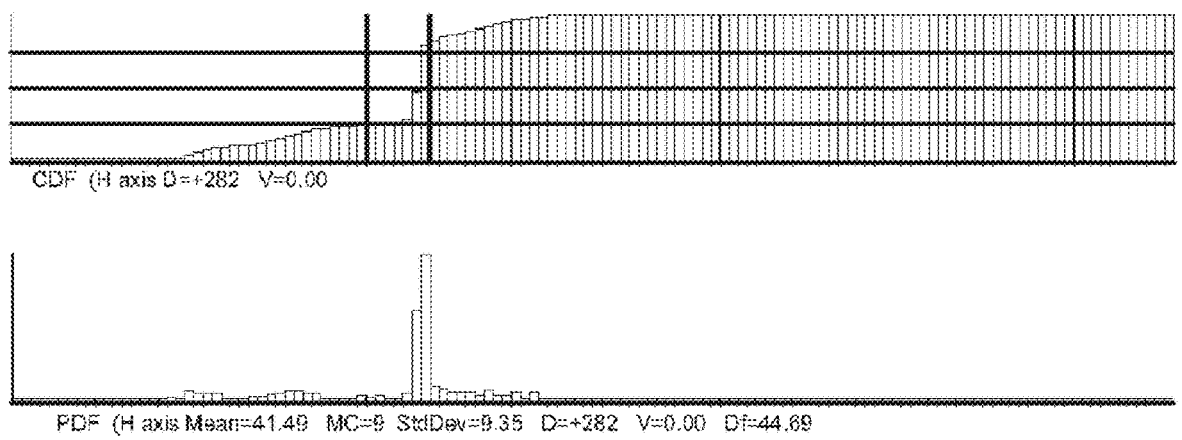
*FIG. 26*
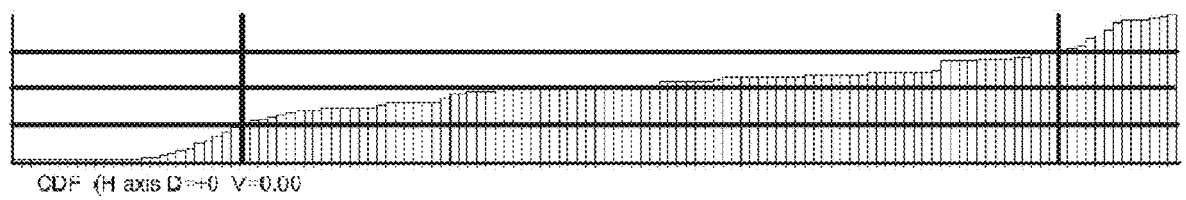
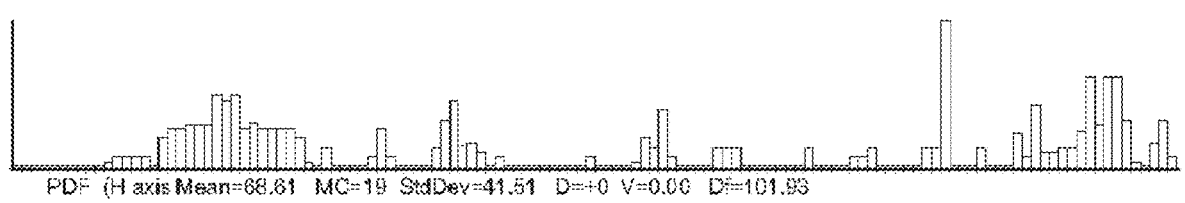
*FIG. 27*

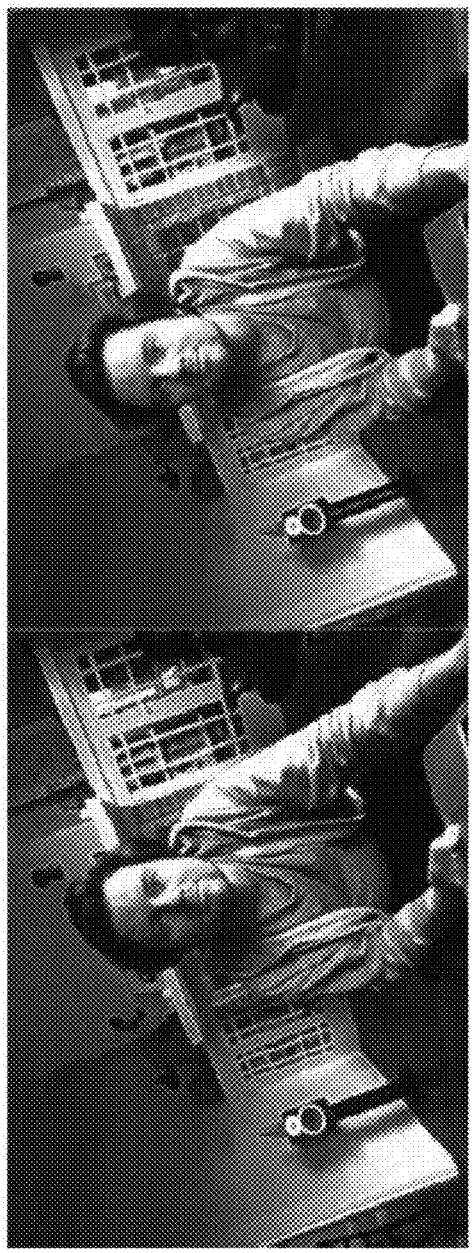
FIG. 29A
FIG. 29B
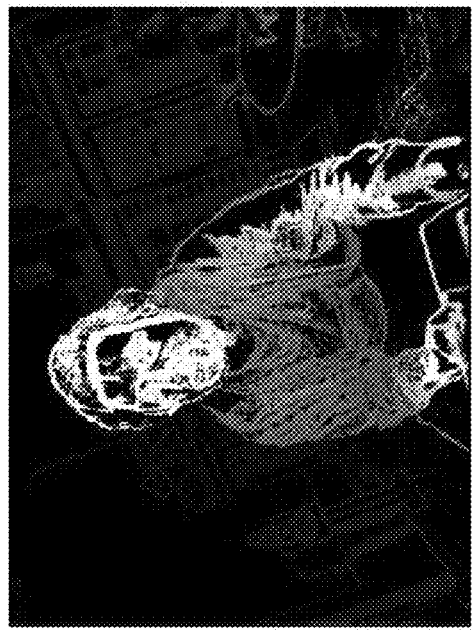
FIG. 29D
FIG. 29C

FIG. 30A — Level 0
FIG. 30B — Level 1
FIG. 30C — Level 2
FIG. 30D — Level 3
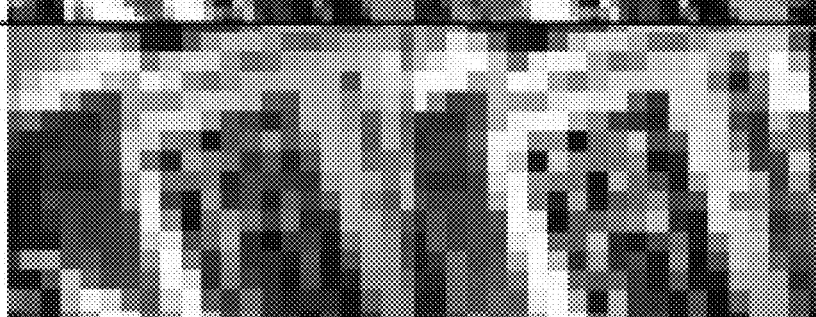
FIG. 30E — Level n

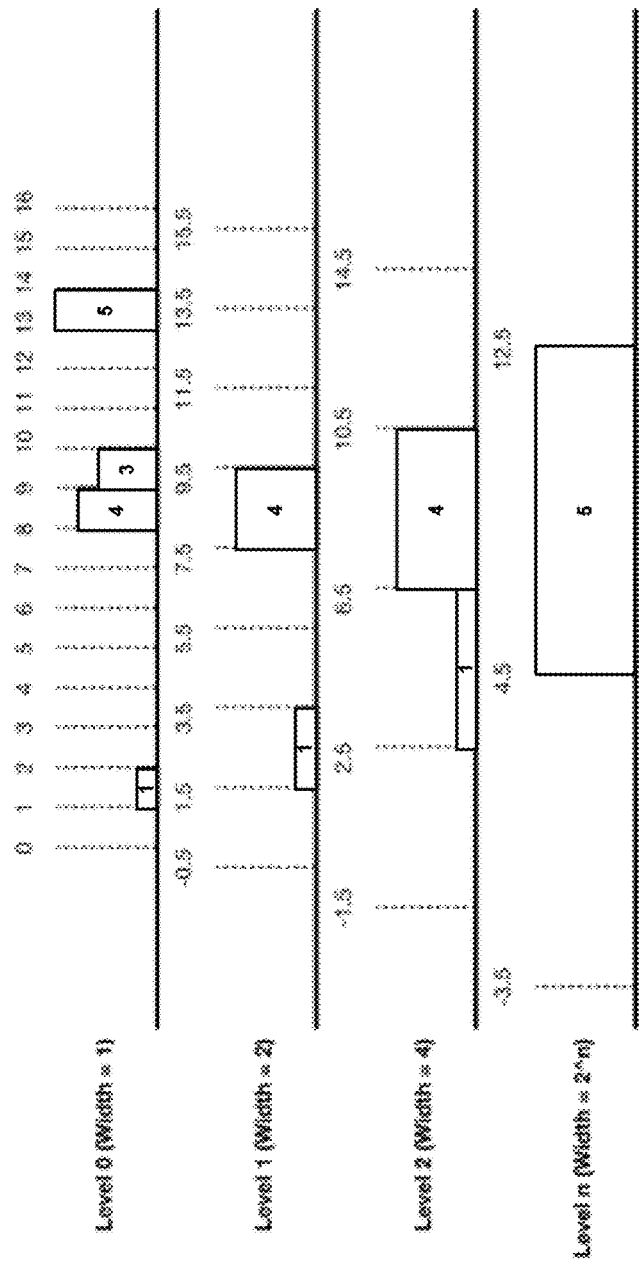

580

581: AT PHOTOGRAPH SETUP TIME, CAPTURE IMAGES OF SCENE TO BE PHOTOGRAPHED (USE CAMERA PROVIDED ON A SIDE OF USER'S HANDHELD DEVICE OPPOSITE DISPLAY SCREEN SIDE OF USER'S DEVICE)

582: GENERATE TRACKING INFORMATION (BY ESTIMATING LOCATION OF USER'S HEAD OR EYES RELATIVE TO HANDHELD DEVICE DURING SETUP TIME) (WHEREIN ESTIMATING A LOCATION OF THE USER'S HEAD OR EYES RELATIVE TO HANDHELD DEVICE USES AT LEAST ONE CAMERA ON DISPLAY SIDE OF HANDHELD DEVICE, HAVING A VIEW OF USER'S HEAD OR EYES DURING PHOTOGRAPH SETUP TIME)

583: GENERATE DATA REPRESENTATION REPRESENTATIVE OF CAPTURED IMAGES

584: RECONSTRUCT SYNTHETIC VIEW OF SCENE, BASED ON GENERATED DATA REPRESENTATION AND GENERATED TRACKING INFORMATION (SYNTHETIC VIEW RECONSTRUCTED SUCH THAT SCALE AND PERSPECTIVE OF SYNTHETIC VIEW HAVE SELECTED CORRESPONDENCE TO USER'S VIEWPOINT RELATIVE TO HANDHELD DEVICE AND SCENE)

585: DISPLAY TO USER THE SYNTHETIC VIEW OF THE SCENE (ON DISPLAY SCREEN DURING SETUP TIME) (THEREBY ENABLING USER, WHILE SETTING UP PHOTOGRAPH, TO FRAME SCENE TO BE PHOTOGRAPHED, WITH SELECTED SCALE AND PERSPECTIVE WITHIN DISPLAY FRAME, WITH REAL-TIME VISUAL FEEDBACK) (WHEREIN USER CAN CONTROL SCALE AND PERSPECTIVE OF SYNTHETIC VIEW BY CHANGING POSITION OF HANDHELD DEVICE RELATIVE TO POSITION OF USER'S HEAD)

611: CAPTURE IMAGES OF SCENE AROUND AT LEAST A PORTION OF VEHICLE (USING AT LEAST ONE CAMERA HAVING A VIEW OF SCENE)

612: (EXECUTE IMAGE RECTIFICATION)

613: EXECUTE FEATURE CORRESPONDENCE FUNCTION (BY DETECTING COMMON FEATURES BETWEEN CORRESPONDING IMAGES CAPTURED BY THE AT LEAST ONE CAMERA AND MEASURING A RELATIVE DISTANCE IN IMAGE SPACE BETWEEN COMMON FEATURES, TO GENERATE DISPARITY VALUES)

(DETECT COMMON FEATURES BETWEEN IMAGES CAPTURED BY SINGLE CAMERA OVER TIME)

(DETECT COMMON FEATURES BETWEEN CORRESPONDING IMAGES CAPTURED BY TWO OR MORE CAMERAS)

614: CALCULATE CORRESPONDING DEPTH INFORMATION BASED ON DISPARITY VALUES (OR OBTAIN DEPTH INFORMATION USING IR TOF CAMERA)

615: GENERATE FROM THE IMAGES AND CORRESPONDING DEPTH INFORMATION AN IMAGE DATA STREAM FOR USE BY THE VEHICLE CONTROL SYSTEM

| 621: | IMAGE CAPTURE |
| 622: | (OF OTHER USER) |
| 623: | (OF OTHER USER AND SCENE SURROUNDING OTHER USER) |
| 624: | (OF REMOTE SCENE) |
| 625: | (USE SINGLE CAMERA (AND DETECT COMMON FEATURES BETWEEN IMAGES CAPTURED OVER TIME)) |
| 626: | (USE AT LEAST ONE COLOR CAMERA) |
| 627: | (USE AT LEAST ONE INFRARED STRUCTURED LIGHT EMITTER) |
| 628: | (USE AT LEAST ONE CAMERA WHICH IS AN INFRA-RED TIME-OF-FLIGHT CAMERA THAT DIRECTLY PROVIDES DEPTH INFORMATION) |
| 629: | (USE AT LEAST TWO CAMERAS (AND DETECT COMMON FEATURES BETWEEN CORRESPONDING IMAGES CAPTURED BY RESPECTIVE CAMERAS)) |
| 6210: | (CAMERA[S] FOR CAPTURING IMAGES OF SECOND USER LOCATED AT OR NEAR PERIPHERY OR EDGES OF DISPLAY DEVICE USED BY SECOND USER, DISPLAY DEVICE USED BY SECOND USER HAVING DISPLAY SCREEN VIEWABLE BY SECOND USER AND HAVING A GEOMETRIC CENTER; SYNTHETIC VIEW OF SECOND USER CORRESPONDS TO SELECTED VIRTUAL CAMERA LOCATION, SELECTED VIRTUAL CAMERA LOCATION CORRESPONDING TO POINT AT OR PROXIMATE GEOMETRIC CENTER) |
| 6211: | (USING VIEW VECTOR ROTATED CAMERA CONFIGURATION: LOCATIONS OF FIRST AND SECOND CAMERAS DEFINE LINE; ROTATE LINE DEFINED BY FIRST AND SECOND CAMERA LOCATIONS BY SELECTED AMOUNT FROM SELECTED HORIZONTAL OR VERTICAL AXIS TO INCREASE NUMBER OF VALID FEATURE CORRESPONDENCES IDENTIFIED IN TYPICAL REAL-WORLD SETTINGS BY FEATURE CORRESPONDENCE FUNCTION) (FIRST AND SECOND CAMERAS POSITIONED RELATIVE TO EACH OTHER ALONG EPIPOLAR LINES) |
| 6212: | (SUBSEQUENT TO CAPTURING OF IMAGES, ROTATE DISPARITY VALUES BACK TO SELECTED HORIZONTAL OR VERTICAL ORIENTATION ALONG WITH CAPTURED IMAGES) |
| 6213: | (SUBSEQUENT TO RECONSTRUCTING OF SYNTHETIC VIEW, ROTATE SYNTHETIC VIEW BACK TO SELECTED HORIZONTAL OR VERTICAL ORIENTATION) |
| 6214: | (CAPTURE USING EXPOSURE CYCLING) |
| 6215: | (USE AT LEAST THREE CAMERAS ARRANGED IN SUBSTANTIALLY L-SHAPED CONFIGURATION, SUCH THAT PAIR OF CAMERAS IS PRESENTED ALONG FIRST AXIS AND SECOND PAIR OF CAMERAS IS PRESENTED ALONG SECOND AXIS SUBSTANTIALLY PERPENDICULAR TO FIRST AXIS) |

631: (DYNAMICALLY ADJUST EXPOSURE OF CAMERA(S) ON FRAME-BY-FRAME BASIS TO IMPROVE DISPARITY ESTIMATION IN REGIONS OUTSIDE EXPOSED REGION: TAKE SERIES OF EXPOSURES, INCLUDING EXPOSURES LIGHTER THAN AND EXPOSURES DARKER THAN A VISIBILITY-OPTIMAL EXPOSURE; CALCULATE DISPARITY VALUES FOR EACH EXPOSURE; AND INTEGRATE DISPARITY VALUES INTO AN OVERALL DISPARITY SOLUTION OVER TIME, TO IMPROVE DISPARITY ESTIMATION)

632: (OVERALL DISPARITY SOLUTION INCLUDES A DISPARITY HISTOGRAM INTO WHICH DISPARITY VALUES ARE INTEGRATED, THE DISPARITY HISTOGRAM BEING CONVERGED OVER TIME, SO AS TO IMPROVE DISPARITY ESTIMATION)

633: (ANALYZE QUALITY OF OVERALL DISPARITY SOLUTION ON RESPECTIVE DARK, MID-RANGE AND LIGHT PIXELS TO GENERATE VARIANCE INFORMATION USED TO CONTROL EXPOSURE SETTINGS OF THE CAMERA(S), THEREBY TO FORM A CLOSED LOOP BETWEEN QUALITY OF THE DISPARITY ESTIMATE AND SET OF EXPOSURES REQUESTED FROM CAMERA(S))

634: (OVERALL DISPARITY SOLUTION INCLUDES DISPARITY HISTOGRAM: ANALYZE VARIANCE OF DISPARITY HISTOGRAMS ON RESPECTIVE DARK, MID-RANGE AND LIGHT PIXELS TO GENERATE VARIANCE INFORMATION USED TO CONTROL EXPOSURE SETTINGS OF CAMERA(S), THEREBY TO FORM A CLOSED LOOP BETWEEN QUALITY OF DISPARITY ESTIMATE AND SET OF EXPOSURES REQUESTED FROM CAMERA(S))

641: IMAGE RECTIFICATION

642: (TO COMPENSATE FOR OPTICAL DISTORTION OF EACH CAMERA AND RELATIVE MISALIGNMENT OF THE CAMERAS)

643: (EXECUTING IMAGE RECTIFICATION INCLUDES APPLYING 2D IMAGE SPACE TRANSFORM)

644: (APPLYING 2D IMAGE SPACE TRANSFORM INCLUDES USING GPGPU PROCESSOR RUNNING SHADER PROGRAM)

- 651: (DETECT COMMON FEATURES BETWEEN CORRESPONDING IMAGES CAPTURED BY THE RESPECTIVE CAMERAS)

- 652: (DETECT COMMON FEATURES BETWEEN IMAGES CAPTURED BY SINGLE CAMERA OVER TIME; MEASURE RELATIVE DISTANCE IN IMAGE SPACE BETWEEN COMMON FEATURES, TO GENERATE DISPARITY VALUES)

- 653: (EVALUATE AND COMBINE VERTICAL- AND HORIZONTAL-AXIS CORRESPONDENCE INFORMATION)

- 654: (APPLY, TO IMAGE PIXELS CONTAINING DISPARITY SOLUTION, COORDINATE TRANSFORMATION, TO UNIFIED COORDINATE SYSTEM (UN-RECTIFIED COORDINATE SYSTEM OF THE CAPTURED IMAGES))

- 655: (USE DISPARITY HISTOGRAM-BASED METHOD OF INTEGRATING DATA AND DETERMINING CORRESPONDENCE: CONSTRUCTING DISPARITY HISTOGRAM INDICATING RELATIVE PROBABILITY OF GIVEN DISPARITY VALUE BEING CORRECT FOR GIVEN PIXEL)

- 656: (DISPARITY HISTOGRAM FUNCTIONS AS PROBABILITY DENSITY FUNCTION (PDF) OF DISPARITY FOR GIVEN PIXEL, IN WHICH HIGHER VALUES INDICATE HIGHER PROBABILITY OF CORRESPONDING DISPARITY RANGE BEING VALID FOR GIVEN PIXEL)

- 657: (ONE AXIS OF DISPARITY HISTOGRAM INDICATES GIVEN DISPARITY RANGE; SECOND AXIS OF HISTOGRAM INDICATES NUMBER OF PIXELS IN KERNEL SURROUNDING CENTRAL PIXEL IN QUESTION THAT ARE VOTING FOR GIVEN DISPARITY RANGE)

- 658: (VOTES INDICATED BY DISPARITY HISTOGRAM INITIALLY GENERATED UTILIZING SUM OF SQUARE DIFFERENCES [SSD] METHOD: EXECUTING SSD METHOD WITH RELATIVELY SMALL KERNEL TO PRODUCE FAST DENSE DISPARITY MAP IN WHICH EACH PIXEL HAS SELECTED DISPARITY THAT REPRESENTS LOWEST ERROR; THEN, PROCESSING PLURALITY OF PIXELS TO ACCUMULATE INTO DISPARITY HISTOGRAM A TALLY OF NUMBER OF VOTES FOR GIVEN DISPARITY IN RELATIVELY LARGER KERNEL SURROUNDING PIXEL IN QUESTION)

- 659: (TRANSFORMING DISPARITY HISTOGRAM INTO CUMULATIVE DISTRIBUTION FUNCTION (CDF) FROM WHICH WIDTH OF CORRESPONDING INTERQUARTILE RANGE CAN BE DETERMINED, TO ESTABLISH CONFIDENCE LEVEL IN CORRESPONDING DISPARITY SOLUTION)

CONT'D FROM FIG. 65A

650

6510: (MAINTAINING COUNT OF NUMBER OF STATISTICALLY SIGNIFICANT MODES IN HISTOGRAM, THEREBY TO INDICATE MODALITY)

6511: (USE MODALITY AS INPUT TO RECONSTRUCTION, TO CONTROL APPLICATION OF STRETCH VS. SLIDE RECONSTRUCTION METHOD)

6512: (MAINTAIN DISPARITY HISTOGRAM OVER SELECTED TIME INTERVAL; ACCUMULATE SAMPLES INTO HISTOGRAM, TO COMPENSATE FOR CAMERA NOISE OR OTHER SOURCES OF MOTION OR ERROR;

6513: (GENERATE FAST DISPARITY ESTIMATES FOR MULTIPLE INDEPENDENT AXES; THEN COMBINE CORRESPONDING, RESPECTIVE DISPARITY HISTOGRAMS TO PRODUCE STATISTICALLY MORE ROBUST DISPARITY SOLUTION)

6514: (EVALUATE INTERQUARTILE (IQ) RANGE OF CDF OF GIVEN DISPARITY HISTOGRAM TO PRODUCE IQ RESULT; IF IQ RESULT IS INDICATIVE OF AREA OF POOR SAMPLING SIGNAL TO NOISE RATIO, DUE TO CAMERA OVER- OR UNDEREXPOSURE, THEN CONTROL CAMERA EXPOSURE BASED ON IQ RESULT TO IMPROVE POORLY SAMPLED AREA OF GIVEN DISPARITY HISTOGRAM)

6515: (TEST FOR ONLY A SMALL SET OF DISPARITY VALUES USING SMALL-KERNEL SSD METHOD TO GENERATE INITIAL RESULTS; POPULATE CORRESPONDING DISPARITY HISTOGRAM WITH INITIAL RESULTS; THEN USE HISTOGRAM VOTES TO DRIVE FURTHER SSD TESTING WITHIN GIVEN RANGE TO IMPROVE DISPARITY RESOLUTION OVER TIME)

6516: (EXTRACT SUB-PIXEL DISPARITY INFORMATION FROM DISPARITY HISTOGRAM: WHERE HISTOGRAM INDICATES A MAXIMUM-VOTE DISPARITY RANGE AND AN ADJACENT, RUNNER-UP DISPARITY RANGE, CALCULATE A WEIGHTED AVERAGE DISPARITY VALUE BASED ON RATIO BETWEEN NUMBER OF VOTES FOR EACH OF THE ADJACENT DISPARITY RANGES)

*CONT'D FROM FIG. 65B*

650

6517: (FEATURE CORRESPONDENCE FUNCTION INCLUDES WEIGHTING TOWARD A CENTER PIXEL IN A SUM OF SQUARED DIFFERENCES (SSD) APPROACH: APPLY HIGHER WEIGHT TO THE CENTER PIXEL FOR WHICH A DISPARITY SOLUTION IS SOUGHT, AND A LESSER WEIGHT OUTSIDE THE CENTER PIXEL, THE LESSER WEIGHT BEING PROPORTIONAL TO DISTANCE OF GIVEN KERNEL SAMPLE FROM THE CENTER)

6518: (FEATURE CORRESPONDENCE FUNCTION INCLUDES OPTIMIZING GENERATION OF DISPARITY VALUES ON GPGPU COMPUTING STRUCTURES)

6519: (REFINE CORRESPONDENCE INFORMATION OVER TIME)

6520: (RETAIN A DISPARITY SOLUTION OVER A TIME INTERVAL, AND CONTINUE TO INTEGRATE DISPARITY SOLUTION VALUES FOR EACH IMAGE FRAME OVER THE TIME INTERVAL, TO CONVERGE ON IMPROVED DISPARITY SOLUTION BY SAMPLING OVER TIME)

6521: (FILL UNKNOWNS IN A CORRESPONDENCE INFORMATION SET WITH HISTORICAL DATA OBTAINED FROM PREVIOUSLY CAPTURED IMAGES: IF A GIVEN IMAGE FEATURE IS DETECTED IN AN IMAGE CAPTURED BY ONE CAMERA, AND NO CORRESPONDING IMAGE FEATURE IS FOUND IN A CORRESPONDING IMAGE CAPTURED BY ANOTHER CAMERA, THEN UTILIZE DATA FOR A PIXEL CORRESPONDING TO THE GIVEN IMAGE FEATURE, FROM A CORRESPONDING, PREVIOUSLY CAPTURED IMAGE)

661: (GENERATE DATA STRUCTURE REPRESENTING 2D COORDINATES OF CONTROL POINT IN IMAGE SPACE, AND CONTAINING A DISPARITY VALUE TREATED AS A PIXEL VELOCITY IN SCREEN SPACE WITH RESPECT TO A GIVEN MOVEMENT OF A GIVEN VIEW VECTOR; UTILIZE THE DISPARITY VALUE IN COMBINATION WITH MOVEMENT VECTOR TO SLIDE A PIXEL IN A GIVEN SOURCE IMAGE IN SELECTED DIRECTIONS, IN 2D, TO ENABLE A RECONSTRUCTION OF 3D IMAGE MOVEMENT)

662: (EACH CAMERA GENERATES A RESPECTIVE CAMERA STREAM; AND THE DATA STRUCTURE CONTAINS A SAMPLE BUFFER INDEX, STORED IN ASSOCIATION WITH CONTROL POINT COORDINATES, THAT INDICATES WHICH CAMERA STREAM TO SAMPLE IN ASSOCIATION WITH GIVEN CONTROL POINT)

663: (DETERMINE WHETHER A GIVEN PIXEL SHOULD BE ASSIGNED A CONTROL POINT)

664: (ASSIGN CONTROL POINTS ALONG IMAGE EDGES: EXECUTE COMPUTATIONS ENABLING IDENTIFICATION OF IMAGE EDGES)

665: (FLAG GIVEN IMAGE FEATURE WITH REFERENCE COUNT INDICATING HOW MANY SAMPLES REFERENCE THE GIVEN IMAGE FEATURE, TO DIFFERENTIATE A UNIQUELY REFERENCED IMAGE FEATURE, AND A SAMPLE CORRESPONDING TO THE UNIQUELY REFERENCED IMAGE FEATURE, FROM REPEATEDLY REFERENCED IMAGE FEATURES; AND UTILIZE REFERENCE COUNT, EXTRACTING UNIQUE SAMPLES, TO ENABLE REDUCTION IN BANDWIDTH REQUIREMENTS)

666: (UTILIZE REFERENCE COUNT TO ENCODE AND TRANSMIT A GIVEN SAMPLE EXACTLY ONCE, EVEN IF A PIXEL OR IMAGE FEATURE CORRESPONDING TO THE SAMPLE IS REPEATED IN MULTIPLE CAMERA VIEWS, TO ENABLE REDUCTION IN BANDWIDTH REQUIREMENTS)

IMAGE RECONSTRUCTION

671: (RECONSTRUCT SYNTHETIC VIEW BASED ON DATA REPRESENTATION AND TRACKING INFORMATION; EXECUTE 3D IMAGE RECONSTRUCTION BY WARPING 2D IMAGE, USING CONTROL POINTS: SLIDING GIVEN PIXEL ALONG A HEAD MOVEMENT VECTOR AT A DISPLACEMENT RATE PROPORTIONAL TO DISPARITY, BASED ON TRACKING INFORMATION AND DISPARITY VALUES)

672: (WHEREIN DISPARITY VALUES ARE ACQUIRED FROM FEATURE CORRESPONDENCE FUNCTION OR CONTROL POINT DATA STREAM)

673: (USE TRACKING INFORMATION TO CONTROL 2D CROP BOX: SYNTHETIC VIEW IS RECONSTRUCTED BASED ON VIEW ORIGIN, AND THEN CROPPED AND SCALED TO FILL USER'S DISPLAY SCREEN VIEW WINDOW; DEFINE MINIMA AND MAXIMA OF CROP BOX AS FUNCTION OF USER'S HEAD LOCATION WITH RESPECT TO DISPLAY SCREEN AND DIMENSIONS OF DISPLAY SCREEN VIEW WINDOW)

674: (EXECUTE 2D WARPING RECONSTRUCTION OF SELECTED VIEW BASED ON SELECTED CONTROL POINTS: DESIGNATE SET OF CONTROL POINTS, RESPECTIVE CONTROL POINTS CORRESPONDING TO RESPECTIVE, SELECTED PIXELS IN A SOURCE IMAGE; SLIDE CONTROL POINTS IN SELECTED DIRECTIONS IN 2D SPACE, WHEREIN THE CONTROL POINTS ARE SLID PROPORTIONALLY TO RESPECTIVE DISPARITY VALUES; INTERPOLATE DATA VALUES FOR PIXELS BETWEEN THE SELECTED PIXELS CORRESPONDING TO THE CONTROL POINTS; TO CREATE A SYNTHETIC VIEW OF THE IMAGE FROM A SELECTED NEW PERSPECTIVE IN 3D SPACE)

675: (ROTATE SOURCE IMAGE AND CONTROL POINT COORDINATES SO THAT ROWS OR COLUMNS OF IMAGE PIXELS ARE PARALLEL TO THE VECTOR BETWEEN THE ORIGINAL SOURCE IMAGE CENTER AND THE NEW VIEW VECTOR DEFINED BY THE SELECTED NEW PERSPECTIVE)

676: (ROTATE THE SOURCE IMAGE AND CONTROL POINT COORDINATES TO ALIGN THE VIEW VECTOR TO IMAGE SCANLINES; ITERATE THROUGH EACH SCANLINE AND EACH CONTROL POINT FOR A GIVEN SCANLINE, GENERATING A LINE ELEMENT BEGINNING AND ENDING AT EACH CONTROL POINT IN 2D IMAGE SPACE, WITH THE ADDITION OF THE CORRESPONDING DISPARITY VALUE MULTIPLIED BY THE CORRESPONDING VIEW VECTOR MAGNITUDE WITH THE CORRESPONDING X-AXIS COORDINATE; ASSIGN A TEXTURE COORDINATE TO THE BEGINNING AND ENDING POINTS OF EACH GENERATED LINE ELEMENT, EQUAL TO THEIR RESPECTIVE, ORIGINAL 2D LOCATION IN THE SOURCE IMAGE; INTERPOLATE TEXTURE COORDINATES LINEARLY ALONG EACH LINE ELEMENT; TO CREATE A RESULTING IMAGE IN WHICH IMAGE DATA BETWEEN THE CONTROL POINTS IS LINEARLY STRETCHED)

CONT'D FROM FIG. 67A

677: (ROTATE RESULTING IMAGE BACK BY THE INVERSE OF THE ROTATION APPLIED TO ALIGN THE VIEW VECTOR WITH THE SCANLINES)

678: (LINK CONTROL POINTS BETWEEN SCANLINES, AS WELL AS ALONG SCANLINES, TO CREATE POLYGON ELEMENTS DEFINED BY CONTROL POINTS, ACROSS WHICH INTERPOLATION IS EXECUTED)

679: (FOR A GIVEN SOURCE IMAGE, SELECTIVELY SLIDE IMAGE FOREGROUND AND IMAGE BACKGROUND INDEPENDENTLY OF EACH OTHER; SLIDING IS UTILIZED IN REGIONS OF LARGE DISPARITY OR DEPTH CHANGE)

6710: DETERMINE WHETHER TO UTILIZE SLIDING: EVALUATE DISPARITY HISTOGRAM TO DETECT MULTI-MODAL BEHAVIOR INDICATING THAT GIVEN CONTROL POINT IS ON AN IMAGE BOUNDARY FOR WHICH ALLOWING FOREGROUND AND BACKGROUND TO SLIDE INDEPENDENT OF EACH OTHER PRESENTS BETTER SOLUTION THAN INTERPOLATING DEPTH BETWEEN FOREGROUND AND BACKGROUND; DISPARITY HISTOGRAM FUNCTIONS AS PROBABILITY DENSITY FUNCTION (PDF) OF DISPARITY FOR A GIVEN PIXEL, IN WHICH HIGHER VALUES INDICATE HIGHER PROBABILITY OF THE CORRESPONDING DISPARITY RANGE BEING VALID FOR THE GIVEN PIXEL)

6711: (USE AT LEAST ONE SAMPLE INTEGRATION FUNCTION TABLE (SIFT), THE SIFT INCLUDING A TABLE OF SAMPLE INTEGRATION FUNCTIONS FOR ONE OR MORE PIXELS IN A DESIRED OUTPUT RESOLUTION OF AN IMAGE TO BE DISPLAYED TO THE USER; A GIVEN SAMPLE INTEGRATION FUNCTION MAPS AN INPUT VIEW ORIGIN VECTOR TO AT LEAST ONE KNOWN, WEIGHTED 2D IMAGE SAMPLE LOCATION IN AT LEAST ONE INPUT IMAGE BUFFER)

```
                          DISPLAY

681:  (DISPLAY SYNTHETIC VIEW TO USER ON DISPLAY SCREEN)

682:  (DISPLAY SYNTHETIC VIEW TO USER ON A 2D DISPLAY SCREEN; UPDATE DISPLAY IN REAL-
           TIME, BASED ON TRACKING INFORMATION, SO THAT DISPLAY APPEARS TO THE USER TO BE A
           WINDOW INTO A 3D SCENE RESPONSIVE TO USER'S HEAD OR EYE LOCATION)

683:  (DISPLAY SYNTHETIC VIEW TO USER ON BINOCULAR STEREO DISPLAY DEVICE)

684:  (DISPLAY SYNTHETIC VIEW TO USER ON LENTICULAR DISPLAY THAT ENABLES AUTO-
           STEREOSCOPIC VIEWING)
```

691: CAPTURE IMAGES OF SCENE, USING AT LEAST FIRST AND SECOND CAMERAS HAVING A VIEW OF THE SCENE, THE CAMERAS BEING ARRANGED ALONG AN AXIS TO CONFIGURE A STEREO CAMERA PAIR HAVING A CAMERA PAIR AXIS

692: EXECUTE FEATURE CORRESPONDENCE FUNCTION BY DETECTING COMMON FEATURES BETWEEN CORRESPONDING IMAGES CAPTURED BY THE RESPECTIVE CAMERAS AND MEASURING A RELATIVE DISTANCE IN IMAGE SPACE BETWEEN THE COMMON FEATURES, TO GENERATE DISPARITY VALUES, THE FEATURE CORRESPONDENCE FUNCTION INCLUDING CONSTRUCTING A MULTI-LEVEL DISPARITY HISTOGRAM INDICATING THE RELATIVE PROBABILITY OF A GIVEN DISPARITY VALUE BEING CORRECT FOR A GIVEN PIXEL, AND THE CONSTRUCTING OF A MULTI-LEVEL DISPARITY HISTOGRAM INCLUDES EXECUTING A FAST DENSE DISPARITY ESTIMATE (FDDE) IMAGE PATTERN MATCHING OPERATION ON SUCCESSIVELY LOWER-FREQUENCY DOWNSAMPLED VERSIONS OF THE INPUT STEREO IMAGES, THE SUCCESSIVELY LOWER-FREQUENCY DOWNSAMPLED VERSIONS CONSTITUTING A SET OF LEVELS OF FDDE HISTOGRAM VOTES 692.1   EACH LEVEL IS ASSIGNED A LEVEL NUMBER, AND EACH SUCCESSIVELY HIGHER LEVEL IS CHARACTERIZED BY A LOWER IMAGE RESOLUTION 692.2   DOWNSAMPLING IS PROVIDED BY REDUCING IMAGE RESOLUTION VIA LOW-PASS FILTERING 692.3   DOWNSAMPLING INCLUDES USING A WEIGHTED SUMMATION OF A KERNEL IN LEVEL [N-1] TO PRODUCE A PIXEL VALUE IN LEVEL [N], AND THE NORMALIZED KERNEL CENTER POSITION REMAINS THE SAME ACROSS ALL LEVELS 692.4   (FOR A GIVEN DESIRED DISPARITY SOLUTION AT FULL IMAGE RESOLUTION, THE FDDE VOTES FOR EVERY IMAGE LEVEL ARE INCLUDED IN THE DISPARITY SOLUTION 692.5   MAINTAIN IN A MEMORY UNIT A SUMMATION STACK, FOR EXECUTING SUMMATION OPERATIONS RELATING TO FEATURE CORRESPONDENCE)

693: GENERATE A MULTI-LEVEL HISTOGRAM INCLUDING A SET OF INITIALLY INDEPENDENT HISTOGRAMS AT DIFFERENT LEVELS OF RESOLUTION:

693.1:  EACH HISTOGRAM BIN IN A GIVEN LEVEL REPRESENTS VOTES FOR A DISPARITY DETERMINED BY THE FDDE AT THAT LEVEL 693.2:  EACH HISTOGRAM BIN IN A GIVEN LEVEL HAS AN ASSOCIATED DISPARITY UNCERTAINTY RANGE, AND THE DISPARITY UNCERTAINTY RANGE REPRESENTED BY EACH HISTOGRAM BIN IS A SELECTED MULTIPLE WIDER THAN THE DISPARITY UNCERTAINTY RANGE OF A BIN IN THE PRECEDING LEVEL

*CONT'D FROM FIG. 69A*

690

694: APPLY A SUB-PIXEL SHIFT TO THE DISPARITY VALUES AT EACH LEVEL DURING DOWNSAMPLING, TO NEGATE ROUNDING ERROR EFFECT: APPLY HALF PIXEL SHIFT TO ONLY ONE OF THE IMAGES IN A STEREO PAIR AT EACH LEVEL OF DOWNSAMPLING 694.1: APPLY SUB-PIXEL SHIFT IMPLEMENTED INLINE, WITHIN THE WEIGHTS OF THE FILTER KERNEL UTILIZED TO IMPLEMENT THE DOWNSAMPLING FROM LEVEL TO LEVEL

695: EXECUTE HISTOGRAM INTEGRATION, INCLUDING EXECUTING A RECURSIVE SUMMATION ACROSS ALL THE FDDE LEVELS:

695.1: DURING SUMMATION, MODIFY THE WEIGHTING OF EACH LEVEL TO CONTROL THE AMPLITUDE OF THE EFFECT OF LOWER LEVELS IN OVERALL VOTING, BY APPLYING SELECTED WEIGHTING COEFFICIENTS TO SELECTED LEVELS

696: INFER A SUB-PIXEL DISPARITY SOLUTION FROM THE DISPARITY HISTOGRAM, BY CALCULATING A SUB-PIXEL OFFSET BASED ON THE NUMBER OF VOTES FOR THE MAXIMUM VOTE DISPARITY RANGE AND THE NUMBER OF VOTES FOR AN ADJACENT, RUNNER-UP DISPARITY RANGE.

701: CAPTURE IMAGES OF SCENE, USING AT LEAST FIRST AND SECOND CAMERAS HAVING A VIEW OF THE SCENE, THE CAMERAS BEING ARRANGED ALONG AN AXIS TO CONFIGURE A STEREO CAMERA PAIR HAVING A CAMERA PAIR AXIS, AND FOR EACH CAMERA PAIR AXIS, EXECUTE IMAGE CAPTURE USING THE CAMERA PAIR TO GENERATE IMAGE DATA

702: APPLY/EXECUTE RECTIFICATION AND UNDISTORTING TRANSFORMATIONS TO TRANSFORM THE IMAGE DATA INTO RUD IMAGE SPACE

703: ITERATIVELY DOWNSAMPLE TO PRODUCE MULTIPLE, SUCCESSIVELY LOWER RESOLUTION LEVELS

704: EXECUTE FDDE CALCULATIONS FOR EACH LEVEL TO COMPILE FDDE VOTES FOR EACH LEVEL

705: GATHER FDDE DISPARITY RANGE VOTES INTO A MULTI-LEVEL HISTOGRAM

706: DETERMINE THE HIGHEST RANKED DISPARITY RANGE IN THE MULTI-LEVEL HISTOGRAM

707: PROCESS THE MULTI-LEVEL HISTOGRAM DISPARITY DATA TO GENERATE A FINAL DISPARITY RESULT

| 711: | CAPTURE IMAGES OF A SCENE, USING AT LEAST FIRST AND SECOND CAMERAS HAVING A VIEW OF THE SCENE, THE CAMERAS BEING ARRANGED ALONG AN AXIS TO CONFIGURE A STEREO CAMERA PAIR |

| 712: | EXECUTE A FEATURE CORRESPONDENCE FUNCTION BY DETECTING COMMON FEATURES BETWEEN CORRESPONDING IMAGES CAPTURED BY THE RESPECTIVE CAMERAS AND MEASURING A RELATIVE DISTANCE IN IMAGE SPACE BETWEEN THE COMMON FEATURES, TO GENERATE DISPARITY VALUES, THE FEATURE CORRESPONDENCE FUNCTION INCLUDING GENERATING A DISPARITY SOLUTION BASED ON THE DISPARITY VALUES, AND APPLYING AN INJECTIVE CONSTRAINT TO THE DISPARITY SOLUTION BASED ON DOMAIN AND CO-DOMAIN, WHEREIN THE DOMAIN COMPRISES PIXELS FOR A GIVEN IMAGE CAPTURED BY THE FIRST CAMERA AND THE CO-DOMAIN COMPRISES PIXELS FOR A CORRESPONDING IMAGE CAPTURED BY THE SECOND CAMERA, TO ENABLE CORRECTION OF ERROR IN THE DISPARITY SOLUTION IN RESPONSE TO VIOLATION OF THE INJECTIVE CONSTRAINT, AND WHEREIN THE INJECTIVE CONSTRAINT IS THAT NO ELEMENT IN THE CO-DOMAIN IS REFERENCED MORE THAN ONCE BY ELEMENTS IN THE DOMAIN |

| 721: | MAINTAIN A REFERENCE COUNT FOR EACH PIXEL IN THE CO-DOMAIN |

722: DOES REFERENCE COUNT FOR THE PIXELS IN THE CO-DOMAIN EXCEED "1"? — NO

YES

| 723: | IF THE COUNT EXCEEDS "1": |

| 724: | SIGNAL A VIOLATION AND RESPOND TO THE VIOLATION WITH A SELECTED ERROR CORRECTION APPROACH |

731: FIRST-COME, FIRST-SERVED: ASSIGN PRIORITY TO THE FIRST ELEMENT IN THE DOMAIN TO CLAIM AN ELEMENT IN THE CO-DOMAIN, AND IF A SECOND ELEMENT IN THE DOMAIN CLAIMS THE SAME CO-DOMAIN ELEMENT, INVALIDATING THAT SUBSEQUENT MATCH AND DESIGNATING THAT SUBSEQUENT MATCH TO BE INVALID

732: BEST MATCH WINS: COMPARE THE ACTUAL IMAGE MATCHING ERROR OR CORRESPONDING HISTOGRAM VOTE COUNT BETWEEN THE TWO POSSIBLE CANDIDATE ELEMENTS IN THE DOMAIN AGAINST THE CONTESTED ELEMENT IN THE CO-DOMAIN, AND DESIGNATE AS WINNER THE DOMAIN CANDIDATE WITH THE BEST MATCH.

733: SMALLEST DISPARITY WINS: IF THERE IS A CONTEST BETWEEN CANDIDATE ELEMENTS IN THE DOMAIN FOR A GIVEN CO-DOMAIN ELEMENT, WHEREIN EACH CANDIDATE ELEMENT HAS A CORRESPONDING DISPARITY, SELECTING THE DOMAIN CANDIDATE WITH THE SMALLEST DISPARITY AND DESIGNATING THE OTHERS AS INVALID

734: SEEK ALTERNATIVE CANDIDATES: SELECT AND TEST THE NEXT BEST DOMAIN CANDIDATE, BASED ON A SELECTED CRITERION, AND ITERATING THE SELECTING AND TESTING UNTIL THE VIOLATION IS ELIMINATED OR A COMPUTATIONAL TIME LIMIT IS REACHED.

741: CAPTURE IMAGES OF THE SECOND USER, USING AT LEAST ONE CAMERA HAVING A VIEW OF THE SECOND USER'S FACE

742: EXECUTE A FEATURE CORRESPONDENCE FUNCTION BY DETECTING COMMON FEATURES BETWEEN CORRESPONDING IMAGES CAPTURED BY THE AT LEAST ONE CAMERA AND MEASURING A RELATIVE DISTANCE IN IMAGE SPACE BETWEEN THE COMMON FEATURES, TO GENERATE DISPARITY VALUES

743: GENERATE A DATA REPRESENTATION, REPRESENTATIVE OF THE CAPTURED IMAGES AND THE CORRESPONDING DISPARITY VALUES

744: ESTIMATE A THREE-DIMENSIONAL (3D) LOCATION OF THE FIRST USER'S HEAD, FACE OR EYES, TO GENERATE TRACKING INFORMATION:

744.1: PASS A CAPTURED IMAGE OF THE FIRST USER, THE CAPTURED IMAGE INCLUDING THE FIRST USER'S HEAD AND FACE, TO A TWO-DIMENSIONAL (2D) FACIAL FEATURE DETECTOR THAT UTILIZES THE IMAGE TO GENERATE A FIRST ESTIMATE OF HEAD AND EYE LOCATION AND A ROTATION ANGLE OF THE FACE RELATIVE TO AN IMAGE PLANE 744.2: USE AN ESTIMATED CENTER-OF-FACE POSITION, FACE ROTATION ANGLE, AND HEAD DEPTH RANGE BASED ON THE FIRST ESTIMATE, TO DETERMINE A BEST-FIT RECTANGLE THAT INCLUDES THE HEAD 744.3: EXTRACT FROM THE BEST-FIT RECTANGLE ALL 3D POINTS THAT LIE WITHIN THE BEST-FIT RECTANGLE, AND CALCULATE THEREFROM A REPRESENTATIVE 3D HEAD POSITION 744.4: IF THE NUMBER OF VALID 3D POINTS EXTRACTED FROM THE BEST-FIT RECTANGLE EXCEEDS A SELECTED THRESHOLD IN RELATION TO THE MAXIMUM NUMBER OF POSSIBLE 3D POINTS IN THE REGION, THEN SIGNAL A VALID 3D HEAD POSITION RESULT.

745: RECONSTRUCT A SYNTHETIC VIEW OF THE SECOND USER, BASED ON THE REPRESENTATION, TO ENABLE A DISPLAY TO THE FIRST USER OF A SYNTHETIC VIEW OF THE SECOND USER IN WHICH THE SECOND USER APPEARS TO BE GAZING DIRECTLY AT THE FIRST USER, INCLUDING RECONSTRUCTING THE SYNTHETIC VIEW BASED ON THE GENERATED DATA REPRESENTATION AND THE GENERATED TRACKING INFORMATION.

751: DETERMINE, FROM THE FIRST ESTIMATE OF HEAD AND EYE LOCATION AND FACE ROTATION ANGLE, AN ESTIMATED CENTER-OF-FACE POSITION

752: DETERMINE AN AVERAGE DEPTH VALUE FOR THE FACE BY EXTRACTING THREE-DIMENSIONAL (3D) POINTS VIA THE DISPARITY VALUES FOR A SELECTED, SMALL AREA LOCATED AROUND THE ESTIMATED CENTER-OF-FACE POSITION

753: UTILIZE THE AVERAGE DEPTH VALUE TO DETERMINE A DEPTH RANGE THAT IS LIKELY TO ENCOMPASS THE ENTIRE HEAD

754: UTILIZE THE ESTIMATED CENTER-OF-FACE POSITION, FACE ROTATION ANGLE, AND DEPTH RANGE TO EXECUTE A SECOND RAY MARCH TO DETERMINE A BEST-FIT RECTANGLE THAT INCLUDES THE HEAD

755: CALCULATE, FOR BOTH HORIZONTAL AND VERTICAL AXES, VECTORS THAT ARE PERPENDICULAR TO EACH RESPECTIVE AXIS BUT SPACED AT DIFFERENT INTERVAL

756: FOR EACH OF THE CALCULATED VECTORS, TEST THE CORRESPONDING 3D POINTS STARTING FROM A POSITION OUTSIDE THE HEAD REGION AND WORKING INWARDS, TO THE HORIZONTAL OR VERTICAL AXIS

757: WHEN A 3D POINT IS ENCOUNTERED THAT FALLS WITHIN THE DETERMINED DEPTH RANGE, DENOMINATE THAT POINT AS A VALID EXTENT OF A BEST-FIT HEAD RECTANGLE

758: FROM EACH RAY MARCH ALONG EACH AXIS, DETERMINE A BEST-FIT RECTANGLE FOR THE HEAD, AND EXTRACTING THEREFROM ALL 3D POINTS THAT LIE WITHIN THE BEST-FIT RECTANGLE, AND CALCULATING THEREFROM A WEIGHTED AVERAGE

761: DOWNSAMPLE CAPTURED IMAGE BEFORE PASSING IT TO THE 2D FACIAL FEATURE DETECTOR

762: INTERPOLATE IMAGE DATA FROM VIDEO FRAME TO VIDEO FRAME, BASED ON THE TIME THAT HAS PASSED FROM A GIVEN VIDEO FRAME FROM A PREVIOUS VIDEO FRAME

763: CONVERT IMAGE DATA TO LUMINANCE VALUES

771: CAPTURE IMAGES OF A SCENE, USING AT LEAST THREE CAMERAS HAVING A VIEW OF THE SCENE, THE CAMERAS BEING ARRANGED IN A SUBSTANTIALLY "L"-SHAPED CONFIGURATION WHEREIN A FIRST PAIR OF CAMERAS IS DISPOSED ALONG A FIRST AXIS AND SECOND PAIR OF CAMERAS IS DISPOSED ALONG A SECOND AXIS INTERSECTING WITH, BUT ANGULARLY DISPLACED FROM, THE FIRST AXIS, WHEREIN THE FIRST AND SECOND PAIRS OF CAMERAS SHARE A COMMON CAMERA AT OR NEAR THE INTERSECTION OF THE FIRST AND SECOND AXIS, SO THAT THE FIRST AND SECOND PAIRS OF CAMERAS REPRESENT RESPECTIVE FIRST AND SECOND INDEPENDENT STEREO AXES THAT SHARE A COMMON CAMERA

772: EXECUTE A FEATURE CORRESPONDENCE FUNCTION BY DETECTING COMMON FEATURES BETWEEN CORRESPONDING IMAGES CAPTURED BY THE AT LEAST THREE CAMERAS AND MEASURING A RELATIVE DISTANCE IN IMAGE SPACE BETWEEN THE COMMON FEATURES, TO GENERATE DISPARITY VALUES

773: GENERATE A DATA REPRESENTATION, REPRESENTATIVE OF THE CAPTURED IMAGES AND THE CORRESPONDING DISPARITY VALUES

774: UTILIZE AN UNRECTIFIED, UNDISTORTED (URUD) IMAGE SPACE TO INTEGRATE DISPARITY DATA FOR PIXELS BETWEEN THE FIRST AND SECOND STEREO AXES, THEREBY TO COMBINE DISPARITY DATA FROM THE FIRST AND SECOND AXES, WHEREIN THE URUD SPACE IS AN IMAGE SPACE IN WHICH POLYNOMIAL LENS DISTORTION HAS BEEN REMOVED FROM THE IMAGE DATA BUT THE CAPTURED IMAGE REMAINS UNRECTIFIED

*FIG. 77*

780: (OPTIONAL SUB-OPERATIONS IN RUD/URUD IMAGE SPACE)

781: EXECUTE A STEREO CORRESPONDENCE OPERATION ON THE IMAGE DATA IN A RECTIFIED, UNDISTORTED (RUD) IMAGE SPACE, AND STORING RESULTANT DISPARITY DATA IN A RUD SPACE COORDINATE SYSTEM

782: STORE THE RESULTANT DISPARITY DATA IN A URUD SPACE COORDINATE SYSTEM

783: GENERATE DISPARITY HISTOGRAMS FROM THE DISPARITY DATA IN EITHER RUD OR URUD SPACE, AND STORE THE DISPARITY HISTOGRAMS IN A UNIFIED URUD SPACE COORDINATE SYSTEM (AND APPLY A URUD TO RUD COORDINATE TRANSFORMATION TO OBTAIN PER-AXIS DISPARITY VALUES)

*FIG. 78*

790: PRIVATE DISPARITY HISTOGRAM

791: CAPTURE IMAGES OF A SCENE USING AT LEAST ONE CAMERA HAVING A VIEW OF THE SCENE

792: EXECUTE A FEATURE CORRESPONDENCE FUNCTION BY DETECTING COMMON FEATURES BETWEEN CORRESPONDING IMAGES CAPTURED BY THE AT LEAST ONE CAMERA AND MEASURING A RELATIVE DISTANCE IN IMAGE SPACE BETWEEN THE COMMON FEATURES, TO GENERATE DISPARITY VALUES, USING A DISPARITY HISTOGRAM METHOD TO INTEGRATE DATA AND DETERMINE CORRESPONDENCE 792.1: CONSTRUCT A DISPARITY HISTOGRAM INDICATING THE RELATIVE PROBABILITY OF A GIVEN DISPARITY VALUE BEING CORRECT FOR A GIVEN PIXEL 792.2: OPTIMIZE GENERATION OF DISPARITY VALUES ON A GPU COMPUTING STRUCTURE, BY GENERATING, IN THE GPU COMPUTING STRUCTURE, A PLURALITY OF OUTPUT PIXEL THREADS AND FOR EACH OUTPUT PIXEL THREAD, MAINTAINING A PRIVATE DISPARITY HISTOGRAM IN A STORAGE ELEMENT ASSOCIATED WITH THE GPU COMPUTING STRUCTURE AND PHYSICALLY PROXIMATE TO THE COMPUTATION UNITS OF THE GPU COMPUTING STRUCTURE

793: GENERATE A DATA REPRESENTATION, REPRESENTATIVE OF THE CAPTURED IMAGES AND THE CORRESPONDING DISPARITY VALUES

*FIG. 79*

800: (OPTIONAL SUB-OPERATIONS RELATING TO PRIVATE DISPARITY HISTOGRAMS

801: STORE THE PRIVATE DISPARITY HISTOGRAM SUCH THAT EACH PIXEL THREAD WRITES TO AND READS FROM THE CORRESPONDING PRIVATE DISPARITY HISTOGRAM ON A DEDICATED PORTION OF SHARED LOCAL MEMORY IN THE GPU

802: ORGANIZE SHARED LOCAL MEMORY IN THE GPU AT LEAST IN PART INTO MEMORY WORDS; THE PRIVATE DISPARITY HISTOGRAM IS CHARACTERIZED BY A SERIES OF HISTOGRAM BINS INDICATING THE NUMBER OF VOTES FOR A GIVEN DISPARITY RANGE; AND IF A MAXIMUM POSSIBLE NUMBER OF VOTES IN THE PRIVATE DISPARITY HISTOGRAM IS KNOWN, MULTIPLE HISTOGRAM BINS CAN BE PACKED INTO A SINGLE WORD OF THE SHARED LOCAL MEMORY, AND ACCESSED USING BITWISE GPU ACCESS OPERATIONS

851: CAPTURE IMAGES OF USER'S FACE 851.1: (USING AT LEAST ONE CAMERA HAVING A VIEW OF THE USER'S FACE)

851.2: (CAN BE MULTIPLE CAMERAS)

851.3: (CAN INCLUDE T-O-F OR STRUCTURED LIGHT CAMERA)

852: EXECUTE IMAGE RECTIFICATION FUNCTION TO COMPENSATE FOR CAMERA OPTICAL DISTORTION AND ALIGNMENT

853: EXECUTE FEATURE CORRESPONDENCE 853.1: DETECT COMMON FEATURES BETWEEN CORRESPONDING IMAGES CAPTURED BY CAMERA(S) OR SINGLE CAMERA OVER TIME 853.2 GENERATE DISPARITY/DEPTH VALUES AND FEATURE CORRESPONDENCE DATA REPRESENTATION REPRESENTATIVE OF CAPTURED IMAGES AND CORRESPONDING DISPARITY/DEPTH VALUES

854: EXECUTE BACKGROUND ELIMINATION

855: GENERATE FACIAL SIGNATURE DATA REPRESENTATION (CAN BE HISTOGRAM-BASED REPRESENTATION)

FACIAL SIGNATURE

860.1: (UTILIZES STEREO DEPTH ESTIMATION TO VERIFY THAT HUMAN FACIAL FEATURES ARE PRESENTED TO CAMERA(S) AT CORRECT DISTANCE RATIOS BETWEEN CAMERA(S) OR FROM STRUCTURED LIGHT OR TIME-OF-FLIGHT SENSOR)

860.2: (IDENTIFYING ASPECT TAKES INTO ACCOUNT ACTUAL 3D COORDINATES OF FACIAL FEATURES WITH RESPECT TO OTHER FACIAL FEATURES)

860.3: (FEATURE CORRESPONDENCE FUNCTION OR DEPTH DETECTION FUNCTION INCLUDES COMPUTING DISTANCES BETWEEN FACIAL FEATURES FROM MULTIPLE PERSPECTIVES)

860.4: (FACIAL SIGNATURE CAN BE COMBINATION OF 3D FACIAL CONTOUR INFORMATION AND 2D IMAGE FROM CAMERA(S))

860.5: (3D CONTOUR DATA CAN BE STORED IN FACIAL SIG. DATA REPRESENTATION)

860.6: (FACIAL SIGNATURE CAN BE UTILIZED AS A SECURITY FACTOR IN AN AUTHENTICATION SYSTEM, ALONE OR IN COMBINATION WITH OTHER SECURITY FACTORS)

806.7: (UPDATE FACIAL SIGNATURE ON EVERY SUCCESSFUL MATCH, OR ON EVERY $N$ SUCCESSFUL MATCHES )

860.8: (3D FACIAL CONTOUR DATA CAN BE COMBINED WITH 2D IMAGE FROM ONE OR MORE CAMERAS IN A CONVENTIONAL 2D FACE IDENTIFICATION SYSTEM TO CREATE A HYBRID 3D/2D FACE IDENTIFICATION SYSTEM)

860.9: (3D FACIAL CONTOUR DATA CAN BE USED TO CONFIRM THAT A FACE HAVING CREDIBLE 3D HUMAN FACIAL PROPORTIONS WAS PRESENTED TO THE CAMERAS AT AN OVERLAPPING SPATIAL LOCATION OF CAPTURED 2D IMAGE)

860.10: (2D BOUNDING RECTANGLE, DEFINING 2D EXTENT OF FACE LOCATION, CAN BE USED TO LIMIT SEARCH SPACE AND LIMIT CALCULATIONS TO A REGION DEFINED BY THE RECTANGLE, THEREBY INCREASING SPEED OF RECOGNITION AND REDUCING POWER CONSUMPTION)

860.11: (CAN BE A HISTOGRAM BASED FACIAL SIGNATURE REPRESENTATION)

HISTOGRAM BASED FACIAL SIGNATURE REPRESENTATION 870.1: (FACIAL SIGNATURE IS REPRESENTED AS ONE OR MORE HISTOGRAMS OBTAINED FROM A SUMMATION OF PER-PIXEL DISPARITY HISTOGRAMS WITHIN FEATURE CORRESPONDENCE CALCULATION, OR GENERATED FROM DEPTH DATA FROM SENSOR CAPABLE OF DIRECTLY PERCEIVING DEPTH)

870.2: (HISTOGRAM REPRESENTS NORMALIZED RELATIVE PROPORTION OF FACIAL FEATURE DEPTHS ACROSS PLANE PARALLEL TO USER'S FACE)

870.3: (X-AXIS OF HISTOGRAM REPRESENTS A GIVEN DISPARITY OR DEPTH RANGE; Y-AXIS REPRESENTS NORMALIZED COUNT OF IMAGE SAMPLES THAT FALL WITHIN GIVEN RANGE)

870.4: (DURING POPULATION OF HISTOGRAM, CONVENTIONAL 2D FACE DETECTOR CAN PROVIDE FACE RECTANGLE AND LOCATION OF BASIC FACIAL FEATURES, AND WHEREIN ONLY SAMPLES WITHIN FACE RECTANGLE ARE ACCUMULATED INTO HISTOGRAM)

870.5: (SAMPLES FALLING OUTSIDE STATISTICAL MAJORITY OF SAMPLES WITHIN FACE RECTANGLE CAN BE REJECTED, SO AS TO REMOVE BACKGROUND SAMPLES)

870.6: (DISPARITY AND DEPTH POINTS CAN BE PROJECTED INTO A CANONICAL COORDINATE SYSTEM DEFINED BY A PLANE CONSTRUCTED FROM BASIC FACIAL FEATURES)

870.7: (HISTOGRAM REPRESENTATION CAN BE USED IN COMBINATION WITH CONVENTIONAL 2D FACE MATCHING TO PROVIDE ADDITIONAL AUTHENTICATION FACTOR)

FIG. 87

FACIAL SIGNATURE METHODS, SYSTEMS AND SOFTWARE

CROSS-REFERENCE TO RELATED APPLICATIONS, INCORPORATION BY REFERENCE

This application for patent is a Continuation of pending, commonly-owned U.S. patent application Ser. No. 15/573,475 filed Nov. 12, 2017, which is a national phase entry (35 USC 371) of commonly-owned PCT Application PCT/US16/32213 filed May 12, 2016, which claims the priority benefit of commonly-owned U.S. Provisional Applications for Patent Ser. No. 62/160,563 filed May 12, 2015. Each of the above-noted patent applications is incorporated by reference herein as if set forth herein in its entirety.

PCT Application PCT/US16/32213 filed May 12, 2016 is also a Continuation-in-Part (CIP) of commonly-owned PCT Patent Application No. PCT/US16/23433 filed Mar. 21, 2016, entitled "Virtual 3D Methods, Systems and Software", which claims the priority benefit of commonly-owned U.S. Provisional Applications for Patent 62/136,494 filed Mar. 21, 2015, each of which is incorporated by reference herein as if set forth herein in its entirety.

Also incorporated by reference herein as if set forth herein in their entireties are the following:

U.S. Pat. App. Pub. No. 2013/0101160, Woodfill et al.;
Carranza et al., "Free-Viewpoint Video of Human Actors," ACM Transactions on Graphics, vol. 22, no. 3, pp. 569-577, July 2003;
Chu et al., "OpenCV and TYZX: Video Surveillance for Tracking," August 2008, Sandia Report SAND2008-5776;
Gordon et al., "Person and Gesture Tracking with Smart Stereo Cameras," Proc. SPILT, vol. 6803, January 2008;
Hannah, "Computer Matching of Areas in Stereo Images", July 1974 Thesis, Stanford University Computer Science Department Report STAN-CS-74-438;
Harrison et al., "Pseudo-3D Video Conferencing with a Generic Webcam," 2008 IEEE Int'l Symposium on Multimedia, pp. 236-241;
Luo et al., "Hierarchical Genetic Disparity Estimation Algorithm for Multiview image Synthesis," 2000 IEEE Int. conf. on Image Processing, Vol. 2, pp. 768-771;
Zahih et al., "Non-parametric Local Transforms for Computing Visual Correspondence" Proc. European Conf. on Computer Vision, May 1994, pp. 131-158.

FIELD OF THE INVENTION

The present invention relates generally to methods, systems and computer program products ("software") for enabling a virtual three-dimensional visual experience (referred to herein as "V3D") in video conferencing and other applications; for capturing, processing and displaying of images and image streams; and for generating a facial signature, based on images of a given human users or subject's face, for enabling accurate, reliable identification or authentication of a human user or subject, in a secure, difficult to forge manner.

BACKGROUND OF THE INVENTION

It would be desirable to provide methods, systems, devices and computer software/program code products that:

(1) enable improved visual aspects of videoconferencing, over otherwise conventional telecommunications networks and devices;
(2) enable a first user in a videoconference to view a second, remote user in the videoconference with direct virtual eye contact with the second user, even if no camera used in the videoconference set-up has a direct eye contact gaze vector to the second user;
(3) enable a virtual 3D experience (referred to herein as V3D), not only in videoconferencing but in other applications such as viewing of remote scenes, and in virtual reality (VR) applications;
(4) facilitate self-portraiture of a user utilizing a handheld device to take the self-portrait;
(5) facilitate composition of a photograph of a scene, by a user utilizing a handheld device to take the photograph;
(6) provide such features in a manner that fits within the form factors of modern mobile devices such as tablet computers and smartphones, as well as the form factors of laptops, PCs, computer-driven televisions, computer-driven projector devices, and the like, does not dramatically alter the economics of building such devices, and is viable within current or near-current communications network/connectivity architectures.
(7) improve the capturing and displaying of images to a user utilizing a binocular stereo head-mounted display (HMD) in a pass-through mode;
(8) improve the capturing and displaying of image content on a binocular stereo head-mounted display (HMD), wherein the captured content is prerecorded content;
(9) generate an input image stream adapted for use in the control system of an autonomous or self-driving vehicle;
(10) generate a facial signature, based on images of a given human user's or subject's face, or face and head, for enabling accurate, reliable identification, authentication or matching of a human user or subject, in a secure, difficult to forge manner.

The present invention provides methods, systems, devices and computer software/program code products that enable the foregoing aspects and others, Some embodiments and practices of the invention are collectively referred to herein as V3D. Certain other embodiments and practices of the invention are collectively referred to as Facial Signature aspects of the invention. As described in greater detail below, certain Facial Signature aspects of the invention may utilize certain V3D aspects of the invention.

Aspects, examples, embodiments and practices of the invention, whether in the form of methods, devices, systems or computer software/program code products, will next be described in greater detail in the following Summary of the Invention and Detailed Description of the Invention sections, in conjunction with the attached drawing figures.

SUMMARY OF THE INVENTION

The present invention provides methods, systems, devices, and computer software/program code products for, among other aspects and possible applications, facilitating video communications and presentation of image and video content, and generating image input streams for a control system of autonomous vehicles; and for generating a facial signature, based on images of a human user's or subject's face, for enabling accurate, reliable identification or authentication of a human user or subject, in a secure, difficult to forge manner.

Methods, systems, devices, and computer software/program code products in accordance with the invention are suitable for implementation or execution in, or in conjunction with, commercially available computer graphics processor configurations and systems including one or more display screens for displaying images, cameras for capturing images, and graphics processors for rendering images for storage or for display, such as on a display screen, and for processing data values for pixels in an image representation. The cameras, graphics processors and display screens can be of a form provided in commercially available smartphones, tablets and other mobile telecommunications devices, as well as in commercially available laptop and desktop computers, which may communicate using commercially available network architectures including client/server and client/network/cloud architectures.

In the aspects of the invention described below and hereinafter, the algorithmic image processing methods described are executed by digital processors, which can include graphics processor units, including GPGPUs such as those commercially available on cellphones, smartphones, tablets and other commercially available telecommunications and computing devices, as well as in digital display devices and digital cameras. Those skilled in the art to which this invention pertains will understand the structure and operation of digital processors, GPGPUs and similar digital graphics processor units.

While a number of the following aspects are described in the context of one-directional ("half duplex") configurations, those skilled in the art will understand that the invention further relates to and encompasses providing bi-directional, full-duplex configurations of the claimed subject matter.

One aspect of the present invention relates to methods, systems and computer software/program code products that enable a first user to view a second user with direct virtual eye contact with the second user. This aspect of the invention comprises capturing images of the second user, utilizing at least one camera having a view of the second user's face; generating a data representation, representative of the captured images; reconstructing a synthetic view of the second user, based on the representation; and displaying the synthetic view to the first user on a display screen used by the first user; the capturing, generating, reconstructing and displaying being executed such that the first user can have direct virtual eye contact with the second user through the first user's display screen, by the reconstructing and displaying of a synthetic view of the second user in which the second user appears to be gazing directly at the first user, even if no camera has a direct eye contact gaze vector to the second user.

Another aspect includes executing a feature correspondence function by detecting common features between corresponding images captured by the at least one camera and measuring a relative distance in image space between the common features, to generate disparity values; wherein the data representation is representative of the captured images and the corresponding disparity values, the capturing, detecting, generating, reconstructing and displaying being executed such that the first user can have direct virtual eye contact with the second user through the first user's display screen.

In another aspect, the capturing includes utilizing at least two cameras, each having a view of the second user's face; and executing a feature correspondence function comprises detecting common features between corresponding images captured by the respective cameras.

In yet another aspect, the capturing comprises utilizing at least one camera having a view of the second user's face, and which is an infra-red time-of-flight camera that directly provides depth information; and the data representation is representative of the captured images and corresponding depth information.

In a further practice of the invention, the capturing includes utilizing a single camera having a view of the second user's face; and executing a feature correspondence function comprises detecting common features between sequential images captured by the single camera over time and measuring a relative distance in image space between the common features, to generate disparity values.

In another aspect, the captured images of the second user comprise visual information of the scene surrounding the second user; and the capturing, detecting, generating, reconstructing and displaying are executed such that: (a) the first user is provided the visual impression of looking through his display screen as a physical window to the second user and the visual scene surrounding the second user, and (b) the first user is provided an immersive visual experience of the second user and the scene surrounding the second user.

Another practice of the invention includes executing image rectification to compensate for optical distortion of each camera and relative misalignment of the cameras.

In another aspect, executing image rectification comprises applying a 2D image space transform; and applying a 2D image space transform comprises utilizing a GPGPU processor running a shader program.

In one practice of the invention, the cameras for capturing images of the second user are located at or near the periphery or edges of a display device used by the second user, the display device used by the second user having a display screen viewable by the second user and having a geometric center; and the synthetic view of the second user corresponds to a selected virtual camera location, the selected virtual camera location corresponding to a paint at or proximate to the geometric center.

In another practice of the invention, the cameras for capturing images of the second user are located at a selected position outside the periphery or edges of a display device used by the second user.

In still another aspect of the invention, respective camera view vectors are directed in non coplanar orientations.

In another aspect, the cameras for capturing images of the second user, or of a remote scene, are located in selected positions and positioned with selected orientations around the second user or the remote scene.

Another aspect includes estimating a location of the first user's head or eyes, thereby generating tracking information; and the reconstructing of a synthetic view of the second user comprises reconstructing the synthetic view based on the generated data representation and the generated t information.

In one aspect of the invention, camera shake effects are inherently eliminated, in that the capturing, detecting, generating, reconstructing and displaying are executed such that the first user has a virtual direct view through his display screen to the second user and the visual scene surrounding the second user; and scale and perspective of the image of the second user and objects in the visual scene surrounding the second user are accurately represented to the first user regardless of users view distance and angle.

This aspect of the invention provides, on the user's display screen, the visual impression of a frame without glass; a window into a 3D scene of the second user and the scene surrounding the second user.

In one aspect, the invention is adapted for implementation on a mobile telephone device, and the cameras for capturing images of the second user are located at or near the periphery or edges of a mobile telephone device used by the second user.

In another practice of the invention, the invention is adopted for implementation on a laptop or desktop computer, and the cameras for capturing images of the second user are located at or near the periphery or edges of a display device of a laptop or desktop computer used by the second user.

In another aspect, the invention is adapted for implementation on computing or telecommunications devices comprising any of tablet computing devices, computer-driven television displays or computer-driven image projection devices, and wherein the cameras for capturing images of the second user are located at or near the periphery or edges of a computing or telecommunications device used by the second user.

One aspect of the present invention relates to methods, systems and computer software/program code products that enable a user to view a remote scene in a manner that gives the user a visual impression of being present with respect to the remote scene. This aspect of the invention includes capturing images of the remote scene, utilizing at least two camera each having a view of the remote scene; executing a feature correspondence function by detecting common features between corresponding images captured by the respective cameras and measuring a relative distance in image space between the common features, to generate disparity values; generating a data representation, representative of the captured images and the corresponding disparity values; reconstructing a synthetic view of the remote scene, based on the representation; and displaying the synthetic view to the first user on a display screen used by the first user; the capturing, detecting, generating, reconstructing and displaying being executed such that: (a) the user is provided the visual impression of looking through his display screen as a physical window to the remote scene, and (b) the user is provided an immersive visual experience of the remote scene.

In one aspect of the invention, the capturing of images includes using at least one color camera.

In another practice of the invention, the capturing includes using at least one infrared structured light emitter.

In yet another aspect, the capturing comprises utilizing a view vector rotated camera configuration wherein the locations of first and second cameras define a line; and the line defined by the first and second camera locations is rotated by a selected amount from a selected horizontal or vertical axis; thereby increasing the number of valid feature correspondences identified in typical real-world settings by the feature correspondence function.

In another aspect of the invention, the first and second cameras are positioned relative to each other along epipolar lines.

In a further aspect, subsequent to the capturing of images, disparity values are rotated back to a selectee horizontal or vertical orientation along with the captured images.

In another aspect, subsequent to the reconstructing of a synthetic view, the synthetic view is rotated back to a selected horizontal or vertical orientation.

In yet another practice of the invention, the capturing comprises exposure cycling, comprising dynamically adjusting the exposure of the cameras on a frame-by-frame basis to improve disparity estimation in regions outside the exposed region viewed by the user; wherein a series of exposures are taken, including exposures lighter than and exposures darker than a visibility-optimal exposure, disparity values are calculated for each exposure, and the disparity values are integrated into an overall disparity solution over time, so as to improve disparity estimation.

In another aspect; the exposure cycling comprises dynamically adjusting the exposure of the cameras on a frame-by-frame basis to improve disparity estimation in regions outside the exposed region viewed by the user; wherein a series of exposures are taken, including exposures lighter than and exposures darker than a visibility-optimal exposure, disparity values are calculated for each exposure, and the disparity values are integrated in a disparity histogram, the disparity histogram being converged over time, so as to improve disparity estimation.

A further aspect of the invention comprises analyzing the quality of the overall disparity solution on respective dark, mid-range and light pixels to generate variance information used to control the exposure settings of the cameras, thereby to form a closed loop between the quality of the disparity estimate and the set of exposures requested from the cameras.

Another aspect includes analyzing variance of the disparity histograms on respective dark, mid range and light pixels to generate variance information used to control the exposure settings of the cameras, thereby to form a closed loop between the quality of the disparity estimate and the set of exposures requested from the cameras.

In one practice of the invention, the feature correspondence function includes evaluating and combining vertical- and horizontal-axis correspondence information.

In another aspect; the feature correspondence function further comprises applying, to image pixels containing a disparity solution, a coordinate transformation; to a unified coordinate system. The unified coordinate system can be the un-rectified coordinate system of the captured images.

Another aspect of the invention includes using at least three cameras arranged in a substantially "L"-shaped configuration, such that a pair of cameras is presented along a first axis and a second pair of cameras is presented along a second axis substantially perpendicular to the first axis.

In a further aspect, the feature correspondence function utilizes a disparity histogram-based method of integrating data and determining correspondence.

In accordance with another aspect of the invention, the feature correspondence function comprises refining correspondence information over time. The refining can include retaining a disparity solution over a time interval, and continuing to integrate disparity solution values for each image frame over the time interval, so as to converge on an improved disparity solution by sampling over time.

In another aspect, the feature correspondence function comprises filling unknowns in a correspondence information set with historical data obtained from previously captured images. The filling of unknowns can include the following: if a given image feature is detected in an image captured by one of the cameras, and no corresponding image feature is found in a corresponding image captured by another of the cameras, then utilizing data for a pixel corresponding to the given image feature, from a corresponding, previously captured image.

In a further aspect of the invention, the feature correspondence function utilizes a disparity histogram-based method of integrating data and determining correspondence. This aspect of the invention can include constructing a disparity histogram indicating the relative probability of a given disparity value being correct for a given pixel. The disparity histogram functions as a Probability Density Function (PDF) of disparity for the given pixel, in which higher values indicate a higher probability of the corresponding disparity range being valid for the given pixel.

In another practice of the invention, one axis of the disparity histogram indicates a given disparity range, and a second axis of the histogram indicates the number of pixels in a kernel surrounding the central pixel in question that are voting for the given disparity range.

In one aspect of the invention, votes indicated by the disparity histogram are initially generated utilizing a Sum of Square Differences (SSD) method, which can comprise executing an SSD method with a relatively small kernel to produce a fast dense disparity map in which each pixel has a selected disparity that represents the lowest error; then, processing a plurality of pixels to accumulate into the disparity histogram a tally of the number of votes for a given disparity in a relatively larger kernel surrounding the pixel in question.

Another aspect of the invention includes transforming the disparity histogram into a Cumulative Distribution Function (CDF) from which the width of a corresponding interquartile range can be determined, thereby to establish a confidence level in the corresponding disparity solution.

A further aspect includes maintaining a count of the number of statistically significant modes in the histogram, thereby to indicate modality. In accordance with the invention, modality can be used as an input to the above-described reconstruction aspect, to control application of a stretch vs. slide reconstruction method.

Still another aspect of the invention includes maintaining a disparity histogram over a selected time interval and accumulating samples into the histogram, thereby to compensate for camera noise or other sources of motion or error.

Another aspect includes generating fast disparity estimates for multiple independent axes; and then combining the corresponding, respective disparity histograms to produce a statistically more robust disparity solution.

Another aspect includes evaluating the interquartile range of a CDF of a given disparity histogram to produce an interquartile result; and if the interquartile result is indicative of an area of poor sampling signal to noise ratio, due to camera over- or underexposure, then controlling camera exposure based on the interquartile result to improve a poorly sampled area of a given disparity histogram.

Yet another practice of the invention includes testing for only a small set of disparity values using a small-kernel SSD method to generate initial results; populating a corresponding disparity histogram with the initial results; and then using, histogram votes to drive further SSD testing within a given range to improve disparity resolution over time.

Another aspect includes extracting sub-pixel disparity information from the disparity histogram, the extracting including the following: where the histogram indicates a maximum-vote disparity range and an adjacent, runner-up disparity range, calculating a weighted average disparity value based on the ratio between the number of votes for each of the adjacent disparity ranges.

In another practice of the invention, the feature correspondence function comprises weighting toward a center pixel in a Sum of Squared Differences (SSD) approach, wherein the weighting includes applying a higher weight to the center pixel for which a disparity solution is sought, and a lesser weight outside the center pixel, the lesser weight being proportional to the distance of a given kernel sample from the center.

In another aspect, the feature correspondence function comprises optimizing generation of disparity values on GPGPU computing structures. Such GPGPU computing structures are commercially available, and are contained in commercially available forms of smartphones and tablet computers.

In one practice of the invention, generating a data representation includes generating a data structure representing 2D coordinates of a control point in image space, and containing a disparity value treated as a pixel velocity in screen space with respect to a given movement of a given view vector; and using the disparity value in combination with a movement vector to slide a pixel in a given source image in selected directions, in 2D, to enable a reconstruction of 3D image movement.

In another aspect of the invention, each camera generates a respective camera stream; and the data structure representing 2D coordinates of a control point further contains a sample buffer index, stored in association with the control point coordinates, which indicates which camera stream to sample in association with the given control point.

Another aspect includes determining whether a given pixel should be assigned a control point. A related practice of the invention includes assigning control points along image edges, wherein assigning control points along image edges comprises executing computations enabling identification of image edges.

In another practice of the invention, generating a data representation includes flagging a given image feature with a reference count indicating how many samples reference the given image feature, thereby to differentiate a uniquely referenced image features, and a sample corresponding to the uniquely referenced image feature, from repeatedly referenced image features; and, using the reference count, extracting unique samples, so as to enable a reduction in bandwidth requirements.

In a further aspect, generating a data representation further includes using the reference count to encode and transmit a given sample exactly once, even if a pixel or image feature corresponding to the sample is repeated in multiple camera views, so as to enable a reduction in bandwidth requirements.

Yet another aspect of the invention includes estimating a location of the first user's head or eyes, thereby generating tracking information; wherein the reconstructing of a synthetic view of the second user comprises reconstructing the synthetic view based on the generated data representation and the generated tracking information; and wherein 3D image reconstruction is executed by warping a 2D image by utilizing the control points, by sliding a given pixel along a head movement vector at a displacement rate proportional to disparity, based on the tracking information and disparity values.

In another aspect, the disparity values are acquired from the feature correspondence function or from a control point data stream.

In another practice of the invention, reconstructing a synthetic view comprises utilizing the tracking information to control a 2D crop box, such that the synthetic view is reconstructed based on the view origin, and then cropped and scaled so as to fill the first user's display screen view window; and the minima and maxima of the crop box are defined as a function of the first user's head location with respect to the display screen, and the dimensions of the display screen view window.

In a further aspect, reconstructing a synthetic view comprises executing a 2D warping reconstruction of a selected view based on selected control points, wherein the 2D warping reconstruction includes designating a set of control points, respective control points corresponding to respective, selected pixels in a source image; sliding the control points in selected directions in 2D space, wherein the control points are slid proportionally to respective disparity values; and interpolating data values for pixels between the selected pixels corresponding to the control points; so as to create a synthetic view of the image from a selected new perspective in 3D space.

The invention can thither include rotating the source image and control point coordinates such that rows or columns of image pixels are parallel to the vector between the original source image center and the new view vector defined by the selected new perspective.

A related practice of the invention further includes rotating the source image and control point coordinates so as to align the view vector to image, scanlines; iterating through each scanline and each control point for a given scanline, generating a line element beginning and ending at each control point in 2D image space, with the addition of the corresponding disparity value multiplied by the corresponding view vector magnitude with the corresponding x-axis coordinate; assigning a texture coordinate to the beginning and ending points of each generated line element, equal to their respective, original 2D location in the source image; and interpolating texture coordinates linearly along each line element; thereby to create a resulting image in which image data between the control points is linearly stretched.

The invention can also include rotating the resulting image back by the inverse of the rotation applied to align the view vector with the scanlines.

Another practice of the invention includes linking the control points between scanlines, as well as along scanlines, to create polygon elements defined by the control points, across which interpolation is executed.

In another aspect of the invention, reconstructing a synthetic view further comprises, for a given source image, selectively sliding image foreground and image background independently of each other. In a related aspect, sliding is utilized in regions of large disparity or depth change.

In another practice of the invention, a determination of whether to utilize sliding includes evaluating a disparity histogram to detect multi-modal behavior indicating that a given control point is on an image boundary for which allowing foreground and background to slide independent of each other presents a better solution than interpolating depth between foreground and background; wherein the disparity histogram functions as a Probability Density Function (PDF) of disparity for a given pixel, in which higher values indicate a higher probability of the corresponding disparity range being valid for the given pixel.

In yet another aspect of the invention, reconstructing a synthetic view includes using at least one Sample Integration Function Table (SIFT), the SIFT comprising a table of sample integration functions for one or more pixels in a desired output resolution of an image to be displayed to the user, wherein a given sample integration function maps an input view origin vector to at least one known, weighted 21) image sample location in at least one input image buffer.

In another aspect, displaying the synthetic view to the first user on a display screen used by the first user includes displaying the synthetic view to the first user on a 2D display screen; and updating the display in real-time, based on the tracking information, so that the display appears to the first user to be a window into a 3D scene responsive to the first user's head or eye location.

Displaying the synthetic view to the first user on a display screen used by the first user can include displaying the synthetic view to the first user on a binocular stereo display device; or, among other alternatives, on a lenticular display that enables auto-stereoscopic viewing.

One aspect of the present invention relates to methods, systems and computer software/program code products that facilitate self-portraiture of a user utilizing a handheld device to take the self-portrait, the handheld mobile device having a display screen for displaying images to the user. This aspect includes providing at least one camera around the periphery of the display screen, the at least one camera having a view of the users face at a self portrait setup time during which the user is setting up the self-portrait; capturing images of the user during the setup time, utilizing the at least one camera around the periphery of the display screen; estimating a location of the user's head or eyes relative to the handheld device during the setup time, thereby generating tracking information; generating a data representation, representative of the captured images; reconstructing a synthetic view of the user, based on the generated data representation and the generated tracking information; displaying to the user, on the display screen during the setup time, the synthetic view of the user; thereby enabling the user, while setting up the self-portrait, to selectively orient or position his gaze or head, or the handheld device and its camera, with realtime visual feedback.

In another aspect of the invention, the capturing, estimating, generating, reconstructing and displaying are executed such that, in the self-portrait, the user can appear to be looking directly into the camera, even if the camera does not have a direct eye contact gaze vector to the user.

One aspect of the present invention relates to methods, systems and computer software/program code products that facilitate composition of a photograph of a scene, by a user utilizing a handheld device to take the photograph, the handheld device having a display screen on a first side for displaying images to the user, and at least one camera on a second, opposite side of the handheld device, for capturing images. This aspect includes capturing images of the scene, utilizing the at least one camera, at a photograph setup time during which the user is setting up the photograph; estimating a location of the user's head or eyes relative to the handheld device during the setup time, thereby generating tracking information; generating a data representation, representative of the captured images; reconstructing a synthetic view of the scene, based on the generated data representation and the generated tracking information, the synthetic view being reconstructed such that the scale and perspective of the synthetic view has a selected correspondence to the user's viewpoint relative to the handheld device and the scene; and displaying to the user, on the display screen during the setup time, the synthetic view of the scene; thereby enabling the user, while setting up the photograph, to frame the scene to be photographed, with selected scale and perspective within the display frame, with realtime visual feedback.

In another aspect of the invention, the user can control the scale and perspective of the synthetic view by changing the position of the handheld device relative to the position of the users head.

In another practice of the invention, estimating a location of the user's head or eyes relative to the handheld device includes using at least one camera on the first, display side of the handheld device, having a view of user's head or eyes during photograph setup time.

The invention enables the features described herein to be provided in a manner that fits within the form factors of modern mobile devices such as tablets and smartphones, as well as the form factors of laptops, PCs, computer-driven televisions, computer-driven projector devices, and the like, does not dramatically alter the economics of building such devices, and is viable within current or near current communications network/connectivity architectures.

One aspect of the present invention relates to methods, systems and computer software/program code products for displaying images to a user utilizing a binocular stereo head-mounted display (HMD). This aspect includes capturing at least two image streams using at least one camera attached or mounted on or proximate to an external portion or surface of the HMD, the captured image streams containing images of a scene; generating a data representation, representative of captured images contained in the captured image streams; reconstructing two synthetic views, based on the representation; and displaying the synthetic views to the user, via the HMD; the reconstructing and displaying being executed such that each of the synthetic views has a respective view origin corresponding to a respective virtual camera location, wherein the respective view origins are positioned such that the respective virtual camera locations coincide with respective locations of the user's left and right eyes, so as to provide the user with a substantially natural visual experience of the perspective, binocular stereo and occlusion aspects of the scene, substantially as if the user were directly viewing the scene without an HMD.

Another aspect of the present invention relates to methods, systems and computer software/program code products for capturing and displaying image content on a binocular stereo head-mounted display (HMD). The image content can include pre-recorded image content, which can be stored, transmitted, broadcast, downloaded, streamed or otherwise made available. This aspect includes capturing or generating at least two image streams using at least one camera, the captured image streams containing images of a scene; generating a data representation, representative of captured images contained in the captured image streams; reconstructing two synthetic views, based on the representation; and displaying the synthetic views to a user, via the HMD; the reconstructing and displaying being executed such that each of the synthetic views has a respective view origin corresponding to a respective virtual camera location, wherein the respective view origins are positioned such that the respective virtual camera locations coincide with respective locations of the user's left and right eyes, so as to provide the user with a substantially natural visual experience of the perspective, binocular stereo and occlusion aspects of the scene, substantially as if the user were directly viewing the scene without an HMD.

In another aspect, the data representation can be pre-recorded, and stored, transmitted, broadcast, downloaded, streamed or otherwise made available.

Another aspect of the invention includes tracking, the location or position of the user's head or eyes to generate a motion vector usable in the reconstructing of synthetic views. The motion vector can be used to modify the respective view origins, during the reconstructing of synthetic views, so as to produce intermediate image frames to be interposed between captured image frames in the captured image streams; and interposing the intermediate image frames between the captured image frames so as to reduce apparent latency.

In another aspect, at least one camera is a panoramic camera, night-vision camera, or thermal imaging camera.

One aspect of the invention relates to methods, systems and computer software/program code products for generating an image data stream for use by a control system of an autonomous vehicle. This aspect includes capturing images of a scene around at least a portion of the vehicle, the capturing comprising utilizing at least one camera having a view of the scene; executing a feature correspondence function by detecting common features between corresponding images captured by the at least one camera and measuring a relative distance in image space between the common features, to generate disparity values; calculating corresponding depth information based on the disparity values; and generating from the images and corresponding depth information an image data stream for use by the control system. The capturing can include capturing comprises utilizing at least two cameras, each having a view of the scene; and executing a feature correspondence function comprises detecting common features between corresponding images captured by the respective cameras.

Alternatively, the capturing can include using a single camera having a view of the scene; and executing a feature correspondence function comprises detecting common features between sequential images captured by the single camera over time and measuring a relative distance in image space between the common features, to generate disparity values.

One aspect of the present invention relates to methods, systems and computer software/program code products that enable video capture and processing, including: (1) capturing images of a scene, the capturing comprising utilizing at least first and second cameras having a view of the scene, the cameras being arranged along an axis to configure a stereo camera pair having a camera pair axis; and (2) executing a feature correspondence function by detecting common features between corresponding images captured by the respective cameras and measuring a relative distance in image space between the common features, to generate disparity values, wherein the feature correspondence function comprises; constructing a multi-level disparity histogram indicating the relative probability of a given disparity value being correct for a given pixel, the constructing of a multi-level disparity histogram comprising: executing a Fast Dense Disparity Estimate (FDDE) image pattern matching operation on successively lower-frequency downsampled versions of the input stereo images, the successively lower-frequency downsampled versions constituting a set of levels of FDDE histogram votes. In this aspect of the invention, each level can be assigned a level number, and each successively higher level can be characterized by a lower image resolution. In one aspect, the downsampling can include reducing image resolution via low-pass filtering. In another aspect, the downsampling can include using a weighted summation of a kernel in level [n−1] to produce a pixel value in level [n], and the normalized kernel center position remains the same across all levels.

In one aspect of the invention, for a given desired disparity solution at full image resolution, the FDDE votes for every image level are included, in the disparity solution.

Another aspect of the invention includes generating a multi-level histogram comprising a set of initially independent histograms at different levels of resolution. In a related aspect, each histogram bin in a given level represents votes for a disparity determined by the FDDE at that level. In another related aspect, each histogram bin in a given level has an associated disparity uncertainty range, and the disparity uncertainty range represented by each histogram bin is a selected multiple wider than the disparity uncertainty range of a bin in the preceding level.

A further aspect of the invention includes applying a sub-pixel shift to the disparity values at each level during downsampling, to negate rounding error effect. In a related aspect, applying a sub-pixel shift comprises applying a half pixel shift to only one of the images in a stereo pair at each level of downsampling. In a further aspect, applying a sub-pixel shift is implemented inline, within the weights of the filter kernel utilized to implement the downsampling from level to level.

Another aspect of the invention includes executing histogram integration, the histogram integration comprising: executing a recursive summation across all the FDDE levels. A related aspect includes, during summation, modifying the weighting of each level to control the amplitude of the effect of lower levels in overall voting, by applying selected weighting coefficients to selected levels.

Yet another aspect of the invention includes inferring a sub-pixel disparity solution from the disparity histogram, by calculating a sub-pixel offset based on the number of votes for the maximum vote disparity range and the number of votes for an adjacent, runner-up disparity range. In a related aspect, a summation stack can be maintained in a memory unit.

One aspect of the present invention relates to methods, systems and computer software/program code products that enable capturing of images using at least two stereo camera pairs, each pair being arranged along a respective camera pair axis, and for each camera pair axis: executing image capture utilizing the camera pair to generate image data; executing rectification and undistorting transformations to transform the image data into RUD image space; iteratively downsampling to produce multiple, successively lower resolution levels; executing FDDE calculations for each level to compile FDDE votes for each level; gathering FDDE disparity range votes into a multi-level histogram; determining the highest ranked disparity range in the multi-level histogram; and processing the multi-level histogram disparity data to generate a final disparity result.

One aspect of the present invention relates to methods, systems and computer software/program code products that enable video capture and processing, including: (1) capturing images of a scene, the capturing comprising utilizing at least first and second cameras having a view of the scene, the cameras being arranged along an axis to configure a stereo camera pair; and (2) executing a feature correspondence function by detecting common features between corresponding images captured by the respective cameras and measuring a relative distance in image space between the common features, to generate disparity values, the feature correspondence function further comprising: generating a disparity solution based on the disparity values; and applying an infective constraint to the disparity solution based or domain and co-domain, wherein the domain comprises pixels for a given image captured by the first camera and the co-domain comprises pixels for a corresponding image captured by the second camera, to enable correction of error in the disparity solution in response to violation of the injective constraint, wherein the injective constraint is that no element in the co-domain is referenced more than once by elements in the domain.

In a related aspect, applying an infective constraint comprises: maintaining a reference count for each pixel in the co-domain, and checking whether the reference count for the pixels in the co-domain exceeds "1", and if the count exceeds "1" then designating a violation and responding to the violation with a selected error correction approach. In another related aspect, the selected error correction approach can include any of (a) first conic, first served. (h) best match wins, (c) smallest disparity wins, or (d) seek alternative candidates. The first come, first served approach can include assigning priority to the first element in the domain to claim an element in the co-domain, and if a second element in the domain claims the same co-domain element, invalidating that subsequent match and designating that subsequent match to be invalid. The best match win approach can include: comparing the actual image matching error or corresponding histogram vote count between the two possible candidate elements in the domain against the contested element in the co-domain, and designating as winner the domain candidate with the best match. The smallest disparity wins approach can include: if there is a contest between candidate elements in the domain for a given co-domain element, wherein each candidate element has a corresponding disparity, selecting the domain candidate with the smallest disparity and designating as invalid the others. The seek alternative candidates approach can include: selecting and testing the next best domain candidate, based on a selected criterion, and iterating the selecting and testing until the violation is eliminated or a computational time limit is reached.

One aspect of the present invention relates to methods, systems and computer software/program code products that enable video capture in which a first user is able to view a second user with direct virtual eye contact with the second user, including: (1) capturing images of the second user, the capturing comprising utilizing at least one camera having a view of the second user's face; (2) executing a feature correspondence function by detecting common features between corresponding images captured by the at least one camera and measuring a relative distance in image space between the common features, to generate disparity values; (3) generating a data representation, representative of the captured images and the corresponding disparity values; (4) estimating a three-dimensional (3D) location of the first users head, face or eyes, thereby generating tracking information; and (5) reconstructing a synthetic view of the second user, based on the representation, to enable a display to the first user of a synthetic view of the second user in which the second user appears to be gazing directly at the first user, wherein the reconstructing of a synthetic view of the second user comprises reconstructing the synthetic view based on the generated data representation and the generated tracking information; and wherein the location estimating comprises: (a) passing a captured image of the first user, the captured image including the first user's head and face, to a two-dimensional (2D) facial feature detector that utilizes the image to generate a first estimate of head and eye location and a rotation angle of the face relative to an image plane; (b) utilizing an estimated center-of-face position, face rotation angle, and head depth range based on the first estimate, to determine a best-fit rectangle that includes the head; (c) extracting from the best-fit rectangle all 3D points that lie within the best-fit rectangle, and calculating therefrom a representative 3D head position; and (d) if the number of valid 3D points extracted from the best-fit rectangle exceeds a selected threshold in relation to the maximum number of possible 3D points in the region, then signaling a valid 3D head position result.

In a related aspect, the location estimating includes (1) determining, from the first estimate of head and eye location and face rotation angle, an estimated center-of-face position; (2) determining an average depth value for the face by extracting three-dimensional (3D) points via the disparity values for a selected, small area located around the estimated center-of-face position; (3) utilizing; the average depth value to determine a depth range that is likely to encompass the entire head; (4) utilizing the estimated center-of-face position, face rotation angle, and depth range to execute a 2D ray march to determine a best-fit rectangle that includes the head; (5) calculating, for both horizontal and vertical axes, vectors that are perpendicular to each respective axis but spaced at different intervals; (6) for each of the calculated vectors, testing the corresponding 3D points starting from a position outside the head region and working inwards, to the horizontal or vertical axis; (7) when a 3D point is encountered that falls within the determined depth range, denominating that point as a valid extent of a best-fit head rectangle; (8) from each ray march along each axis, determining a best-fit rectangle for the head, and extracting therefrom all 3D points that lie within the best-fit rectangle, and calculating therefrom a weighted average; and (9) if the number of valid 3D points extracted from the best-fit rectangle exceed a selected threshold in relation to the maximum number of possible 3D points in the region, then signaling a valid 3D head position result.

A related aspect of the invention includes downsampling the captured image before passing it to the 2D facial feature detector. Another aspect includes interpolating image data from video frame to video frame, based on the time that has passed from a given video frame from a previous video frame. Another aspect includes converting image data to luminance values.

One aspect of the present invention relates to methods, systems and computer software/program code products that enable video capture and processing, including: (1) capturing images of a scene, the capturing comprising utilizing at least duce cameras having a view of the scene, the cameras being arranged in a substantially "L"-shaped configuration wherein a first pair of cameras is disposed along a first axis and second pair of cameras is disposed along a second axis intersecting with, but angularly displaced from, the first axis, wherein the first and second pairs of cameras share a common camera at or near the intersection of the first and second axis, so that the first and second pairs of cameras represent respective first and second independent stereo axes that share a common camera; (2) executing a feature correspondence function by detecting common features between corresponding images captured by the at least three cameras and measuring a relative distance in image space between the common features, to generate disparity values; (3) generating a data representation, representative of the captured images and the corresponding disparity values; and (4) utilizing an unrectified, undistorted (URUD) image space to integrate disparity data for pixels between the first and second stereo axes, thereby to combine disparity data from the first and second axes, wherein the URUD space is an image space in which polynomial lens distortion has been removed from the image data but the captured image remains unrectified.

A related aspect includes executing a stereo correspondence operation on the image data in a rectified, undistorted (RUD) image space, and storing resultant disparity data in a RUD space coordinate system. In another aspect, the resultant disparity data is stored in a URUD space coordinate system. Another aspect includes generating disparity histograms from the disparity data in either RUD or URUD space, and storing the disparity histograms in a unified URUD space coordinate system. A further aspect include applying a URUD to RUD coordinate transformation to obtain per-axis disparity values.

One aspect of the present invention relates to methods, systems and computer software/program code products that enable video capture and processing, including (1) capturing images of a scene, the capturing comprising utilizing at least one camera having a view of the scene; (2) executing a feature correspondence function by detecting common features between corresponding images captured by the at least one camera and measuring a relative distance in image space between the common features, to generate disparity values; and (3) generating a data representation, representative of the captured images and the corresponding disparity values; wherein the feature correspondence function utilizes a disparity histogram-based method of integrating data and determining correspondence, the disparity histogram-based method comprising: (a) constructing a disparity histogram indicating the relative probability of a given disparity value being correct for a given pixel; and (b) optimizing generation of disparity values on a GPU computing structure, the optimizing comprising: generating, in the GPU computing structure, a plurality of output pixel threads; and, for each output pixel thread, maintaining a private disparity histogram, in a storage element associated with the GPU computing structure and physically proximate to the computation units of the GPU computing structure.

In a related aspect, the private disparity histogram is stored such that each pixel thread writes to and reads from the corresponding private disparity histogram on a dedicated portion of shared local memory in the GPU. In another related aspect, shared local memory in the GPU is organized at least in part into memory words; the private disparity histogram is characterized by a series of histogram bins indicating the number of votes for a given disparity range; and if a maximum possible number of votes in the private disparity histogram is known, multiple histogram bins can be packed into a single word of the shared local memory, and accessed using bitwise GPU access operations.

One aspect of the invention includes a program product for use with a digital processing system, for enabling image capture and processing, the digital processing system comprising at least first and second cameras having a view of a scene, the cameras being arranged along an axis to configure a stereo camera pair having a camera pair axis, and a digital processing resource comprising at least one digital processor, the program product comprising digital processor-executable program instructions stored on a non-transitory digital processor-readable medium, which when executed in the digital processing resource cause the digital processing resource to: (1) capture images of the scene, utilizing the at least first and second cameras; and (2) execute a feature correspondence function by detecting common features between corresponding images captured by the respective cameras and measuring a relative distance in image space between the common features, to generate disparity values, wherein the feature correspondence function comprises: constructing a multi-level disparity histogram indicating the relative probability of a given disparity value being correct for a given pixel, the constructing of a multi-level disparity histogram comprising: executing a Fast Dense Disparity Estimate (FDDE) image pattern matching operation on successively lower-frequency downsampled versions of the input stereo images, the successively lower-frequency downsampled versions constituting a set of levels of FDDE histogram votes.

In another aspect of the invention the digital processing system comprises at least two stereo camera pairs, each pair being arranged along a respective camera pair axis, and the digital processor-executable program instructions further comprise instructions which when executed in the digital processing resource cause the digital processing resource to execute, for each camera pair axis, the following: (1) image capture utilizing the camera pair to generate image data; (2) rectification and undistorting transformations to transform the image data into RUD image space; (3) iteratively downsample to produce multiple, successively lower resolution levels; (4) execute FDDE calculations for each level to compile FDDE votes for each level; (5) gather FDDE disparity range votes into a multi level histogram; (6) determine the highest ranked disparity range in the multi-level histogram; and (7) process the multi-level histogram disparity data to generate a final disparity result.

Another aspect of the invention includes a program product for use with a digital processing system, the digital processing system comprising at least first and second cameras having a view of a scene, the cameras being arranged along an axis to configure a stereo camera pair having a camera pair axis, and a digital processing resource comprising at least one digital processor, the program product comprising digital processor-executable program instructions stored on a non-transitory digital processor-readable medium, which when executed in the digital processing resource cause the digital processing resource to: (1) capture images of the scene, utilizing the at least first and second cameras; and (2) execute a feature correspondence function by detecting common features between corresponding images captured by the respective cameras and measuring a relative distance in image space between the common features, to generate disparity values, wherein the feature correspondence function comprises: (a) generating a disparity solution based on the disparity values; and (b) applying an injective constraint to the disparity solution based on domain and co-domain, wherein the domain comprises pixels for a given image captured by the first camera and the co-domain comprises pixels for a corresponding image captured by the second camera, to enable correction of error in the disparity solution in response to violation of the injective constraint, wherein the injective constraint is that no element in the co-domain is referenced more than once by elements in the domain. In a related aspect, the digital processor-executable program instructions further comprise instructions which when executed in the digital processing resource cause the digital processing resource to: maintain a reference count for each pixel in the co-domain, and check whether the reference count for the pixels in the co-domain exceeds "1", and if the count exceeds "1" then designate a violation and responding to the violation with a selected error correction approach.

Another aspect of the invention includes a program product for use with a digital processing system, for enabling a first user to view a second user with direct virtual eye contact with the second user, the digital processing system comprising at least one camera having a view of the second user's face, and a digital processing resource comprising at least one digital processor, the program product comprising digital processor-executable program instructions stored on a non-transitory digital processor-readable medium, which when executed in the digital processing resource cause the digital processing resource to: (1) capture images of the second user, utilizing, the at least one camera; (2) execute a feature correspondence function by detecting common features between corresponding images captured by the at least one camera and measuring a relative distance in image space between the common features, to generate disparity values; (3) generate a data representation, representative of the captured images and the corresponding disparity values; (4) estimate a three-dimensional (3D) location of the first user's head, face or eyes, thereby generating tracking information; and (5) reconstruct a synthetic view of the second user, based on the representation, to enable a display to the first user of a synthetic view of the second user in which the second user appears to be gazing directly at the first user, wherein the reconstructing of a synthetic view of the second user comprises reconstructing the synthetic view based on the generated data representation and the generated tracking information; wherein the 3D location estimating comprises: (a) passing a captured image of the first user, the captured image including the first user's head and face, to a two-dimensional (2D) facial feature detector that utilizes the image to generate a first estimate of head and eye location and a rotation angle of the face relative to an image plane; (b) utilizing an estimated center-of-face position, face rotation angle, and head depth range based on the first estimate, to determine a best-fit rectangle that includes the head; (c) extracting from the best-fit rectangle all 3D points that lie within the best-fit rectangle, and calculating therefrom a representative 3D head position; and (d) if the number of valid 3D points extracted from the best-fit rectangle exceeds a selected threshold in relation to the maximum number of possible 3D points in the region, then signaling a valid 3D head position result.

Yet another aspect of the invention includes a program product for use with a digital processing system, for enabling capture and processing of images of a scene, the digital processing system comprising (i) at least three cameras having a view of the scene, the cameras being arranged in a substantially "L"-shaped configuration wherein a first pair of cameras is disposed along a first axis and second pair of cameras is disposed along a second axis intersecting with, but angularly displaced from, the first axis, wherein the first and second pairs of cameras share a common camera at or near the intersection of the first and second axis, so that the first and second pairs of cameras represent respective first and second independent stereo axes that share a common camera, and (ii) a digital processing resource comprising at least one digital processor, the program product comprising digital processor-executable program instructions stored on a non-transitory digital processor-readable medium, which when executed in the digital processing resource cause the digital processing resource to: (1) capture images of the scene, utilizing the at least three cameras; (2) execute a feature correspondence function by detecting common features between corresponding images captured by the at least three cameras and measuring a relative distance in image space between the common features, to generate disparity values; (3) generate a data representation, representative of the captured images and the corresponding disparity values; and (4) utilize an unrectified, undistorted (URUD) image space to integrate disparity data for pixels between the first and second stereo axes, thereby to combine disparity data from the first and second axes, wherein the URUD space is an image space in which polynomial lens distortion has been removed from the image data but the captured image remains unrectified. In a related aspect of the invention, the digital processor-executable program instructions further comprise instructions which when executed in the digital processing resource cause the digital processing resource to execute a stereo correspondence operation on the image data in a rectified, undistorted (RUD) image space, and store resultant disparity data in a RUD space coordinate system.

Another aspect of the inventor includes a program product for use with a digital processing system, for enabling image capture and processing, the digital processing system comprising at least one camera having a view of a scene, and a digital processing resource comprising at least one digital processor, the program product comprising digital processor-executable program instructions stored on a non-transitory digital processor-readable medium, which when executed in the digital processing resource cause the digital processing resource to: (1) capture images of the scene, utilizing the at least one camera; (2) execute a feature correspondence function by detecting common features between corresponding images captured by the at least one camera and measuring a relative distance in image space between the common features, to generate disparity values; and (3) generate a data representation, representative of the captured images and the corresponding disparity values; wherein the feature correspondence function utilizes a disparity histogram-based method of integrating data and determining correspondence, the disparity histogram-based method comprising: (a) constructing a disparity histogram indicating the relative probability of a given disparity value being correct for a given pixel; and (b) optimizing generation of disparity values on a GPU computing structure, the optimizing comprising: generating, in the GPU computing structure, a plurality of output pixel threads; and for each output pixel thread, maintaining a private disparity histogram, in a storage element associated with the GPU computing structure and physically proximate to the computation units of the GPU computing structure.

One aspect of the invention includes a digital processing system for enabling a first user to view a second user with direct virtual eye contact with the second user, the digital processing system, comprising: (1) at least one camera having a view of the second user's face; (2) a display screen for use by the first user; and (3) a digital processing resource comprising at least one digital processor, the digital processing resource being operable to: (a) capture images of the second user, utilizing the at least one camera; (b) generate a data representation, representative of the captured images; (c) reconstruct a synthetic view of the second user, based on the representation; and (d) display the synthetic view to the first user on the display screen for use by the first user; the capturing, generating, reconstructing and displaying being executed such that the first user can have direct virtual eye contact with the second user through the first user's display screen, by the reconstructing and displaying of a synthetic view of the second user in which the second user appears to be gazing directly at the first user, even if no camera has a direct eye contact gaze vector to the second user.

Another aspect of the invention includes a digital processing system for enabling a first user to view a remote scene with the visual impression of being present with respect to the remote scene, the digital processing system comprising: (1) at least two cameras, each having a view of the remote scene; (2) a display screen for use by the first user; and (3) a digital processing resource comprising at least one digital processor, the digital processing resource being operable to: (a) capture images of the remote scene, utilizing, the at least two cameras; (b) execute a feature correspondence function by detecting common features between corresponding images captured by the respective cameras and measuring a relative distance in image space between the common features, to generate disparity values; (c) generate a data representation, representative of the captured images and the corresponding disparity values; (d) reconstruct a synthetic view of the remote scene, based on the representation; and (e) display the synthetic view to the first user on the display screen; the capturing, detecting, generating, reconstructing and displaying being executed such that: the first user is provided the visual impression of looking through his display screen as a physical window to the remote scene, and the first user is provided an immersive visual experience of the remote scene.

Another aspect of the invention includes a system operable in a handheld digital processing device, for facilitating self-portraiture of a user utilizing the handheld device to take the self portrait, the system comprising: (1) a digital processor; (2) a display screen for displaying images to the user; and (3) at least one camera around the periphery of the display screen, the at least one camera having a view of the user's face at a self portrait setup time during which the user is setting up the self portrait; the system being operable to: (a) capture images of the user during the setup time, utilizing the at least one camera around the periphery of the display screen; (b) estimate a location of the user's head or eyes relative to the handheld device during the setup time, thereby generating tracking information; (c) generate a data representation, representative of the captured images; (d) reconstruct a synthetic view of the user, based on the generated data representation and the generated tracking information; and (C) display to the user, on the display screen during the setup time, the synthetic view of the user; thereby enabling the user, while setting up the self-portrait, to selectively orient or position his gaze or head, or the handheld device and its camera, with realtime visual feedback.

One aspect of the invention includes a system operable in a handheld digital processing device, for facilitating composition of a photograph of a scene by a user utilizing the handheld device to take the photograph, the system comprising: (1) a digital processor; (2) a display screen on a first side of the handheld device for displaying images to the user; and (3) at least one camera on a second; opposite side of the handheld device, for capturing images; the system being operable to; (a) capture images of the scene, utilizing the at least one camera, at a photograph setup time during which the user is setting up the photograph; (b) estimate a location of the user's head or eyes relative to the handheld device during the setup time, thereby generating tracking information; (e) generate a data representation, representative of the captured images; (d) reconstruct a synthetic view of the scene, based on the generated data representation and the generated tracking information, the synthetic view being reconstructed such that the scale and perspective of the synthetic view has a selected correspondence to the user's viewpoint relative to the handheld device and the scene; and (e) display to the user, on the display screen during the setup time, the synthetic view of the scene; thereby enabling the user, while setting up the photograph, to frame the scene to be photographed, with selected scale and perspective within the display frame, with realtime visual feedback.

Another aspect of the invention includes a system for enabling display of images to a user utilizing a binocular stereo head-mounted display (HMD), the system comprising: (1) at least one camera attached or mounted on or proximate to an external portion or surface of the HMD; and (2) a digital processing resource comprising at least one digital processor; the system being operable to: (a) capture at least two image streams using the at least one camera, the captured image streams containing images of a scene; (b) generate a data representation, representative of captured images contained in the captured image streams; (c) reconstruct two synthetic views, based on the representation; and (d) display the synthetic views to the user, via the HMD; the reconstructing and displaying being executed such that each of the synthetic views has a respective view origin corresponding to a respective virtual camera location, wherein the respective view origins are positioned such that the respective virtual camera locations coincide with respective locations of the user's left and right eyes, so as to provide the user with a substantially natural visual experience of the perspective, binocular stereo and occlusion aspects of the scene, substantially as if the user were directly viewing the scene without an HMD.

Another aspect of the invention includes an image processing system for enabling the generation of an image data stream for use by a control system of an autonomous vehicle, the image processing system comprising: (1) at least one camera with a view of a scene around at least a portion of the vehicle; and (2) a digital processing resource comprising at least one digital processors, the system being operable to: (a) capture images of the scene around at least a portion of the vehicle, using the at least one camera; (b) execute a feature correspondence function by detecting common features between corresponding images captured by the at least one camera and measuring a relative distance in image space between the common features, to generate disparity values; (c) calculate corresponding depth information based on the disparity values; and (d) generate from the images and corresponding depth information an image data stream for use by the control system.

Another aspect of the invention includes generating a facial signature, based on images of a human user's or subject's face, for enabling accurate, reliable identification or authentication of a human subject or user of a system or resource, in a secure, difficult to forge manner. This aspect of the invention relates to methods, systems and computer software/program code products that enable generating a facial signature for use in identifying a given human user.

In accordance with this aspect, generating a facial signature includes capturing images of the user's face, using at least one camera having a view of the user's face, executing an image rectification function to compensate for optical distortion and alignment of the at least one camera; executing a feature correspondence function by detecting common features between corresponding images captured by the at least one camera and measuring a relative distance in image space between the common features, to generate disparity values and a feature correspondence data representation representative of the captured images and the corresponding disparity values; and utilizing the feature correspondence data representation to generate a facial signature data representation, the facial signature data representation being usable in accurately identifying the user or subject in a secure, difficult to forge manner.

The capturing can utilize at least two cameras, each having a view of the user's face; and the feature correspondence function can include detecting common features between corresponding images captured by the respective cameras. Alternatively, the capturing can utilize at least one camera having a view of the user's face and which is an infrared time-of-flight camera or structured light camera that directly provides depth information; and the feature correspondence data representation can be representative of the captured images and corresponding depth information.

In another aspect of the invention; the capturing utilizes a single camera having a view of the second user's face; and executing a feature correspondence function includes detecting common features between images captured by the single camera over time and measuring a relative distance in image space between the common features, to generate disparity values.

The identifying aspect of the invention uses stereo depth estimation to verify that human facial features are presented to the cameras at the correct distance ratios between the cameras at the correct distance ratios between the cameras or from the structured light or time-of-flight sensor. The identifying takes into account the actual 3D coordinates of facial features with respect to other facial features, and the feature correspondence function or depth detection function includes computing distances between facial features from multiple perspectives.

In one aspect of the invention, the facial signature is a combination of 3D facial contour information and a 2D image from one or more of the cameras. The 3D contour data can be stored in the facial signature data representation.

In another aspect, the facial signature is utilized as a security factor in an authentication system, either as the sole security factor or in combination with other security factors. The other security factors can include a passcode, a fingerprint or other biometric information.

In another aspect, the 3D facial contour data is combined with a 2D image from, one or more cameras in a conventional 2D face identification system to create a hybrid 3D/2D face identification system.

In another aspect, 3D facial contour data is used solely to confirm that a face having credible 3D human facial proportions was presented to the camera s at an overlapping spatial location of the captured 2D image.

A further aspect of the invention includes using a 2D bounding rectangle, defining the 2D extent of the face location, to limit search space and limit calculations to a region defined by the rectangle, thereby increasing speed of recognition and reducing, power consumption.

Still another aspect of the invention includes prompting the user to present multiple distinct facial poses or head positions, and utilizing a depth detection system to scan the multiple facial poses or head positions across a series of image frames, so as to increase protection against forgery of the facial signature.

In another aspect, generating a unique facial signature further includes executing a enrollment phase, which includes prompting the user to present to the cameras a plurality of selected head movements or positions, or a series of selected facial poses, and collecting image frames from a plurality of head positions or facial poses for use in generating the unique facial signature representative of the user.

In another aspect, the invention further includes a matching phase, which includes using the cameras to capture, over an interval of time, a plurality of frames of 3D and 2D data representative of the user's face; correlating the captured data with the facial signature generated during the enrollment phase, thereby to generate a probability of match score; and comparing the probability of match score with a selected threshold value, thereby to confirm or deny an identity match.

The enrollment phase can include generating an enrolled facial signature containing data corresponding to multiple image scans of a user's face, the multiple image scans corresponding to a plurality of the user's head positions or facial poses; and the matching phase can include requiring at least a minimum number of captured image frames corresponding to different facial or head positions matching the multiple scans within the enrolled signature.

Another aspect of the invention relates to generating a histogram based facial signature representation, whereby a facial signature is represented as one or more histograms obtained from a summation of per-pixel disparity histograms within the feature correspondence calculation, or generated from depth data from a sensor capable of directly perceiving depth. The histograms represent the normalized relative proportion of facial feature depths across a plane parallel to the user's face. The X-axis of the histogram represents a given disparity or depth range, and the Y-axis of the histogram represents the normalized count of image samples that fail within the given range.

In another aspect, during population of the histogram, a conventional 2D face detector provides a face rectangle and location of basic facial features, and only samples within the face rectangle are accumulated into the histogram.

Another aspect includes rejecting samples falling outside the statistical majority of samples within the face rectangle.

Another aspect includes projecting disparity and depth points into a canonical coordinate system defined by a plane constructed from the 3D coordinates of the basic facial features.

In yet another aspect of the invention, during the enrollment phase, a histogram is accumulated over multiple captured image frames over a period of time.

In another aspect, during the enrollment phase, each set of samples of the captured image frames undergoes an affine transform to lie on a common facial plane, to enable multiple samples of facial depth relationships to be accumulated into a histogram.

In another aspect, during the enrollment phase, multiple samples of facial depth relationships are accumulated into a histogram across a series of facial positions or poses.

In a further aspect of the invention, during the matching phase, a candidate histogram is accumulated over multiple captured image frames over a period of time.

In another aspect, during the matching phase, once a candidate histogram is accumulated, it is subtracted from a set of enrolled histograms to generate a vector distance constituting a degree-of-match score.

A further aspect of the invention includes comparing the degree-of-match score to a selected threshold to confirm or deny a match with each enrolled signature in a set of enrolled signatures.

In another aspect, the histogram representation is used in combination with conventional 2D face matching to provide an additional authentication factor.

In one practice of the invention, the facial signature is utilized as a factor in an authentication process in which a human subject or user of a system or resource is successfully authenticated if selected criteria are met, and the facial signature aspect further includes updating the facial signature on every successful match, or on every nth successful match, where n is a selected integer.

Another aspect of the invention includes a program product for use with a digital processing system, for generating a facial signature for use in identifying a human user or subject, the digital processing system comprising at least one camera having a view of the user's or subject's face, and a digital processing resource comprising at least one digital processor, the program product comprising digital processor-executable program instructions stored on a non-transitory digital processor-readable medium, which when executed in the digital processing resource cause the digital processing resource to: capture images of the user's or subject's face, utilizing the at least one camera; execute an image rectification function to compensate for optical distortion and alignment of the at least one camera; execute a feature correspondence function by detecting common features between corresponding images captured by the at least one camera and measuring a relative distance in image space between the common features, to generate disparity values and a feature correspondence data representation representative of the captured images and the corresponding disparity values; and utilize the feature correspondence data representation to generate a facial signature data representation, the facial signature data representation being usable to accurately identify the user or subject in a secure, difficult to forge manner.

The capturing can include using at least two cameras, each having a view of the user's or subject's face; and executing a feature correspondence function can include detecting common features between corresponding images captured by the respective cameras.

In another aspect, the capturing can include using at least one camera having a view of the user's or subject's face and which is an infra-red time-of-flight camera or structured light camera that directly provides depth information; and the feature correspondence data representation is representative of the captured images and corresponding depth information.

In another aspect, the capturing includes using a single camera having a view of the user's or subject's face; and executing a feature correspondence function includes detecting common features between images captured by the single camera over time and measuring a relative distance in image space between the common features, to generate disparity values.

In another aspect, the identifying of a human user or subject utilizes stereo depth estimation to verify that human facial features are presented to the cameras at the correct distance ratios between the cameras or from the structured light or time-of-flight sensor. The identifying can take into account the actual 3D coordinates of facial features with respect to other facial features.

Another aspect of the invention includes a digital processing system for generating a facial signature for use in identifying a human user or subject, the digital processing system comprising at least one camera having a view of the user's or subject's face, and a digital processing resource comprising at least one digital processor, the digital processing resource being operable to: capture images of the user's or subject's face, utilizing the at least one camera; execute art image rectification function to compensate for optical distortion and alignment of the at least one camera; execute a feature correspondence function by detecting common features between corresponding images captured by the at least one camera and measuring a relative distance in image space between the common features, to generate disparity values and a feature correspondence data representation representative of the captured images and the corresponding disparity values; and utilize the feature correspondence data representation to generate a facial signature data representation, the facial signature data representation being usable to accurately identify the user or subject in a secure, difficult to forge manner.

In another aspect of the invention, the system can include at least two cameras having a view of the user's or subject's face; the capturing can include utilizing the least two cameras; and executing a feature correspondence function can include detecting common features between corresponding images captured by the respective cameras.

In another aspect of the invention, the capturing includes using at least one camera having a view of the user's or subject's face and which is an infra-red time-of-flight camera or structured light camera that directly provides depth information; and the feature correspondence data representation is representative of the captured images and corresponding depth information.

In another aspect, the capturing includes utilizing a single camera having a view of the user's or subject's face; and executing a feature correspondence function includes detecting common features between images captured by the single camera over time and measuring a relative distance in image space between the common features, to generate disparity values.

In another aspect of the invention, the identifying of a human subject or user includes utilizing stereo depth estimation to verify that human facial features are presented to the cameras at the correct distance ratios between the cameras or from the structured light or time-of-flight sensor. The identifying can take into account the actual 3D coordinates of facial features with respect to other facial features.

These and other aspects, examples, embodiments and practices of the invention, whether in the form of methods, devices, systems or computer software/program code products, will be discussed in greater detail below in the following Detailed. Description of the Invention and in connection with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

FIGS. 9-11, 12A, 12B, 12C, 12D, 13-16, 17A, 17B, 17C, 18A, 18B, 18C and 18D are schematic diagrams illustrating exemplary practices of the invention.

FIGS. 20A, 20B, 21A, 21B, 22-28, 29A, 29B, 29C, 29D, 30A, 30B, 30C, 30D, 30E, and 31-45 are schematic diagrams illustrating exemplary practices of the invention.

FIGS. 55-64, 65A, 65B, 65C, 66, 67A, 67B, 68, 69A, 69B, and 70-80 are flowcharts depicting exemplary practices of the invention.

FIG. 82 is an example of an image of a human user or subject captured by at least one camera, and FIG. 83 is an example of a representation of image data, corresponding to the image of FIG. 82, processed in accordance with an exemplary practice of the invention.

FIGS. 85-88 are flowcharts depicting exemplary practices of the Facial Signature aspects of the invention.

DETAILED DESCRIPTION OF THE INVENTION

1. Overview

Introduction—V3D

Figure 1:
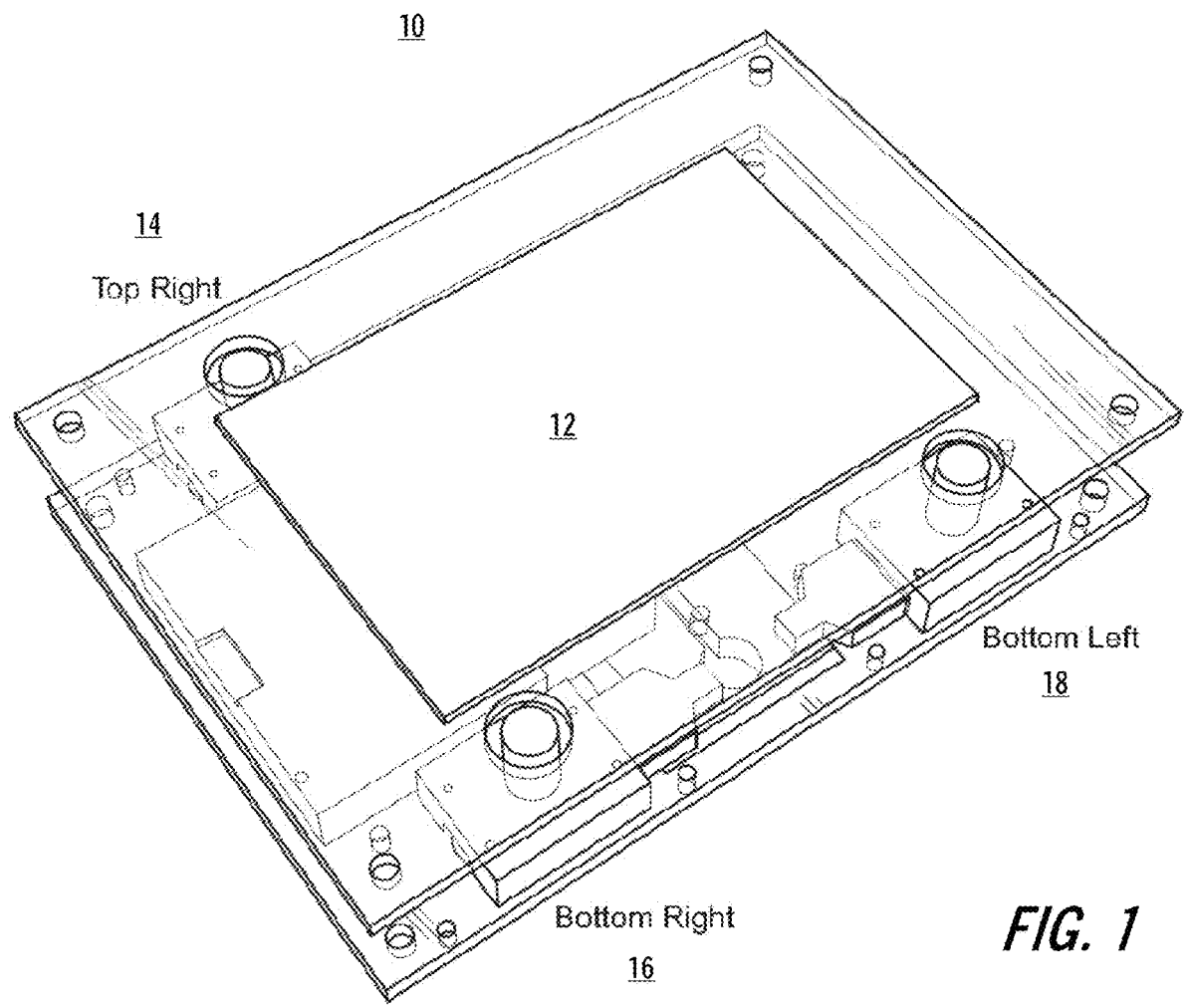
FIG. 1 shows a camera configuration useful in an exemplary practice of the invention.

Current video conferencing systems such as Apple's Facetime, Skype or Google Hangouts have a number of limitations which make the experience of each user's presence and environment significantly less engaging than being physically present on the other side. These limitations include (1) limited bandwidth between users, which typically results in poor video and audio quality; (2) higher than ideal latency between users (even if bandwidth is adequate, if latency is excessive, a first user's perception of the remote user's voice and visual actions will be delayed from when the remote user actually performed the action, resulting in difficult interaction between users; and (3) limited sensory engagement (of the five traditionally defined senses, even the senses of sight and sound are only partially served, and of course taste, smell and touch are unaccounted-for).

The first two issues can be addressed by using a higher performing network connection and will likely continue to improve as the underlying communications infrastructure improves. As for the third issue, the present invention, referred to herein as "V3D", aims to address and radically improve the visual aspect of sensory engagement in teleconferencing and other video capture settings, while doing so with low latency.

The visual aspect of conducing a video conference is conventionally achieved via a camera pointing at each user, transmitting the video stream captured by each camera, and then projecting the video stream(s) onto the two-dimensional (2D) display of the other user in a different location. Both users have a camera and display and thus is formed a full-duplex connection where both users can see each other and their respective environments.

The V3D of the present invention aims to deliver a significant enhancement to this particular aspect by creating a "portal" where each user would look "through" their respective displays as if there were a "magic" sheet of glass in a frame to the other side in the remote location. This approach enables a number of important improvements for the users (assuming a robust implementation:

1. Each user can form direct eye contact with the other.
 2. Each user can move his or her head in any direction and look through the portal to the other side. They can even look "around" and see the environment as if looking through a window,
 3. Device shaking is automatically corrected for since each user sees a view from their eye directly to the other side. Imagine if you looked through a window and shook the frame: there would be no change in the image seen through it.
 4. Object size will be accurately represented regardless of view distance and angle.

The V3D aspects of the invention can be configured to deliver these advantages in a manner that fits within the highly optimized form factors of today's modern mobile devices, does not dramatically alter the economics of building such devices, and is viable within the current connectivity performance levels available to most users.

By way of example of the invention, FIG. 1 shows a perspective view of an exemplary prototype device 10, which includes a display 12 and three cameras: a top right camera 14, and bottom right camera 16, and a bottom left camera 18. In connection with this example, there will next be described various aspects of the invention relating to the unique user experience provided by the V3D invention.

Overall User Experience

Communication (Including Video Conferencing) with Eye Contact

The V3D system of the invention enables immersive communication between people (and in various embodiments, between sites and places). In exemplary practices of the invention, each person can look "through" their screen and see the other place. Eye contact is greatly improved. Perspective and scale are matched to the viewer's natural view. Device shaking, is inherently eliminated. As described herein, embodiments of the V3D system can be implemented in mobile configurations as well as traditional stationary devices.

FIGS. 2A-B, 3A-B, and 5A-B are images illustrating an aspect of the invention, in which the V3D system is used in conjunction with a smartphone 20, or like device, Smartphone 20 includes a display 22, on which is displayed an image of a face 24. The image may be, for example, part of video/telephone conversation, in which a video image and sound conversation is being conducted with someone in a remote location, who is looking into the camera of their own smartphone.

Figure 2A:
FIGS. 2A, 2B, 3A, 3B, 4A, 4B, 5A, 5B, 6A and 6B are schematic diagrams illustrating exemplary practices of the invention.
Figure 2B:

FIGS. 2A and 2B illustrate a feature of the V3D system for improving eye contact. FIG. 2A shows the face image prior to correction. It will be seen that the woman appears to be looking down, so that there can be no eye contact with the other user or participant FIG. 1B shows the face image after correction. It will be seen that in the corrected image, the woman appears to be making eye contact with the smartphone user.

Figure 4A:
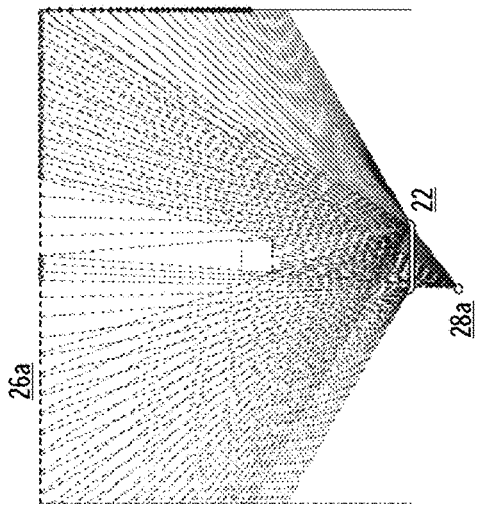
Figure 4B:
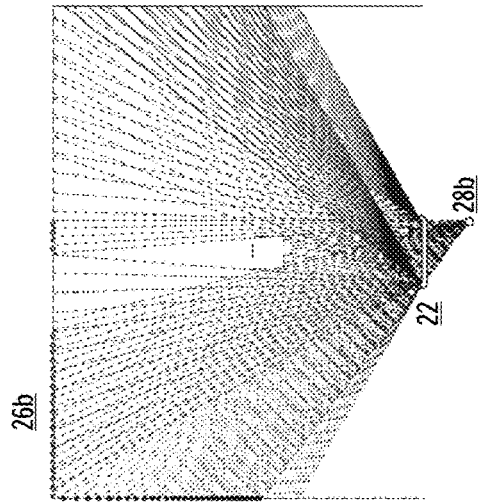
Figure 3A:
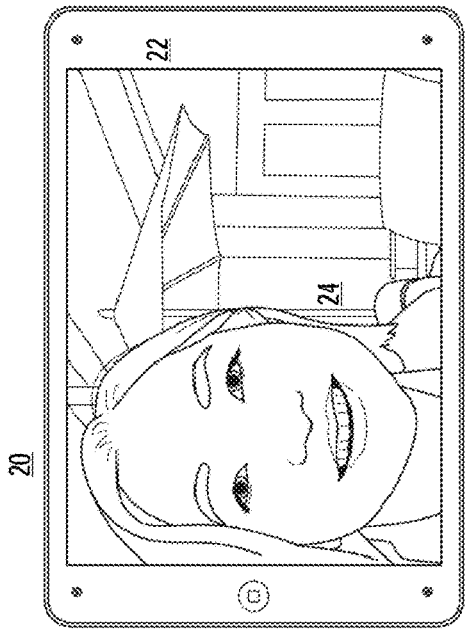
Figure 3B:
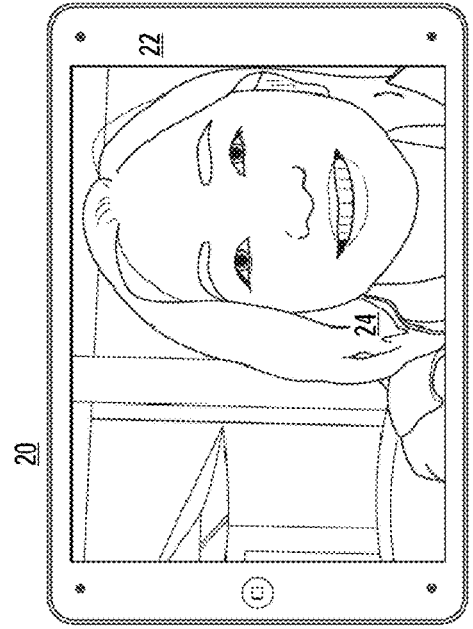

FIGS. 3A-3B are a pair of diagrams illustrating the V3D system's "move left" (FIG. 3A) and "move right" (FIG. 3B) corrections. FIGS. 4A-4B are a pair of diagrams of the light pathways 26a, 26b in the scene shown respectively on display 22 in FIGS. 3A-3B (shown from above, with the background at the top) leading from face 24 and surrounding objects to viewpoints 28a, 28b through the "window" defined by display 22.

Figure 6A:
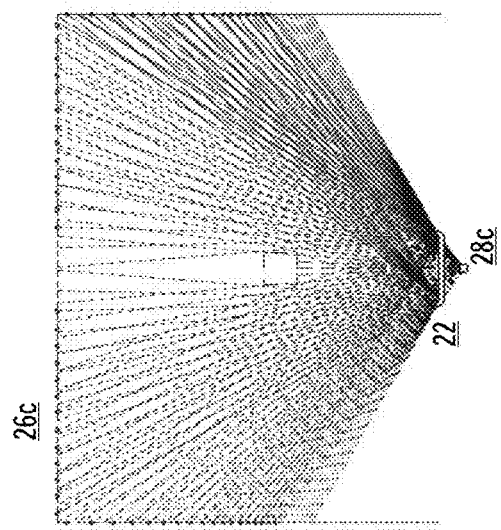
Figure 6B:
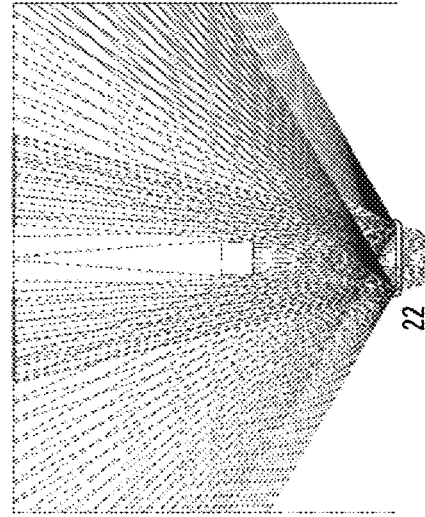
Figure 5A:
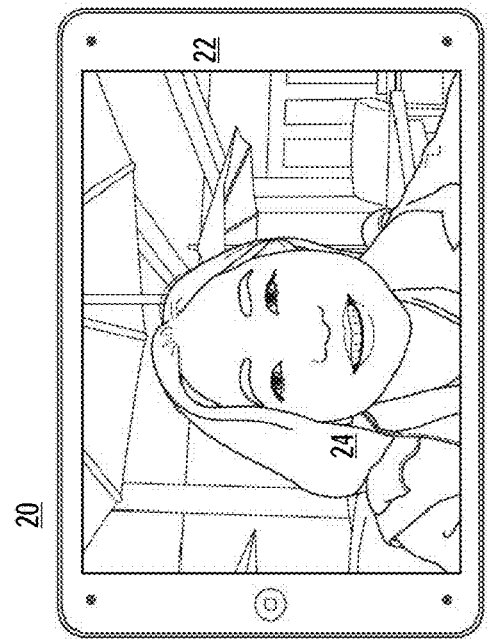
Figure 5B:
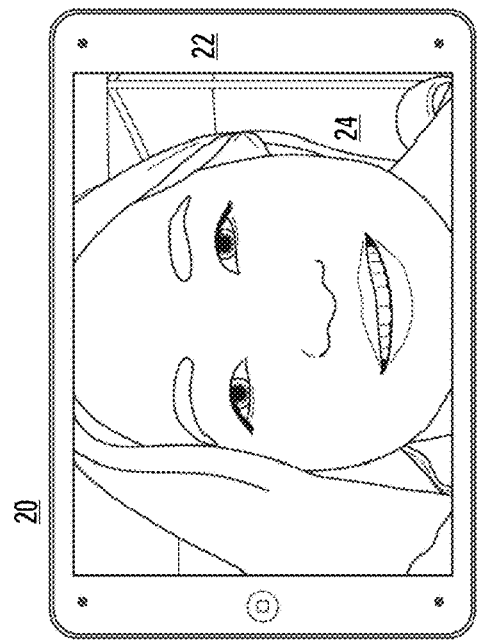

FIGS. 5A-5B are a pair of diagrams illustrating the VD system's "move in" (FIG. 5A) and "move out" (FIG. 5B) corrections. FIGS. 6A-6B are a pair of diagrams of the light pathways 26c, 26d in the scene shown respectively on display 22 in FIGS. 3A-3B (shown from above, with the background at the top) leading from face 24 and surrounding objects to viewpoints 28c, 28d through the "window" defined by display 22.

Self Portraiture Example

Another embodiment of the invention utilizes the invention's ability to synthesize a virtual camera view of the user to aid in solving the problem of "where to look" when taking a self-portrait on a mobile device. This aspect of the invention operates by image-capturing the user per the overall V3D method of the invention described herein, tracking the position and orientation of the user's face, eyes or head, and by using a display, presenting an image of the user back to themselves with a synthesized virtual camera viewpoint, as if the user were looking in a mirror.

Photography Composition

Another embodiment of the invention makes it easier to compose a photograph using a rear-facing camera on a mobile device. It works like the overall V3D method of invention described herein, except that the scene is captured through the rear-facing camera(s) and then, using the user's head location, a view is constructed such that the scale and perspective of the image matches the view of the user, such that the device display flame becomes like a picture frame. This results in a user experience where the photographer does not have to manipulate zoom controls or perform cropping, since they can simply frame the subject as they like within the frame of the display, and take the photo.

Panoramic Photography

Another embodiment of the invention enables the creation of cylindrical or spherical panoramic photographs, by processing a series of photographs taken with a device using the camera(s) running the V3D system of the invention. The user can then enjoy viewing the panoramic view thus created, with an immersive sense of depth. The panorama can either be viewed on a 2D display with head tracking, a multi-view display or a binocular virtual reality (VR) headset with a unique perspective shown for each eye. If the binocular VR headset has a facility to track head location, the V3D system can re-project the view accurately.

2. Overall V3D Processing Pipeline

Figure 7:
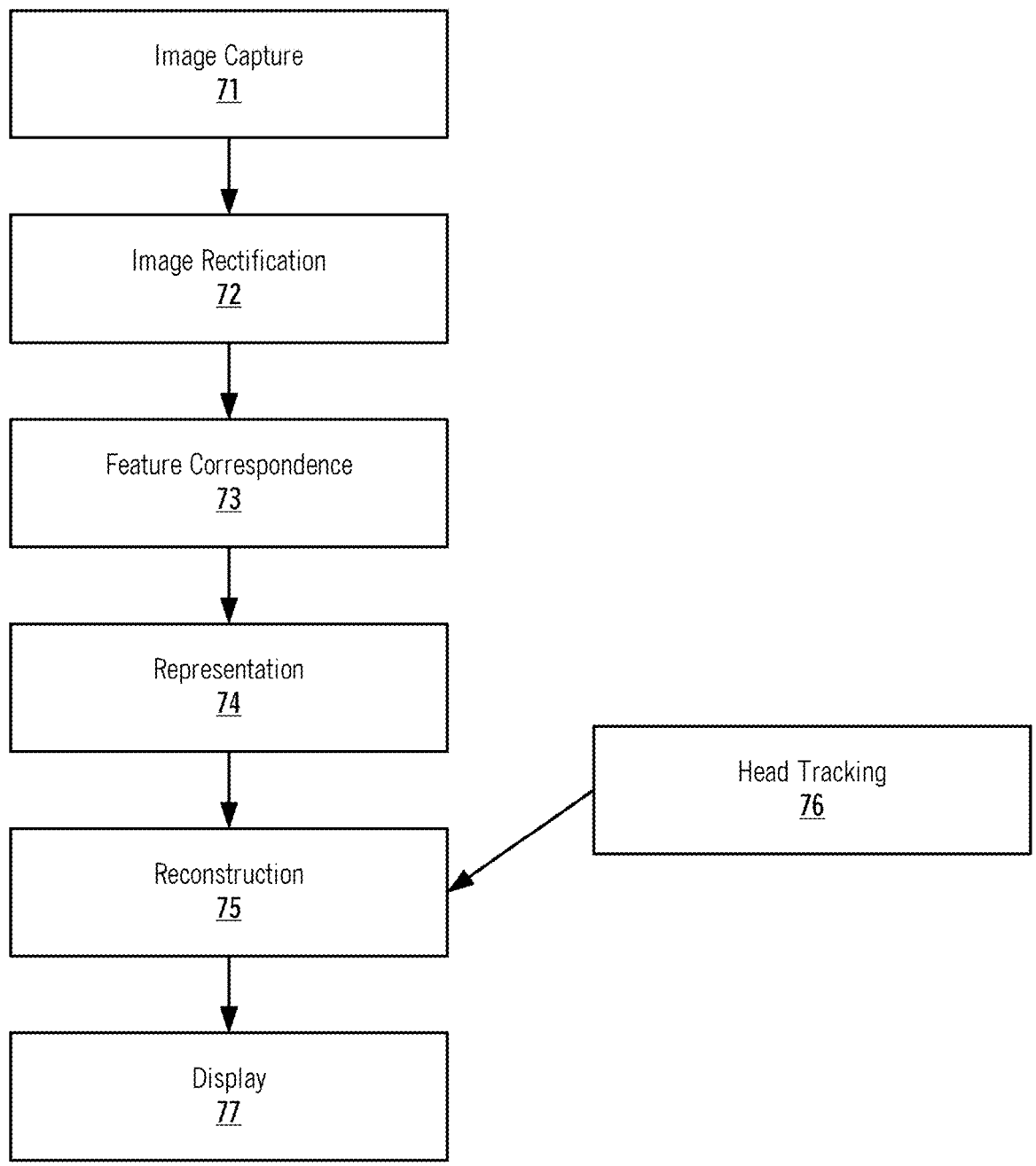
FIG. 7 is a flowchart showing an exemplary practice of the invention.

FIG. 7 is a flow diagram illustrating the overall V3D digital processing pipeline 70 which includes the following aspects:

71: Image Capture: One or more images of a scene, which may include a human user, are collected instantaneously or over time via one or more cameras and fed into the system. Wide-angle lenses are generally preferred due to the ability to get greater stereo overlap between images, although this depends on the application and can in principle work with any focal length.

72: Image Rectification: In order to compensate for optical lens distortion from each camera and relative misalignment between the cameras in the multi-view system, image processing is performed to apply an inverse transform to eliminate distortion, and an affine transform to correct misalignment between the cameras, in order to perform efficiently and in real-time, this process can be performed using a custom imaging pipeline or implemented using the shading hardware present in many conventional graphical processing units (GPUs) today, including GPI) hardware present in devices such as iPhones and other commercially available smartphones. Additional detail and other variations of these operations will be discussed in greater detail herein.

73: Feature Correspondence: With the exception of using time-of-flight type sensors in the Image Capture phase that provide depth information directly, this process is used in order to extract parallax information present in the stereo images from the camera views. This process involves detecting common features between multi-view images and measuring their relative distance in image space to produce a disparity measurement. This disparity measurement can either be used directly or converted to actual depth based on knowledge of the camera field-of-view, relative positioning, sensor size and image resolution. Additional detail and other variations of these operations will be discussed in greater detail herein.

74: Representation: once disparity or depth information has been acquired, this information, combined with the original images must be represented and potentially transmitted over a network to another user or stored. This could take several forms as discussed in greater detail herein.

75: Reconstruction: Using the previously established representation, whether stored locally on the device or received, over a network, a series of synthetic views into the originally captured scene can be generated. For example, in a video chat, the physical image inputs may have come from cameras surrounding the head of the user in which no one view has a direct eye contact gaze vector to the user. Using reconstruction, a synthetic camera view placed potentially within the bounds of the device display enabling the visual appearance of eye contact can be produced.

76: Head Tracking: Using the image capture data as an input, many different methods exist to establish an estimate of the viewer's head or eye location. This information can be used to drive the reconstruction and generate a synthetic view which looks valid from the user's established head location. Additional detail and various forms of these operations will be discussed in greater detail herein.

77: Display: Several types of display can be used with the V3D pipeline in different ways. The currently employed method involves a conventional 2D display combined with head tracking to update the display project in real-time so as to give the visual impression of being three-dimensional (3D) or a look into a 3D environment. However, binocular stereo displays (such as the commercially available Oculus Rift) can be employed used, or still further, a lenticular type display can be employed, to allow auto-stereoscopic viewing.

As described in greater detail below, portions of the V3D pipeline described herein and shown in FIGS. 7 and 8 can also be used to enable the Facial Signature aspects of the invention, to enable a "signature" of a user's or subject's face, or face and head, to be generated from the Feature Correspondence phase for purposes such as user identification, authentication or matching.

3. Pipeline Details

Figure 8:
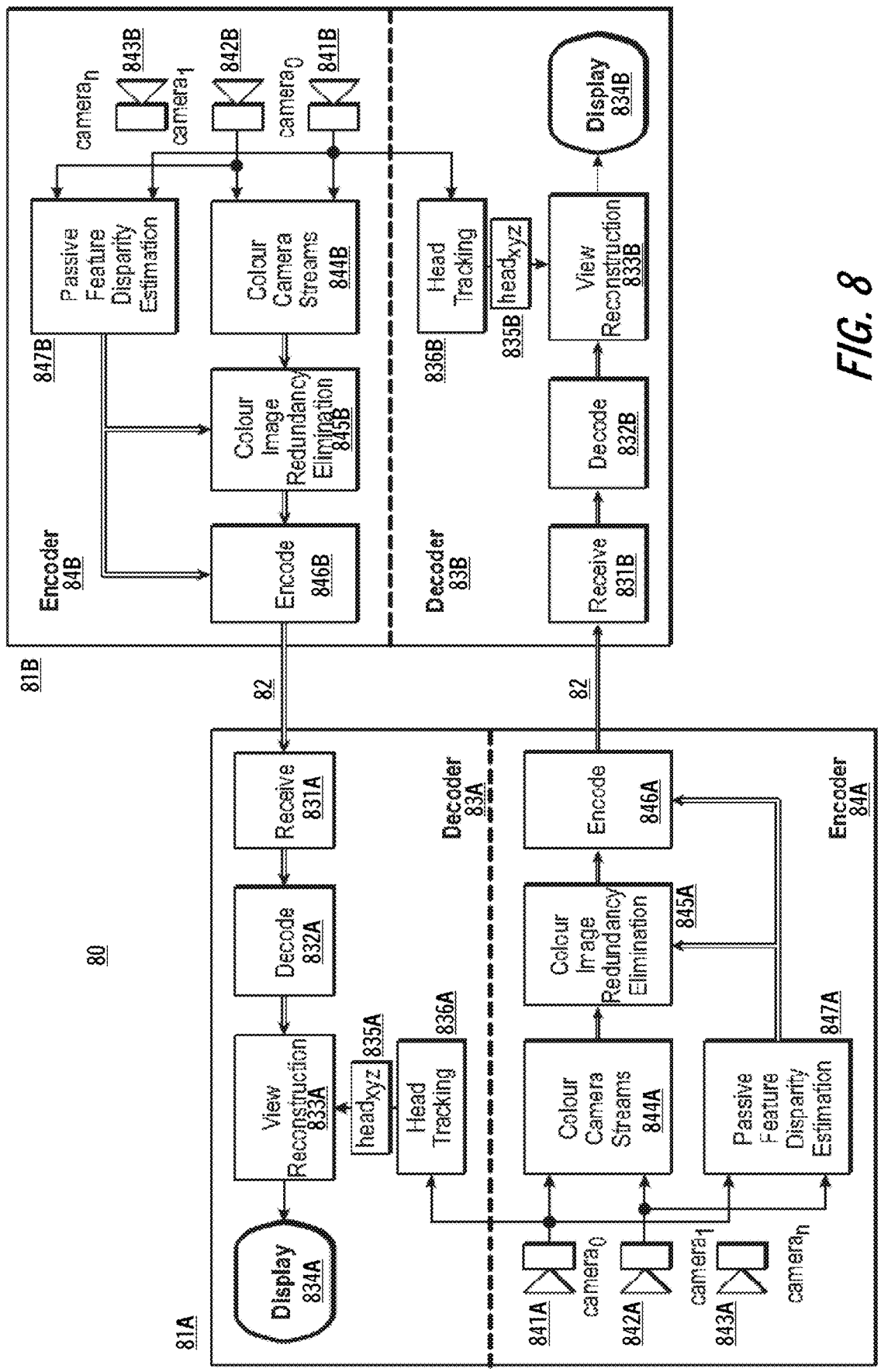
FIG. 8 is a block diagram depicting an exemplary embodiment of the invention.

FIG. 8 is a diagram of an exemplary V3D pipeline 80 configured in accordance with the invention, for immersive communication with eye contact. The depicted pipeline is full-duplex, meaning that it allows simultaneous two-way communication in both directions.

Pipeline 80 comprises a pair of communication devices 81A-B (for example, commercially available smartphones such as iPhones) that are linked to each other through a network 82. Each communication device includes a decoder end 83A-B for receiving and decoding communications from the other device and an encoder end 84A-B for encoding and sending communications to the other device 81A-B.

The decoder end 83A-B includes the following components:
 a Receive module 831A-B;
 a Decode module 832A-B;
 a View Reconstruction module 833A-B; and
 a Display 834A-B.

The View Reconstruction module 833A-B receives data 835A-B from a Head Tracking Module 836-B, which provides x-, y-, and z-coordinate data with respect to the user's head that is generated by $camera_0$ 841A-B.

The encoder end 84-B comprises a multi-camera array that includes $camera_0$ 841A-B, $camera_1$ 841A-B, and additional camera(s) 842A-B. (As noted herein, it is possible to practice various aspects of the invention using only two cameras.) The camera array provides data in the form of color camera streams 843A-B that are fed into a Color Image Redundancy Elimination module 844A-B and an Encode module. The output of the camera array is also fed into a Passive Feature Disparity Estimation module 845A-B that provides disparity estimation data to the Color Image Redundancy Elimination module 846A-B and the Encode module 847A-B, The encoded output of the device is then transmitted over network 82 to the Receive module 831A-B in the second device 81A-B.

These and other aspects of the invention are described in greater detail elsewhere herein.

Image Capture

The V3D system requires an input of images in order to capture the user and the world around the user. The V3D system can be configured to operate with a wide range of input imaging device. Some devices, such as normal color cameras, are inherently passive and thus require extensive image processing to extract depth information, whereas non-passive systems can get depth directly, although they have the disadvantages of requiring reflected IR to work, and thus do not perform well in strongly naturally lit environments or large spaces. Those skilled in the art will understand that a wide range of color cameras and other passive imaging devices, as well as non-passive image capture devices, are commercially available from a variety of manufacturers, Color Cameras This descriptor is intended to cover the use of any visible light camera that can feed into a system in accordance with the V3D system.

IR-Structured Light

This descriptor is intended to cover the use of visible light or infrared specific cameras coupled with an active infrared emitter that beams one of many potential patterns onto the surfaces of objects, to aid in computing distance. IR-Structured Light devices are known in the art.

IR Time of Flight

This descriptor covers the use of time-of-flight cameras that work by emitting a pulse of light and then measuring the time taken for reflected light to reach each of the camera's sensor elements. This is a more direct method of measuring depth, but has currently not reached the cost and resolution levels useful for significant consumer adoption. Using this type of sensor, in some practices of the invention the feature correspondence operation noted above could be omitted, since accurate depth information is already provided directly from the sensor.

Single Camera Over Time

The V3D system of the invention can be configured to operate with multiple cameras positioned in a fixed relative position as part of a device, it is also possible to use a single camera, by taking images over time and with accurate tracking, so that the relative position of the camera between frames can be estimated with sufficient accuracy. With sufficiently accurate positional data, feature correspondence algorithms such as those described herein could continue to be used.

View-Vector Rotated Camera Configuration to Improve Correspondence Quality

The following describes a practice of the V3D invention that relates to the positioning of the cameras within the multi-camera configuration; to significantly increase the number of valid feature correspondences between images captured in real world settings. This approach is based on three observations:
 1. Users typically orient their display, tablet or phone at a rotation that is level with their eyes.
 2. Many features in man-made indoor or urban environments consist of edges aligned in the three orthogonal axes (x, y, z).

3. In order to have a practical search domain, feature correspondence algorithms typically perform their search along horizontal or vertical epipolar lines in image space.

Taken together, these observations lead to the conclusion that there are often large numbers of edges for which there is no definite correspondence. This situation can be significantly improved while keeping the image processing overhead minimal, by applying a suitable rotation angle (or angular displacement) to the arrangement of the camera sensors, while also ensuring that the cameras are positioned relative to each other along epipolar lines. The amount of rotation angle can be relatively small. (See, for example, FIGS. 9, 10 and 11.)

After the images are captured in this alternative "rotated" configuration, the disparity values can either be rotated along with the images, or the reconstruction phase can be run, and the final image result rotated back to the correct orientation so that the user does not even perceive or see the rotated images.

Figure 9:
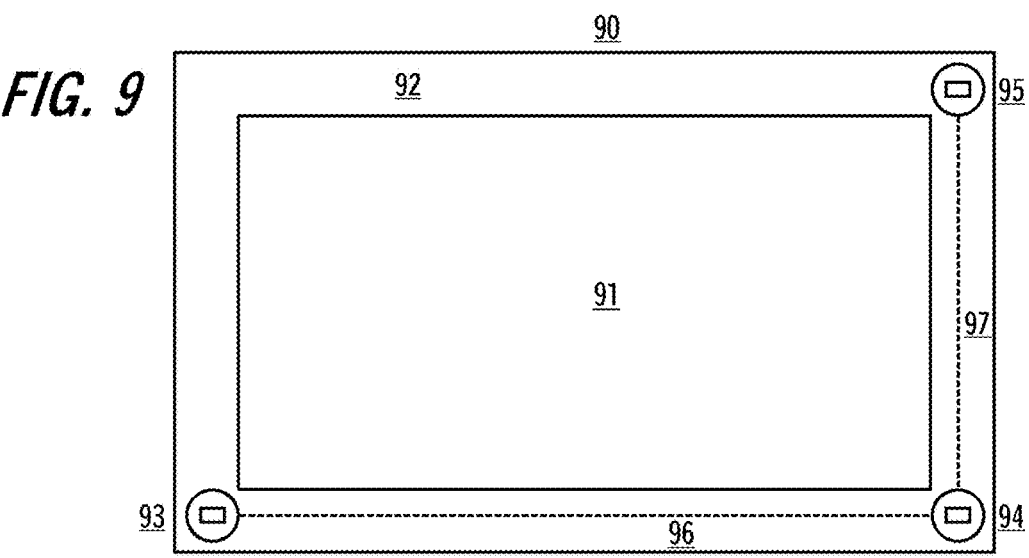
Figure 10:
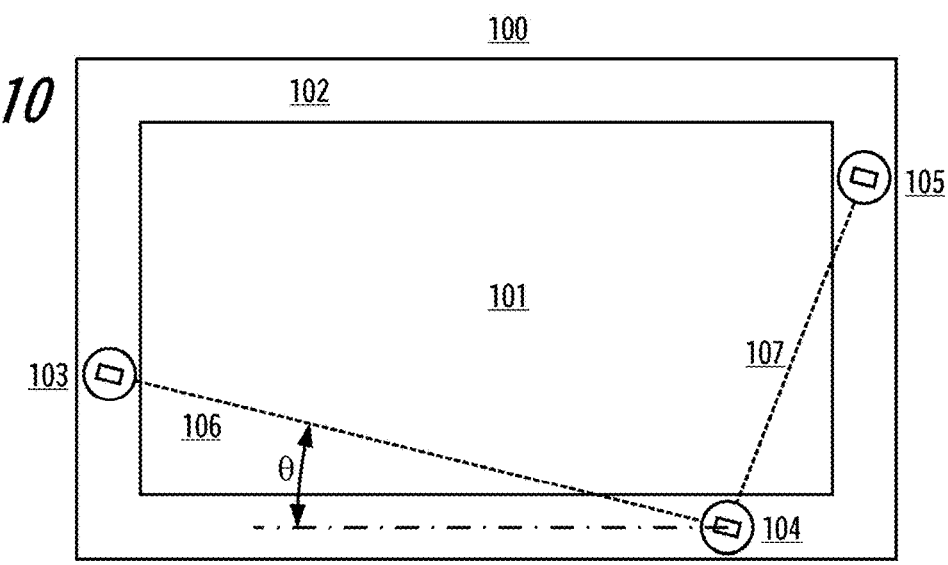
Figure 11:
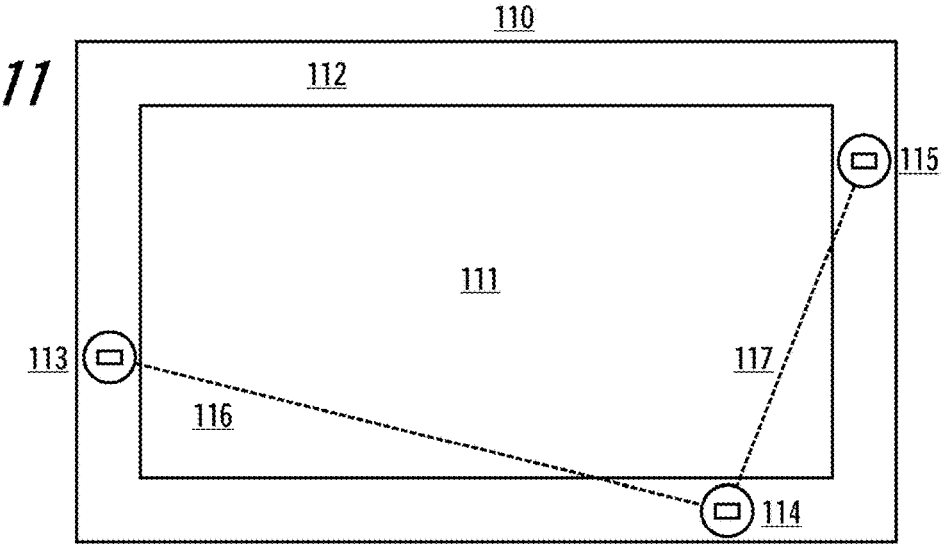

There are a variety of spatial arrangements and orientations of the sensors that can accomplish a range of rotations while still fitting within many typical device form factors. FIGS. 9, 10, and 11 show three exemplary sensor configurations 90, 100, 110, FIG. 9 shows a handheld device 90 comprising a display screen 91 surrounded by a bezel 92. Sensors 93, 94, and 95 are located at the corners of bezel 92, and define a pair of perpendicular axes: a first axis 96 between sensors 93 and 94, and a second axis 97 between cameras 94 and 95.

FIG. 10 shows a handheld device 100 comprising display 101, bezel 102, and sensors 103, 104, 105. In FIG. 10, each of sensors 103, 104, 105 is rotated by an angle θ relative to bezel 102. The position of the sensors 103, 104, and 105 on bezel 102 has been configured so that the three sensors define a pair of perpendicular axes 106, 107.

FIG. 11 shows a handheld device 110 comprising display 111, bezel 112, and sensors 113, 114, 115. In the alternative configuration shown in FIG. 11, the sensors 113, 114, 115 are not rotated. The sensors 113, 114, 115 are positioned to define perpendicular axes 116, 117 that are angled with respect to bezel 112. The data from sensors 113, 114, 115 are then rotated in software such that the correspondence continues to be perforated along the epipolar lines.

Although an exemplary practice of the V3D invention uses 3 sensors to enable vertical and horizontal cross correspondence, the methods and practices described above are also applicable in a 2-camera stereo system.

FIGS. 12A-12D and 13 next highlight advantages of a "rotated configuration" in accordance with the invention. In particular, 12A shows a "non-rotated" device configuration 120, with sensors 121, 122, 123 located in three corners, similar to configuration 90 shown in FIG. 9. FIGS. 12B, 12C, and 12D (collectively, FIGS. 12A-121) being referred to as "FIG. 12") show the respective scene image data collected at sensors 121, 122, 123.

Sensors 121 and 122 define a horizontal axis between them, and generate a pair of images with horizontally displaced viewpoints. For certain features, e.g., features H1, H2, there is a strong correspondence (i.e., the horizontally-displaced, scene data provides a high level of certainty with respect to the correspondence of these features). For other features, e.g., features H3, H4, the correspondence is weak, as shown in FIG. 12 (i.e., the horizontally-displaced scene data provides a low level of certainty with respect to the correspondence of these features).

Sensors 122 and 123 define a vertical axis that is perpendicular to the axis defined by sensors 121 and 122. Again, for certain features, e.g., feature V1 in FIGS. 12A-12D, there is a strong correspondence. For other features, e.g. feature V2 in FIGS. 12A-12D, the correspondence is weak.

FIG. 13 shows a device configuration 130, similar to configuration 100 shown in FIG. 10, with sensors 131, 132, 133 positioned and rotated to define an angled horizontal axis and an angled vertical axis. As shown in FIG. 13, the use of an angled sensor configuration eliminates the weakly corresponding features shown in FIGS. 12B, 12C, and 12D. As shown by FIGS. 12A-12D and 13, a rotated configuration of sensors in accordance with an exemplary practice of the invention enables strong correspondence for certain scene features Where the non-rotated configuration did not.

Multi-Exposure Cycling

In accordance with the invention, during the process of calculating feature correspondence, a feature is selected in one image and then scanned for a corresponding feature in another image. During this process, there can often be several possible matches found and various methods are used to establish which match (if any) has the highest likelihood of being the correct one.

As a general fact, when the input camera(s) capture an image, a choice is made to ensure that the camera exposure settings (such as gain and shutter speed) are selected according to various heuristics, with the goal of ensuring that a specific region or the majority of the image is within the dynamic range of the sensing element. Areas that are out of this dynamic range will either get clipped (overexposed regions) or suffer from a dominance of sensor noise rather than valid image signal.

During the process of feature correspondence and image reconstruction in an exemplary practice of the V3D invention, the correspondence errors in the excessively dark or light areas of the image can cause large-scale visible errors in the image by causing the computing of radically incorrect disparity or depth estimates.

Accordingly, another practice of the invention involves dynamically adjusting the exposure of the multi-view camera system on a frame-by-frame basis in order to improve the disparity estimation in areas out of the exposed region viewed by the user. Within the context of the histogram-based disparity method of the invention, described elsewhere herein, exposures taken at darker and lighter exposure settings surrounding the visibility optimal exposure would be taken, have their disparity calculated and then get integrated in the overall pixel histograms which are being retained and converged over time. The dark and light images could be, but are not required to be, presented to the user and would serve only to improve the disparity estimation.

Another aspect of this approach, in accordance with the invention, is to analyze the variance of the disparity histograms on "dark" pixels, "mid-range" pixels and "light pixels", and use this to drive the exposure setting of the cameras, thus forming a closed loop system between the quality of the disparity estimate and the set of exposures which are requested from the input multi-view camera system. For example, if the cameras are viewing a purely indoor environment, such as an interior room, with limited dynamic range clue to indirect lighting, only one exposure may be needed. If, however, the user were to (e.g.) open curtains or shades, and allow direct sunlight to enter into the room, the system would lack a strong disparity solution in those strongly lit areas and in response to the closed loop control described herein, would choose to occasionally take a reduced exposure sample on occasional video frames.

Image Rectification

An exemplary practice of the V3D system executes image rectification in real-time using the GPU hardware of the device on which it is operating, such as a conventional smartphone, to facilitate and improve an overall solution.

Typically, within a feature correspondence system, a search must be performed between two cameras arranged in a stereo configuration in order to detect the relative movement of features in the image due to parallax. This relative movement is measured in pixels and is referred to as "the disparity".

Figure 14:
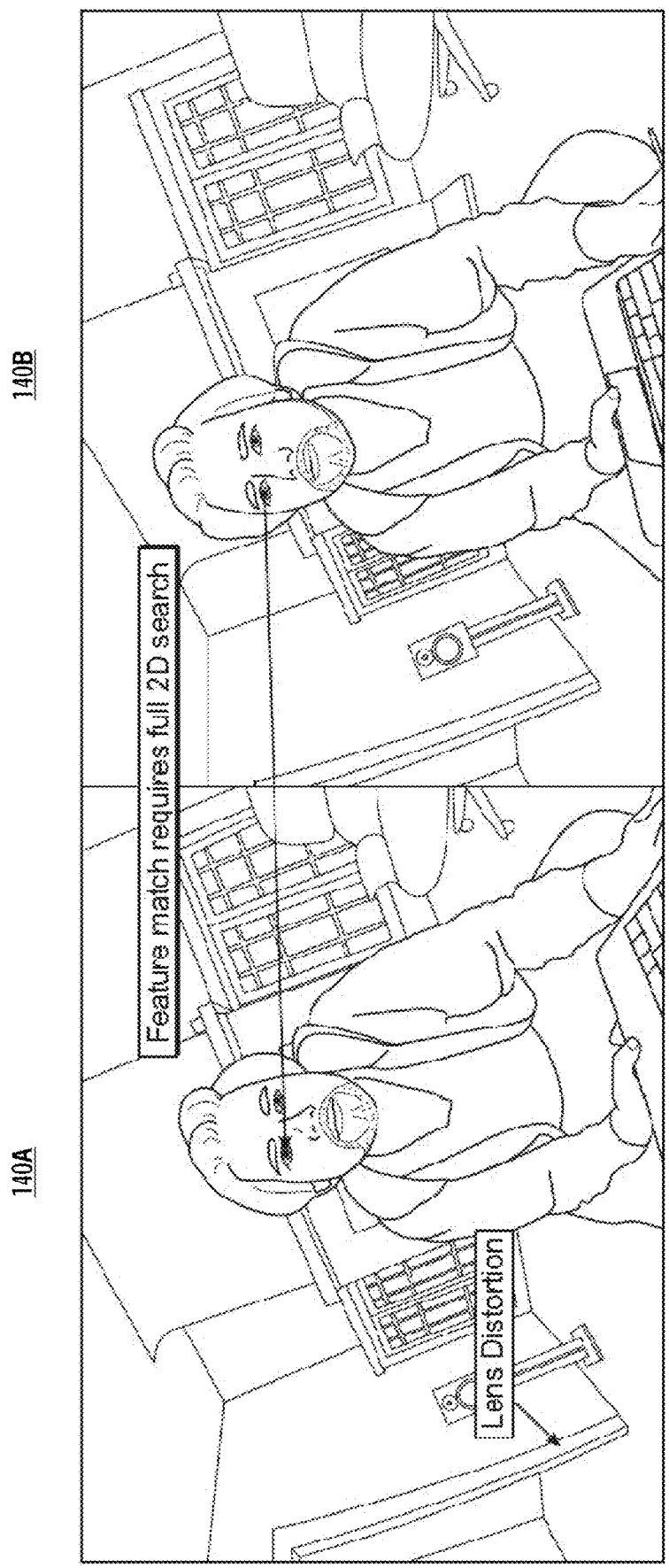

FIG. 14 shows an exemplary pair of unrectified and distorted camera (URD) source camera images 140A and 140B for left and right stereo. As shown in FIG. 14, the image pair includes a matched feature, i.e., the subject's right eye 141A, 140B. The matching feature has largely been shifted horizontally, but there is also a vertical shift because of slight misalignment of the cameras and the fact that there is a polynomial term resulting from lens distortion. The matching process can be optimized by measuring the lens distortion polynomial terms, and by inferring the affine transform required to apply to the images such that they are rectified to appear perfectly horizontally aligned and co-planar. When this is done, what would otherwise be a freeform 2D search for a feature match can now be simplified by simply searching along the same horizontal row on the source image to find the match.

Typically, this is done in one step, in which the lens distortion and then affine transform coefficients are determined and applied together to produce the corrected images. One practice of the invention, however, use a different approach, which will next be described. First, however, we define a number of terms used herein to describe this approach and the transforms used therein, as follows:

URD (Unrectified, Distorted) space: This is the image space in which the source camera images are captured. There is both polynomial distortion due to the lens shape and an affine transform that makes the image not perfectly co-planar and axis-aligned with the other stereo image. The number of URD images in the system is equal to the number of cameras in the system.

URUD (Unrectified, Undistorted) space: This is a space in which the polynomial lens distortion is removed from the image but the images remain unrectified. The number of URUD images in the system is equal to number of URD images and therefore, cameras, in the system.

RUD (Rectified, Undistorted) space: This is a space in which both the polynomial lens distortion is removed from the image and an affine transform is applied to make the image perfectly co-planar and axis aligned with the other stereo image on the respective axis. RUD always exist in pairs. As such, for example, in a 3 camera system where the cameras are arranged in a substantially L-shaped configuration (having two axes intersecting at a selected point), there would be two stereo axes, and thus 2 pairs of RUD images, and thus a total of 4 RUD images in the system.

Figure 15:
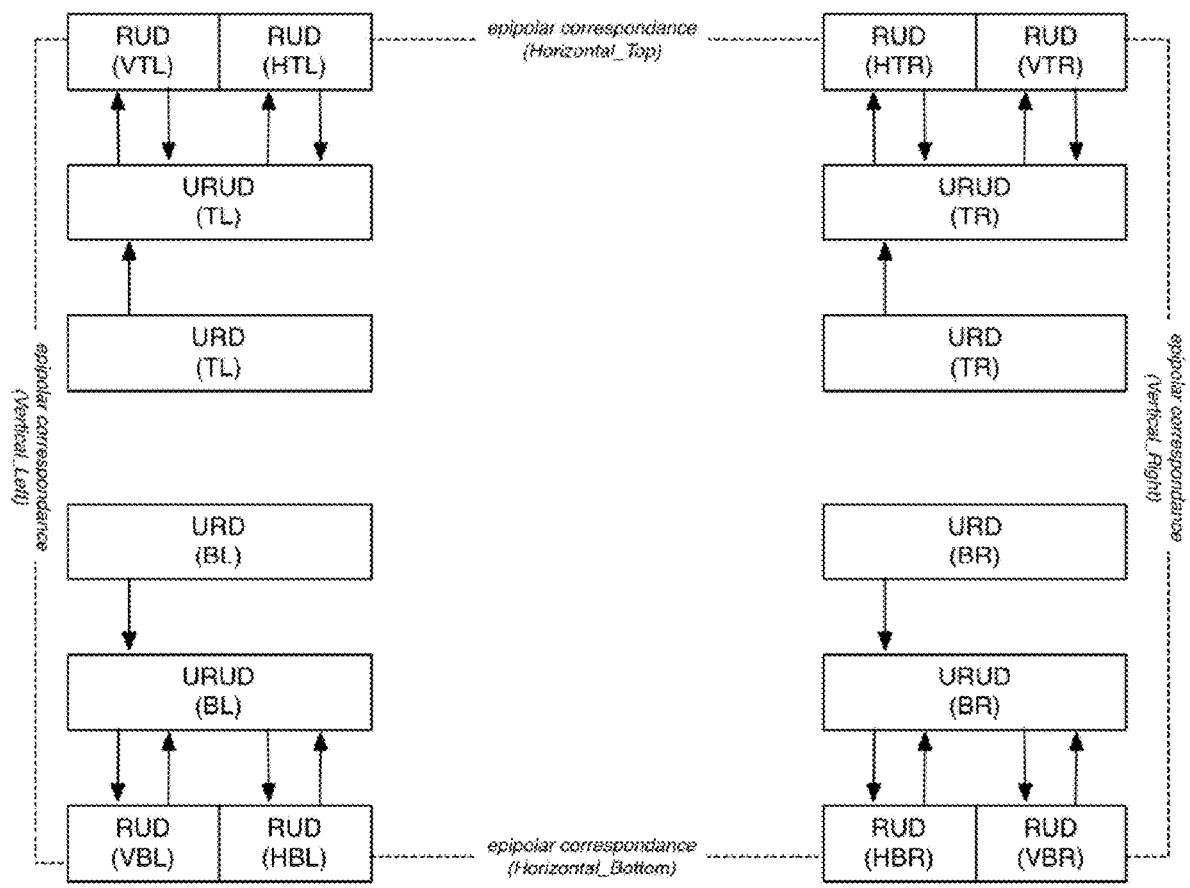

FIG. 15 is a flow diagram 150 providing various examples of possible transforms in a 4-camera V3D system. Note that there are 4 stereo axes. Diagonal axes (not shown) would also be possible.

The typical transform when sampling the source camera images in a stereo correspondence system is to transform from RUD space the desired space for feature correspondence on a stereo axis) to URD space (the source camera images).

In an exemplary practice of the V3D invention, it is desirable to incorporate multiple stereo axes into the solution in order to compute more accurate disparity values. In order to do this, it is appropriate to combine the disparity solutions between independent stereo axes that share a common camera. As such, an exemplary practice of the invention makes substantial use of the URUD image space to connect the stereo axes disparity values together. This is a significant observation, because of the trivial invertibility of the affine transform (which is simply, for example, a 3×3 matrix). We would not be able to use the URD space to combine disparities between stereo axes because the polynomial lens distortion is nor invertible, due to the problem of multiple roots and general root finding. This process of combining axes in the V3D system is further described below, in "Combining Correspondences on Additional Axes".

Figures 17A, 17B, 17C:
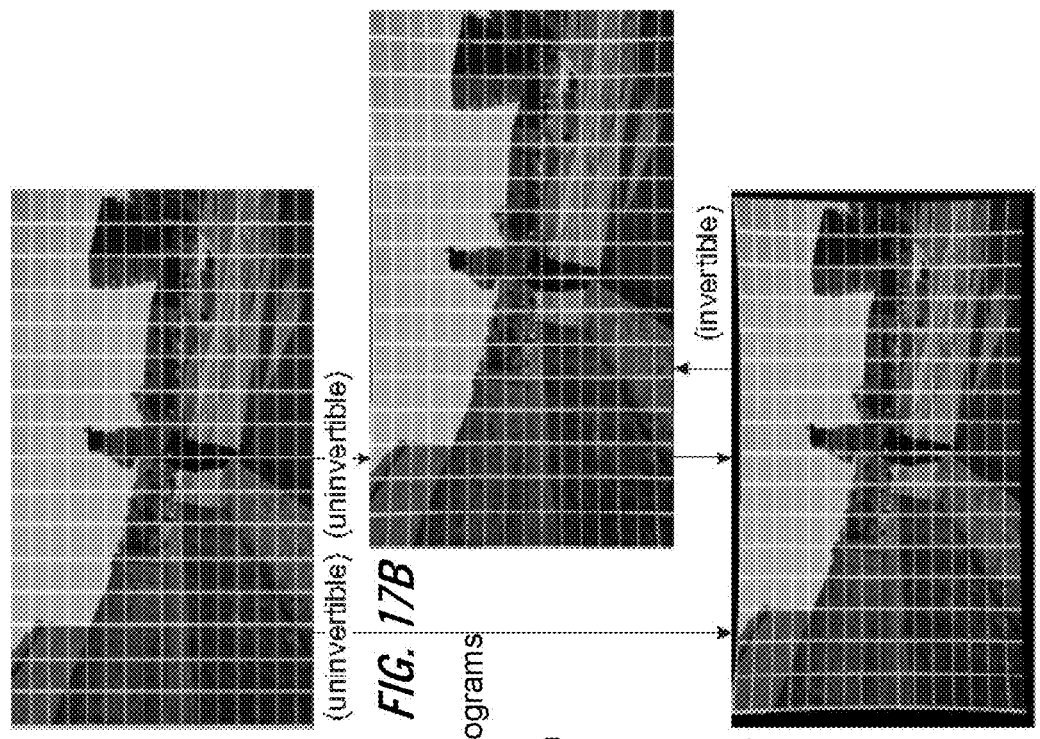
Figure 16:
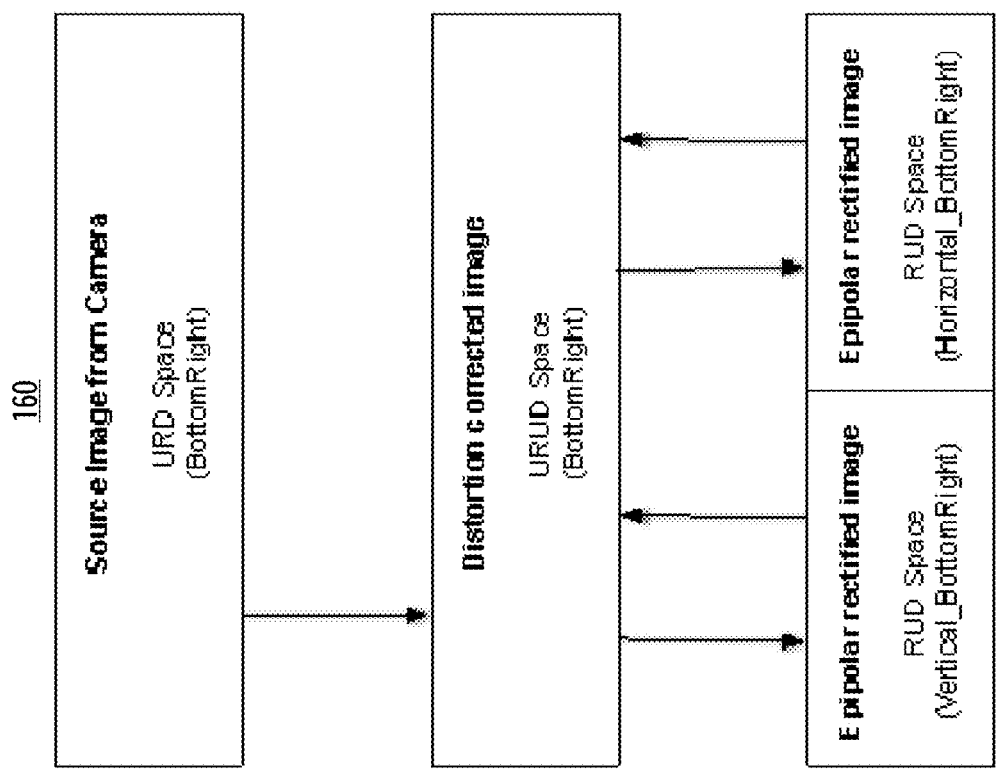

FIG. 16 sets forth a flow diagram 160, and FIGS. 17A-C are a series of images that illustrate the appearance and purpose of the various transforms on a single camera image.

Feature Correspondence Algorithm

The "image correspondence problem" has been the subject of computer science research for many years. However, given the recent advent of the universal availability of low cost cameras and massively parallel computing hardware (GPUs) contained in many smartphones and other common mobile devices, it is now possible to apply brute force approaches and statistically based methods to feature correspondence, involving more than just a single stereo pair of images, involving images over the time dimension and at multiple spatial frequencies, to execute feature correspondence calculations at performance levels not previously possible.

Various exemplary practices of the invention will next be described, which are novel and represent significant improvement to the quality and reliability attainable in feature correspondence. A number of these approaches, in accordance with the invention, utilize a method of representation referred to herein as "Disparity Histograms" on a per-pixel (or pixel group) basis, to integrate and make sense of collected data.

Combining Correspondences on Additional Axes

An exemplary practice of the invention addresses the following two problems:

Typical correspondence errors resulting from matching errors in a single stereo image pair.

Major correspondence errors that occur when a particular feature in one image within the stereo pair does not exist in the other image.

This practice of the invention works by extending the feature correspondence algorithm to include one or more additional axes of correspondence and integrating the results to improve the quality of the solution.

Figure 18D:
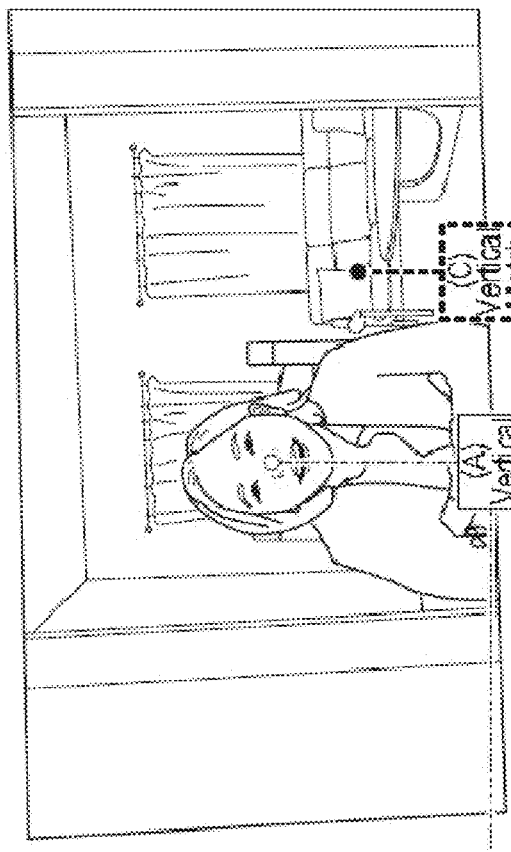
Figure 18C:
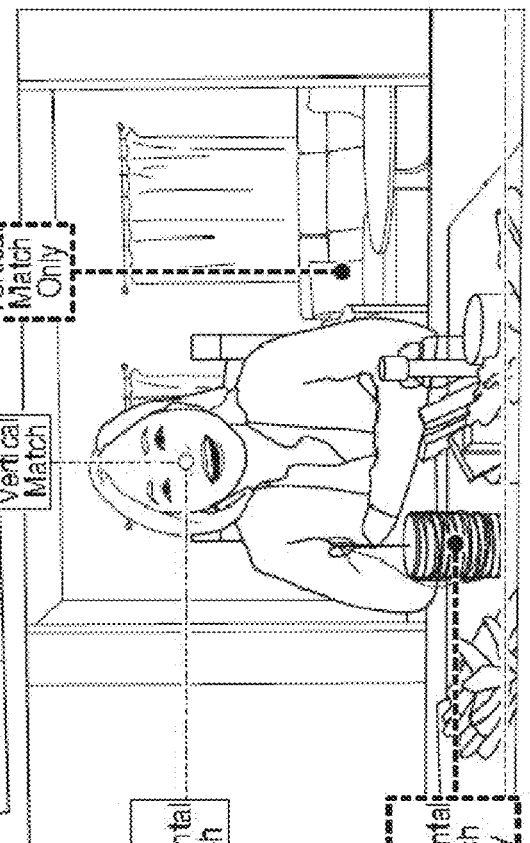
Figure 18A:
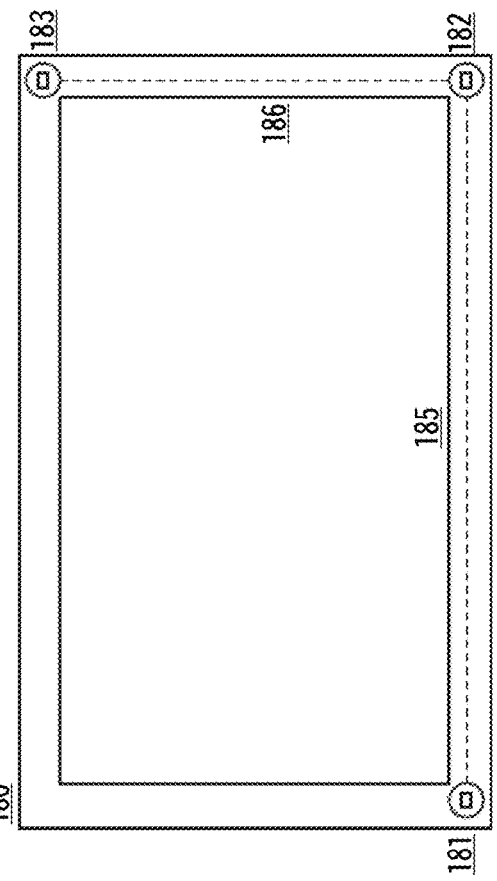

FIGS. 18A-D illustrate an example of this approach. FIG. 18A is a diagram of a sensor configuration ISO having 3 cameras 181, 182, 183 in a substantially L-shaped configuration such that a stereo pair exists on both the horizontal axis 185 and vertical axis 186, with one camera in common between the axes, similar to the configuration 90 shown in FIG. 9.

Provided the overall system contains a suitable representation to integrate the multiple disparity solutions (one such representation being the "Disparity Histograms" practice of the invention discussed herein), this configuration will allow for uncertain correspondences in one stereo pair to be either corroborated or discarded through the additional information found by performing correspondence on the other axis. In addition, certain features which have no correspondence on one axis, may find a correspondence on the other axis, allowing for a such more complete disparity solution for the overall image than would otherwise be possible.

Figure 18B:
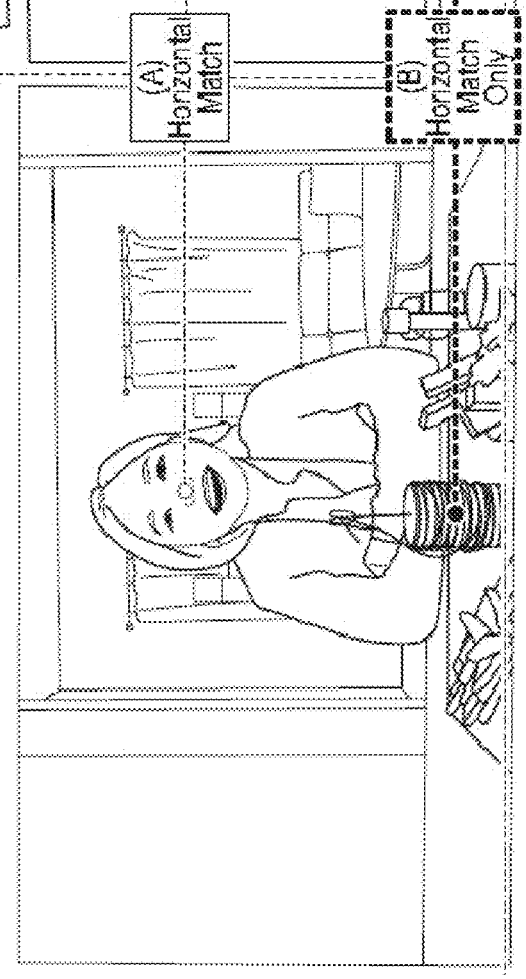

FIGS. 18B, 18C, and 18D are depictions of three simultaneous images received respectively by sensors 181, 182, 183, The three-image set is illustrative of all the points mentioned above.

Feature (A). i.e., the subject's nose, is found to cotrespond both on the horizontal stereo pair (FIGS. 11B and 18C) and the vertical, stereo pair (FIGS. 18C and 18D), Having the double correspondence helps eliminate correspondence errors by improving the signal-to-noise ratio, since the likelihood of the same erroneous correspondence being found in both axes is low.

Feature (B), i.e., the spool of twine, is found to correspond only on the horizontal stereo pairs. Half the system only included a vertical pair, this feature would not have had a depth estimate because it is entirely out of view on the upper image.

Feature (C), i.e., the cushion on the couch, is only possible to correspond on the vertical axis. Had the system only included a horizontal stereo pair, the cushion would have been entirely occluded in the left image, meaning no valid disparity estimate could have been established.

An important detail is that in many cases the stereo pair on a particular axis will have undergone a calibration process such that the epipolar lines are aligned to the rows or columns of the images. Each stereo axis will have its own unique camera alignment properties and hence the coordinate systems of the features will be incompatible. In order to integrate disparity information on pixels between multiple axes, the pixels containing the disparity solutions will need to undergo coordinate transformation to a unified coordinate system. In an exemplary practice of the invention, this means that the stereo correspondence occurs in the RUD space but the resultant disparity data and disparity histograms would be stored in the URUD (Unrectified, Undistorted) coordinate system and a URUD to RUD transform would be performed to gather the per-axis disparity values.

Correspondence Refinement Over Time

This aspect of the invention involves retaining a representation of disparity in the form of the error function or, as described elsewhere herein, the disparity histogram, and continuing to integrate disparity solutions for each frame in time to converge on a better solution through additional sampling.

Filling Unknowns with Historical Data from Previous Frames

This aspect of the invention is a variation of the correspondence refinement over time aspect. In cases where a given feature is detected but for which no correspondence can be found in another camera, if there was a prior solution for that pixel from a previous frame, this can be used instead.

Histogram-Based Disparity Representation Method

This aspect of the invention provides a representation to allow multiple disparity measuring techniques to be combined to produce a higher quality estimate of image disparity, potentially even over time. It also permits a more efficient method of estimating disparity, taking into account more global context in the images, without the significant cost of large per pixel kernels and image differencing.

Most disparity estimation methods for a given pixel in an image in the stereo pair involve sliding a region of pixels (known as a kernel) surrounding the pixel in question from one image over the other in the stereo pair, and computing the difference for each pixel in the kernel, and reducing this to a scalar value for each disparity being tested.

Given a kernel of reference pixels and a kernel of pixels to be compared with the reference, a number of methods exist to produce a scalar difference between them, including the following:
1. Sum of Absolute Differences (SAD)
2. Zero-mean Sum of Absolute Differences (ZSAD)
3. Locally scaled Sum of Absolute Differences (LSAD)
4. Sum of Squared Differences (SSD)
5. Zero-mean Sum of Squared Differences (ZSSD)
6. Locally scaled Sum of Squared Differences (LSSD)
7. Normalized Cross Correlation (NCC)
8. Zero-Mean Normalized Cross Correlation (ZNCC)
9. Sum oil-lamming Distances (SHD)

This calculation is repeated as the kernel is slid over the image being compared.

Figure 19:
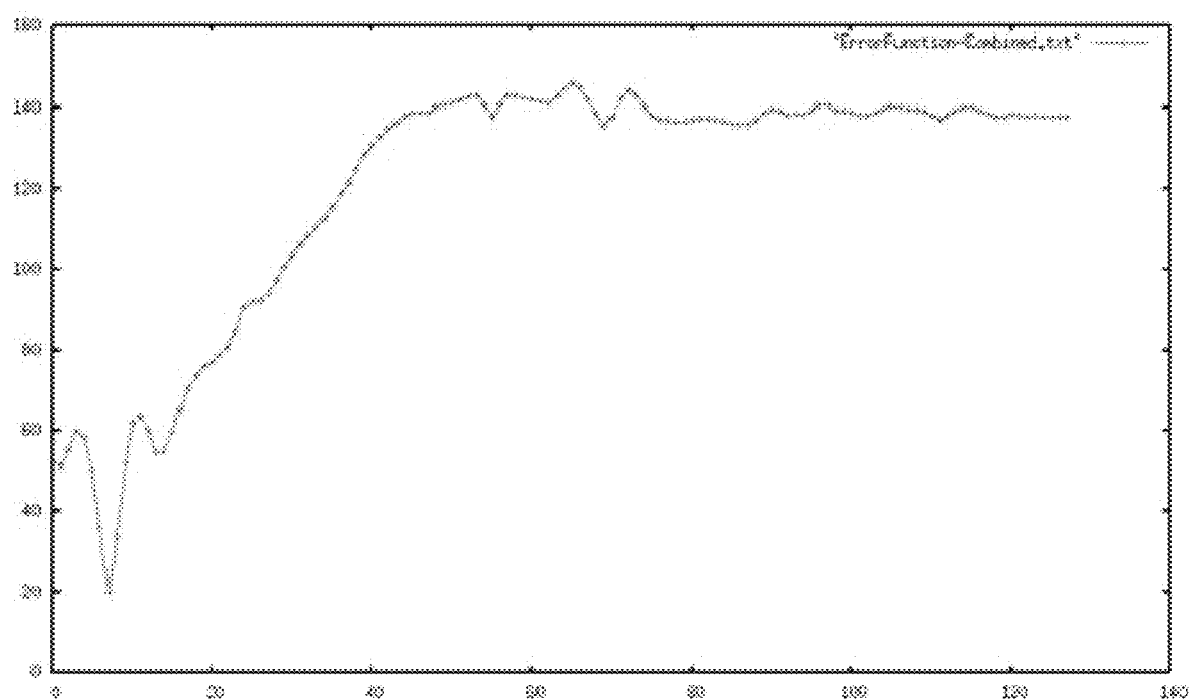
FIG. 19 is a graph in accordance with an aspect of the invention.

FIG. 19 is a graph 190 of cumulative error for a 5×5 block of pixels for disparity values between 0 and 128 pixels, in this example, it can be seen that there is a single global minimum that is likely to be the best solution.

In various portions of this description of the invention, reference may be made to a specific one of the image comparison methods, such as SSD (Sum of Square Differences). Those skilled in the art will understand that in many instances, others of the above-listed image comparison error measurement techniques could be used, as could others known in the art. Accordingly, this aspect of the image processing technique is referred to herein as a "Fast Dense Disparity Estimate", or "FDDE".

Used by itself, this type of approach has some problems, as follows:

Computational Overhead

Every pixel for which a disparity solution is required must perform a large number of per pixel memory access and math operations. This cost scales approximately with the square of the radius of the kernel multiplied by the number of possible disparity values to be tested for.

Non-Uniform Importance of Individual Features in the Kernel

With the exception of the normalized cross correlation methods, the error function is significantly biased based on image intensity similarity across the entire kernel. This means that subtle features with non-extreme intensity changes will fail to attain a match if they are surrounded by areas of high intensity change, since the error function will tend to "snap" to the high intensity regions. In addition, small differences in camera exposure will bias the disparity because of the "non-democratic" manner in which the optimal kernel position is chosen.

Figure 20A:
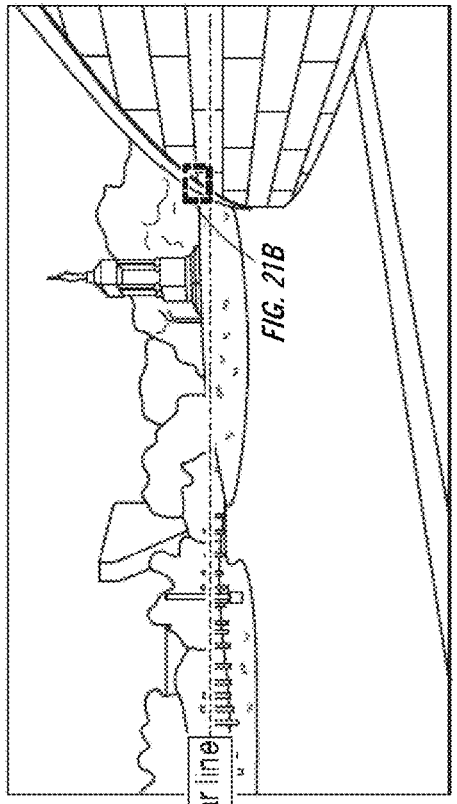
Figure 20B:
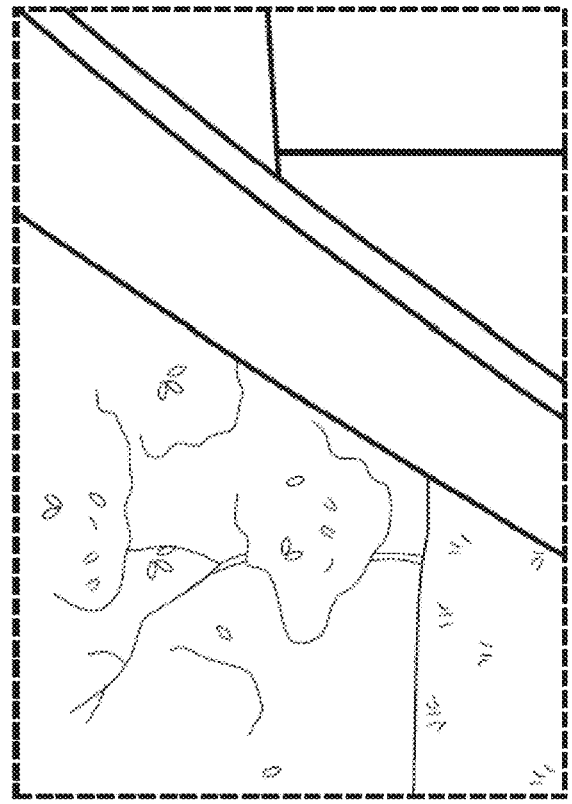
Figure 21A:
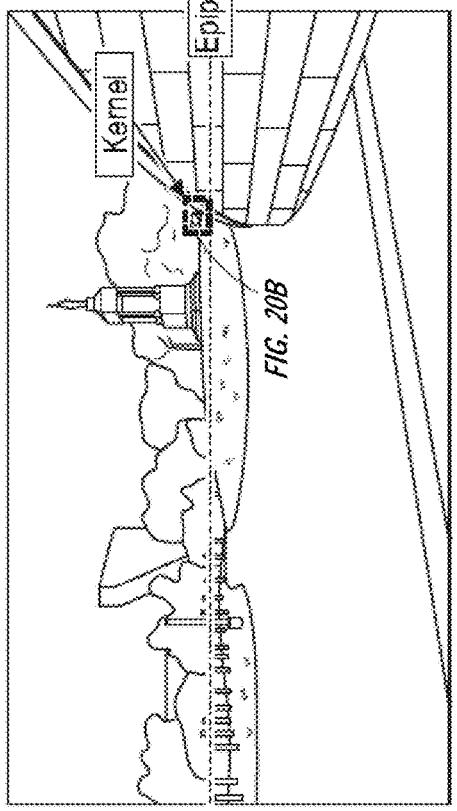
Figure 21B:
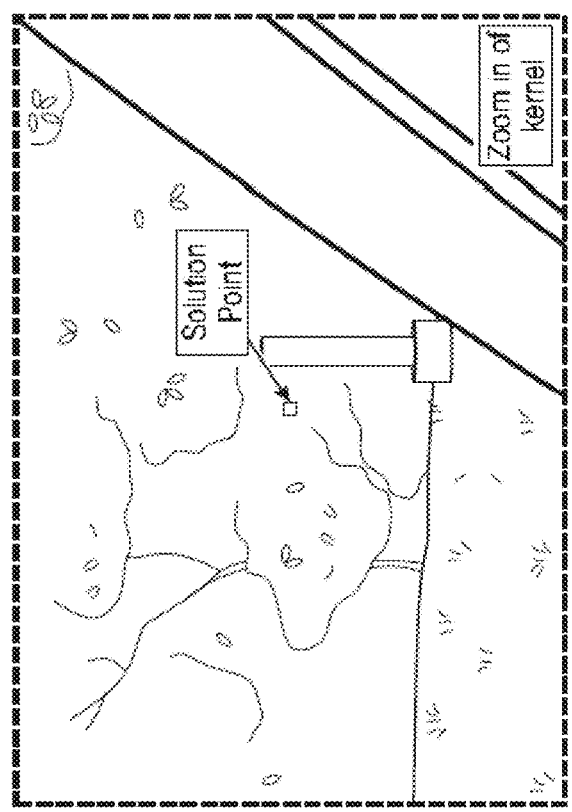

An example of this is shown in FIGS. 20A-B and 21A-B. FIGS. 20A and 20B are two horizontal stereo images. FIGS. 21A and 21B, which correspond to FIGS. 20A and 20B, show a selected kernel of pixels around the solution point for which we are trying to compute the disparity. It can be seen that for the kernel at its current size, the cumulative error function will have two minima, one representing the features that have a small disparity since they are in the image background, and those on the wall which are in the foreground and will have a larger disparity. In the ideal situation, the minima would flip from the background to the foreground disparity value as close to the edge of the wall as possible. In practice, due to the high intensity of the wall pixels, many of the background pixels snap to the disparity of the foreground, resulting in a serious quality issue forming a border near the wan.

Lack of Meaningful Units

The units of measure of "error", i.e. the Y-axis on the example graph, is unsealed and may not be compatible between multiple cameras, each with its own color and luminance response. This introduces difficulty in applying statistical methods or combining error estimates produced through other methods. For example, computing the error function from a different stereo axis would be incompatible in scale, and thus the terms could not be easily integrated to produce a better error function.

This is an instance in which the disparity histogram method of the invention becomes highly useful, as will next be described.

Operation of the Disparity Histogram Representation

One practice of the disparity histogram solution method of the invention works by maintaining a histogram showing the relative likelihood of a particular disparity being valid for a given pixel. In other words, the disparity histogram behaves as a probability density function (PDF) of disparity for a given pixel, higher values indicating a higher likelihood that the disparity range is the "truth".

Figure 22:
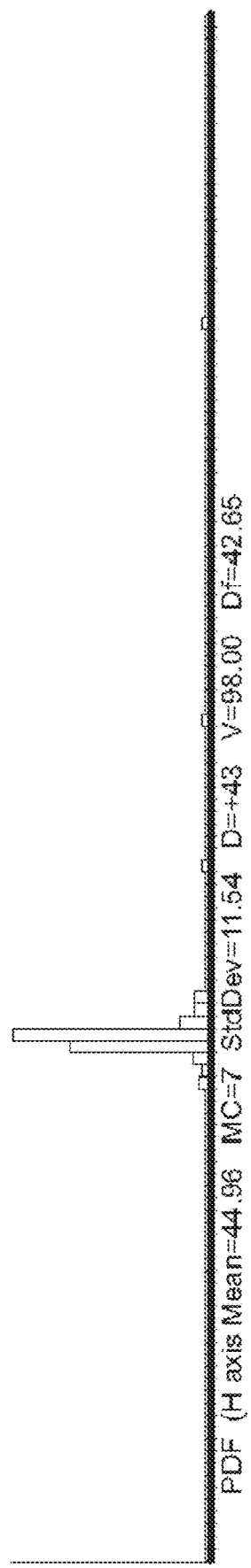

FIG. 22 shows an example of a typical disparity histogram for a pixel. For each pixel histogram, the x-axis indicates a particular disparity range and the scale y-axis is the number of pixels in the kernel surrounding the central pixel that are "voting" for that given disparity range.

Figure 23:
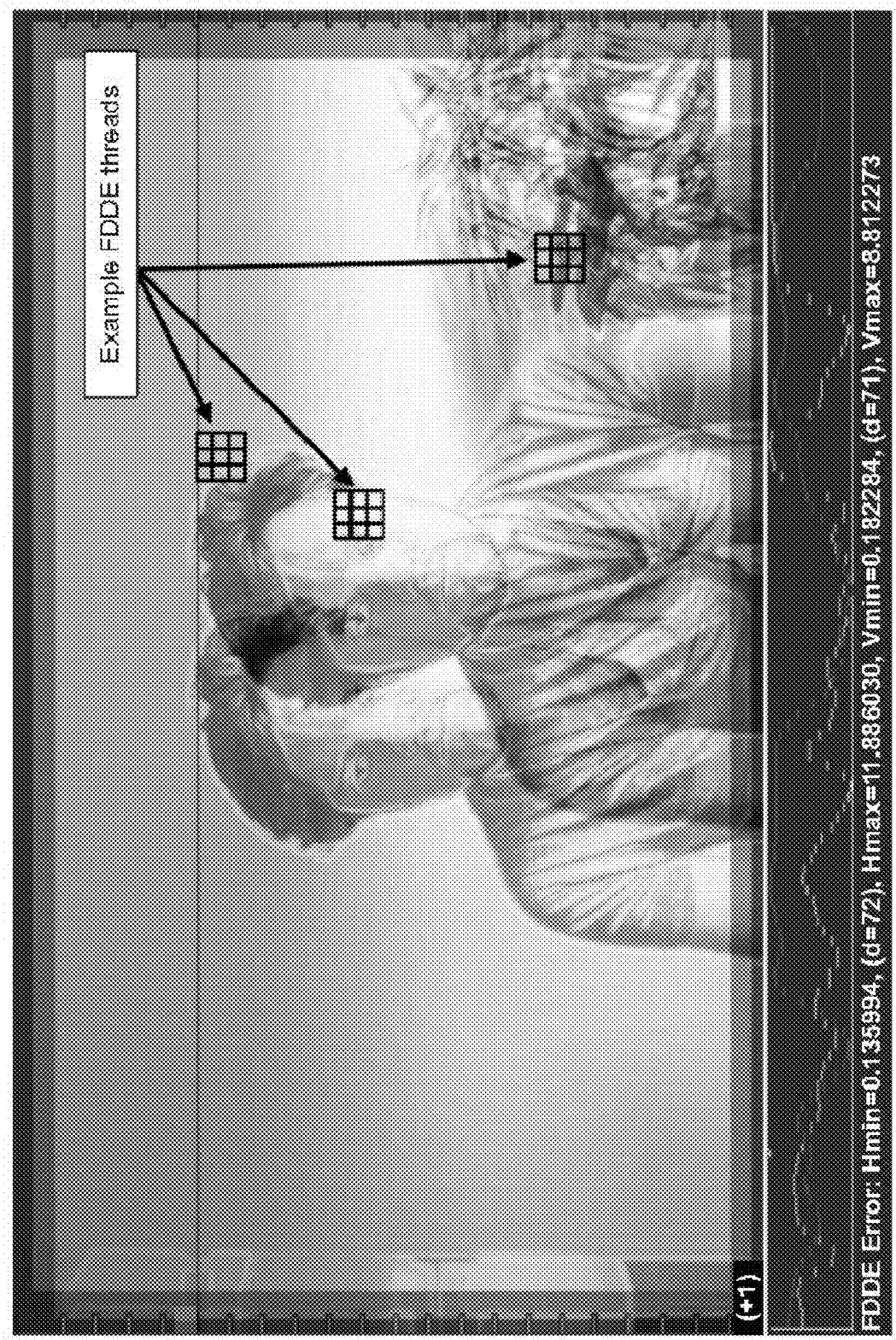
Figure 24:
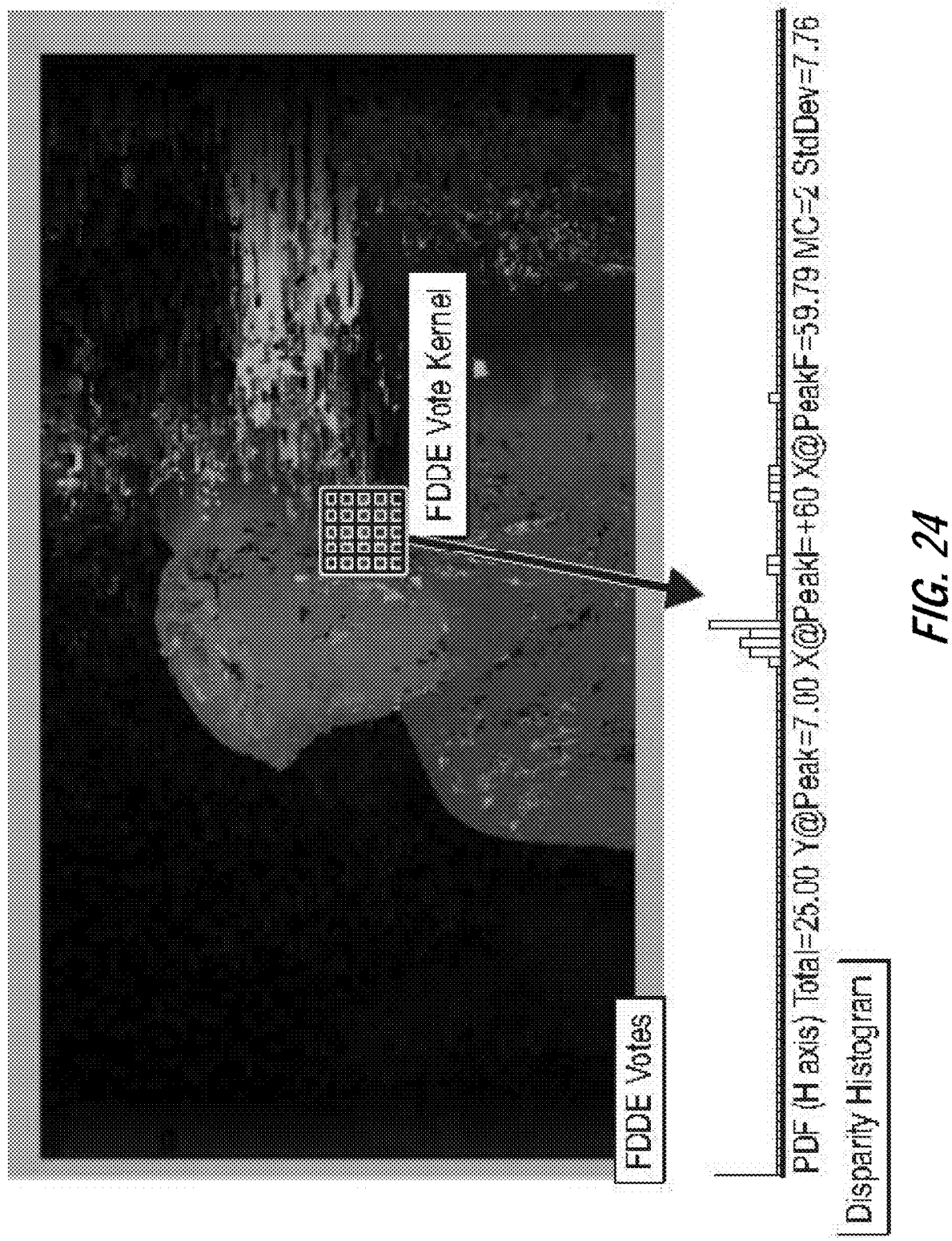
Figure 28:
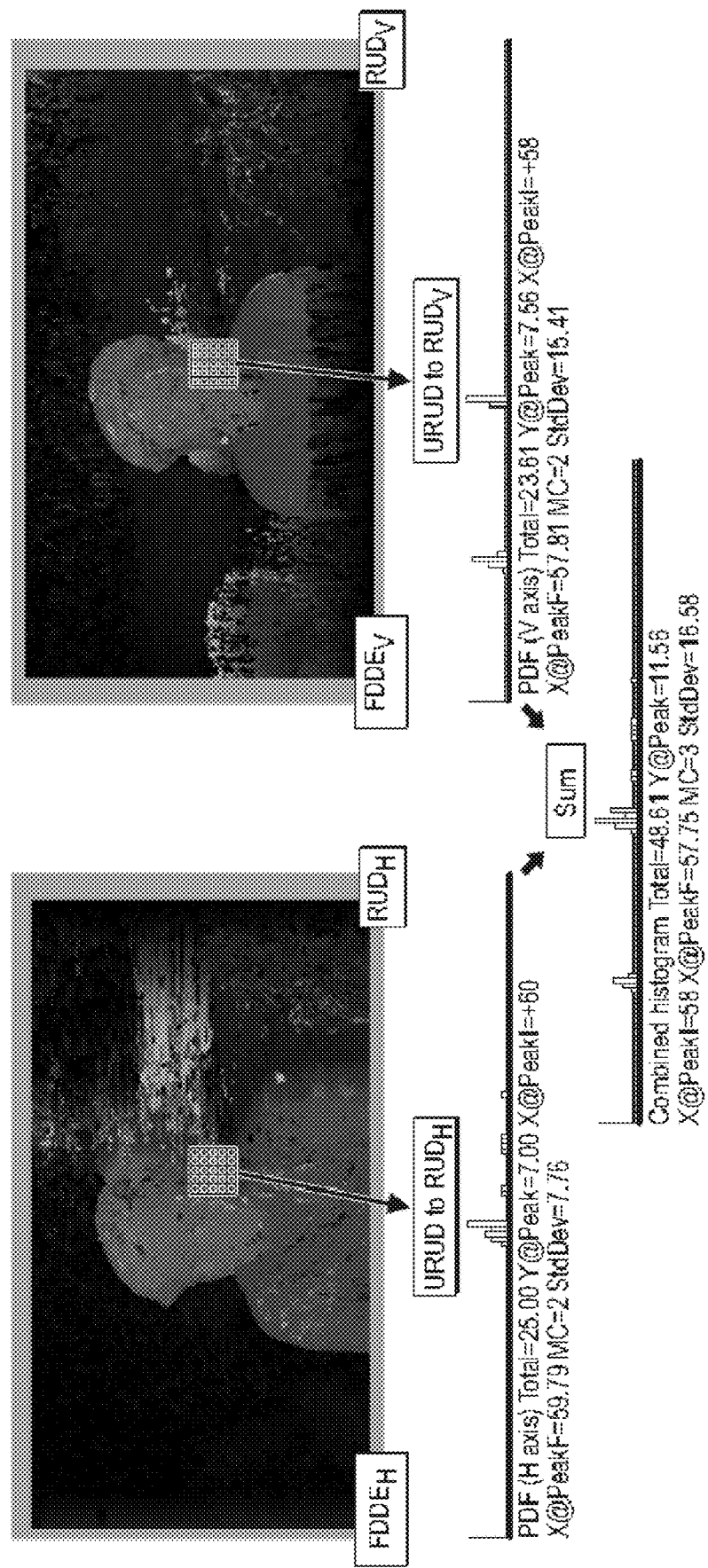

FIGS. 23 and 24 show a pair of images and associated histograms. As shown therein, the votes can be generated by using a relatively fast and low-quality estimate of disparity produced using small kernels and standard SSD type methods. According to an aspect of the invention, the SSD method is used to produce a "fast dense disparity map" (FDDE), wherein each pixel has a selected disparity that is the lowest error. Then, the algorithm would go through each pixel, accumulating into the histogram a tally of the number of votes for a given disparity in a larger kernel surrounding the pixel.

With a given disparity histogram, many forms of analysis can be performed to establish the most likely disparity for the pixel, confidence in the solution validity, and even identify cases where there are multiple highly likely solutions. For example, if there is a single dominant mode in the histogram, the x coordinate of that peak denotes the most likely disparity solution.

FIG. 25 shows an example of a bi-modal disparity histogram with 2 equally probable disparity possibilities.

FIG. 26 is a diagram of an example showing the disparity histogram and associated cumulative distribution function (CDF). The interquartile range is narrow, indicating high confidence.

FIG. 27 is a contrasting example showing a wide interquartile range in the CDF and thus a low confidence in any peak within that range.

By transforming the histogram into a cumulative distribution function (CDF), the width of the interquartile range can be established. This range can then be used to establish a confidence level in the solution. A narrow interquartile range (as in FIG. 26) indicates that the vast majority of the samples agree with the solution, whereas a wide interquartile range (as in FIG. 27) indicates that the solution confidence is low because many other disparity values could be the truth.

A count of the number of statistically significant modes in the histogram can be used to indicate "modality," For example, if there are two strong modes in the histogram (as in FIG. 251), it is highly likely that the point in question is right on the edge of a feature that demarks a background versus foreground transition in depth. This can be used to control the reconstruction later in the pipeline to control stretch versus slide (discussed in greater detail elsewhere herein).

Due to the tact that the y-axis scale is now in terms of votes for a given disparity rather than the typical error functions, the histogram is not biased by variation in image intensity at all, allowing for high quality disparity edges on depth discontinuities. In addition, this permits other methods of estimating disparity for the given pixel to be easily integrated into a combined histogram.

If we are processing multiple frames of images temporally, we can preserve the disparity histograms over time and accumulate samples into them to account for camera noise or other spurious sources of motion or error.

If there are multiple cameras, it is possible to produce fast disparity estimates for multiple independent axes and combine the histograms to produce a much more statistically robust disparity solution, With a standard error function, this would be much more difficult because the scale would make the function less compatible. With the histograms of the present invention, in contrast, everything is measured in pixel votes, meaning the results can simply be multiplied or added to allow agreeing disparity solutions to compound, and for erroneous solutions to fall into the background noise.

Using the histograms, if we find the interquartile range of the CDF to be wide in areas of a particular image intensity, this may indicate an area of poor signal to noise, i.e., underexposed to overexposed areas. Using this, we can control the camera exposures to fill in poorly sampled areas of the histograms.

Computational performance is another major benefit of the histogram based method. The SSD approach (which is an input to the histogram method) is computationally demanding due to the per pixel math and memory access for every kernel pixel for every disparity to be tested. With the histograms, a small SSD kernel is all that is needed to produce inputs to the histograms. This is highly significant, since SSD performance is proportional to the square of its kernel size multiplied by the number of disparity values being tested for. Even through the small SSD kernel output is a noisy disparity solution, the subsequent voting, which is done by a larger kernel of the pixels to produce the histograms, filters out so much of the noise that it is, in practice, better than the SSD approach, even with very large kernels. The histogram accumulation is only an addition function, and need only be done once per pixel per frame and does not increase in cost with additional disparity resolution.

Another useful practice of the invention involves testing only for a small set of disparity values with SSD, populating the histogram, and then using the histogram votes to drive further SSD testing within that range to improve disparity resolution over time.

One implementation of the invention involves each output pixel thread having a respective "private histogram" maintained in on-chip storage close to the computation units (e.g., GPUs), This private histogram can be stored such that each pixel thread will be reading and writing to the histogram on a single dedicated bank of shared local memory on a modern programmable GPU, In addition, if the maximum possible number of votes is known, multiple histogram bins can be packed into a single word of the shared local memory and accessed using bitwise operations. These details can be useful to reduce the cost of dynamic indexing into an array during the voting and the summation.

Multi-Level Histogram Voting

This practice of the invention is an extension of the disparity histogram aspect of the invention, and has proven to be an highly useful part of reducing error in the resulting disparity values, while still preserving important detail on depth discontinuities in the scene.

Errors in the disparity values can come from many sources. Multi-level disparity histograms reduce the contribution from several of these error sources, including:

1. Image sensor noise.
2. Repetitive patterns at a given image frequency.

As with the idea of combining multiple stereo axes histogram votes into the disparity histogram for the purpose of "tie-breaking" and reducing false matches, the multi-level voting scheme applies that same concept, but across descending frequencies in the image space.

FIGS. 29A and 29B shows an example of a horizontal stereo image pair. FIGS. 29C and 29D show, respectively, the resulting disparity data before and after application of the described multi-level histogram technique.

This aspect of the invention works by performing the image pattern matching (FDDE) at several successively low-pass filtered versions of the input stereo images. The term "level" is used herein to define a level of detail in the image, where higher level numbers imply a lower level of detail. In one practice of the invention, the peak image frequencies at level[n] will be half that of level[n−1].

Many methods can be used to downsample, and such methods known in the area of image processing. Many of these methods involve taking a weighed summation of a kernel in level[n−1] to produce a pixel in level[n]. In one practice of the invention, the approach would be for the normalized kernel center position to remain the same across all of the levels.

FIGS. 30A-E are a series of exemplary left and right multi-level input images. Each level[n] is a downsampled version of level [n−1]. In the example of FIG. 30A, the downsampling kernel is a 2×2 kernel with equal weights of 0.25 for each pixel. The kernel remains centered at each successive level of downsampling.

In this practice of the invention, for a given desired disparity solution at the full image resolution, the FDDE votes for every image level are included. Imagine a repetitive image feature, such as the white wooden beams on the cabinets shown in the background of the example of FIG. 30A. At Level[0] (the full image resolution), several possible matches may be found by the FDDE image comparisons since each of the wooden beams looks rather similar to each other, given the limited kernel size used for the FDDE.

Figure 31:
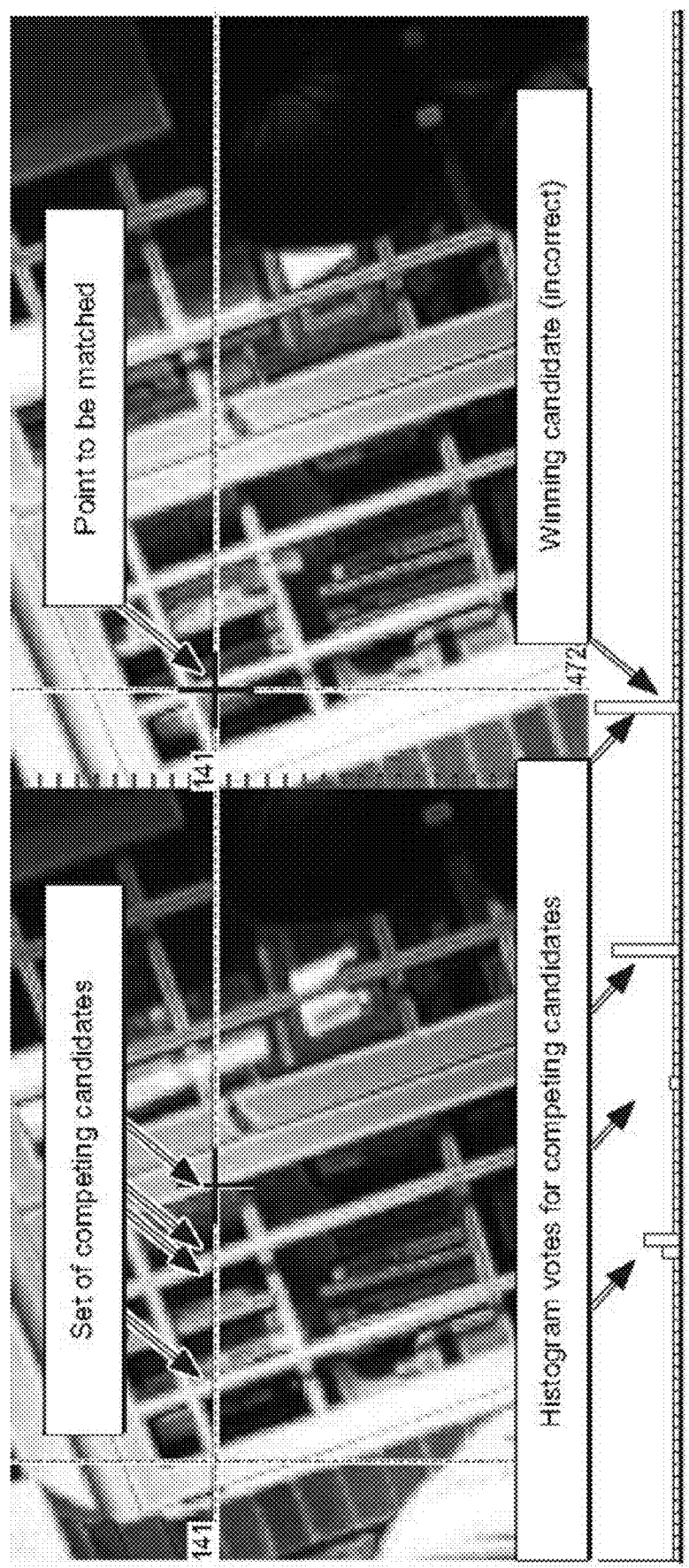

FIG. 31 depicts an example of an image pair and disparity histogram, illustrating an incorrect matching scenario and its associated disparity histogram (see the notation "Winning candidate: incorrect" in the histogram of FIG. 31).

Figure 32:
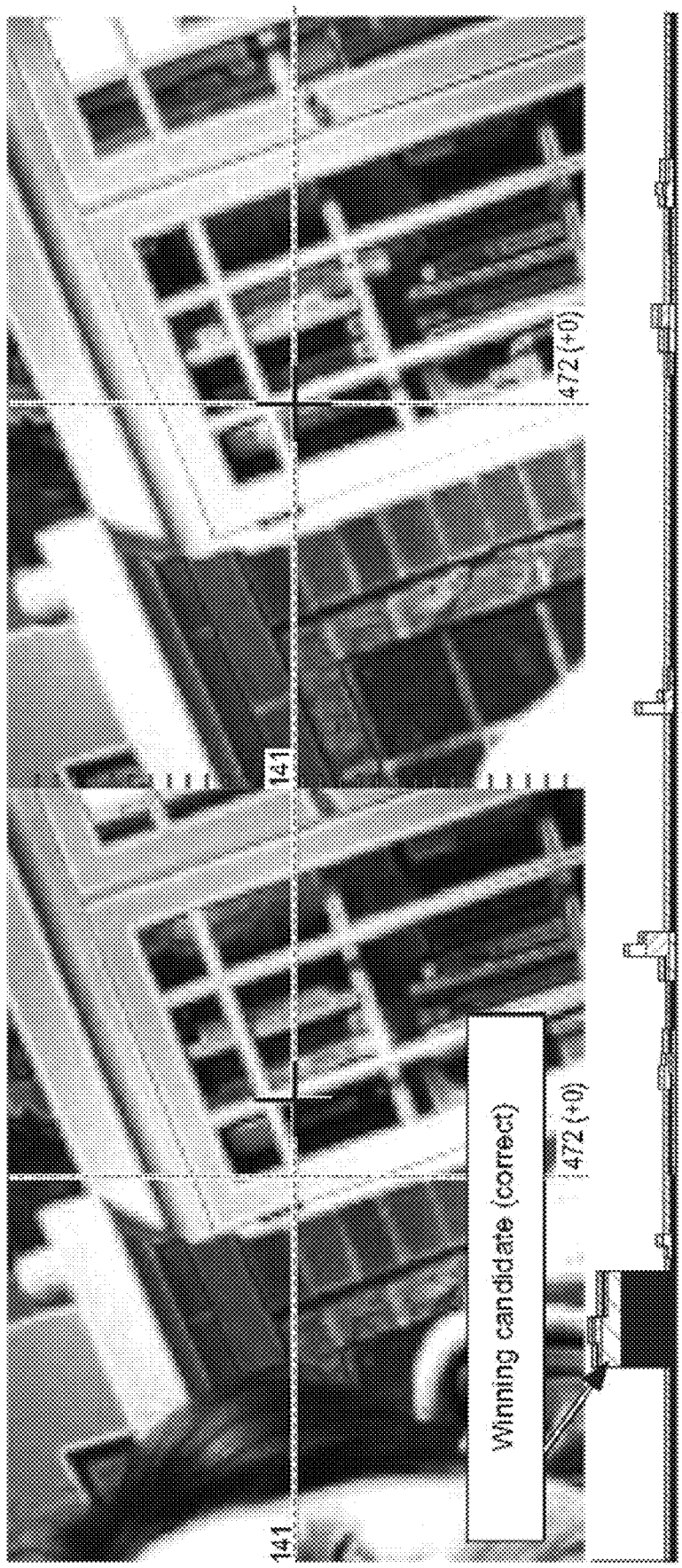

In contrast, and in accordance with an exemplary practice of the invention, FIG. 32 shows the same scenario, hut with the support of 4 lower levels of FDDE votes in the histogram, resulting in a correct winning candidate (see the notation "Winning candidate: correct" in the histogram of FIG. 31). Note that the lower levels provide support for the true candidate at the higher levels. As shown in FIG. 32, if one looks at a lower level (i.e., a level characterized by reduced image resolution via low-pass filtering), the individual wooden beams shown in the image become less pronounced, and the overall form of the broader context of that image region begins to dominate the pattern matching. By combining together all the votes at each level, where there may have been multiple closely competing candidate matches at the lower levels, the higher levels will likely have fewer potential candidates, and thus cause the true matches at the lower levels to be emphasized and the erroneous matches to be suppressed. This is the "tie-breaking" effect that this practice of the invention provides, resulting in a higher probability of correct winning candidates.

Figure 33:
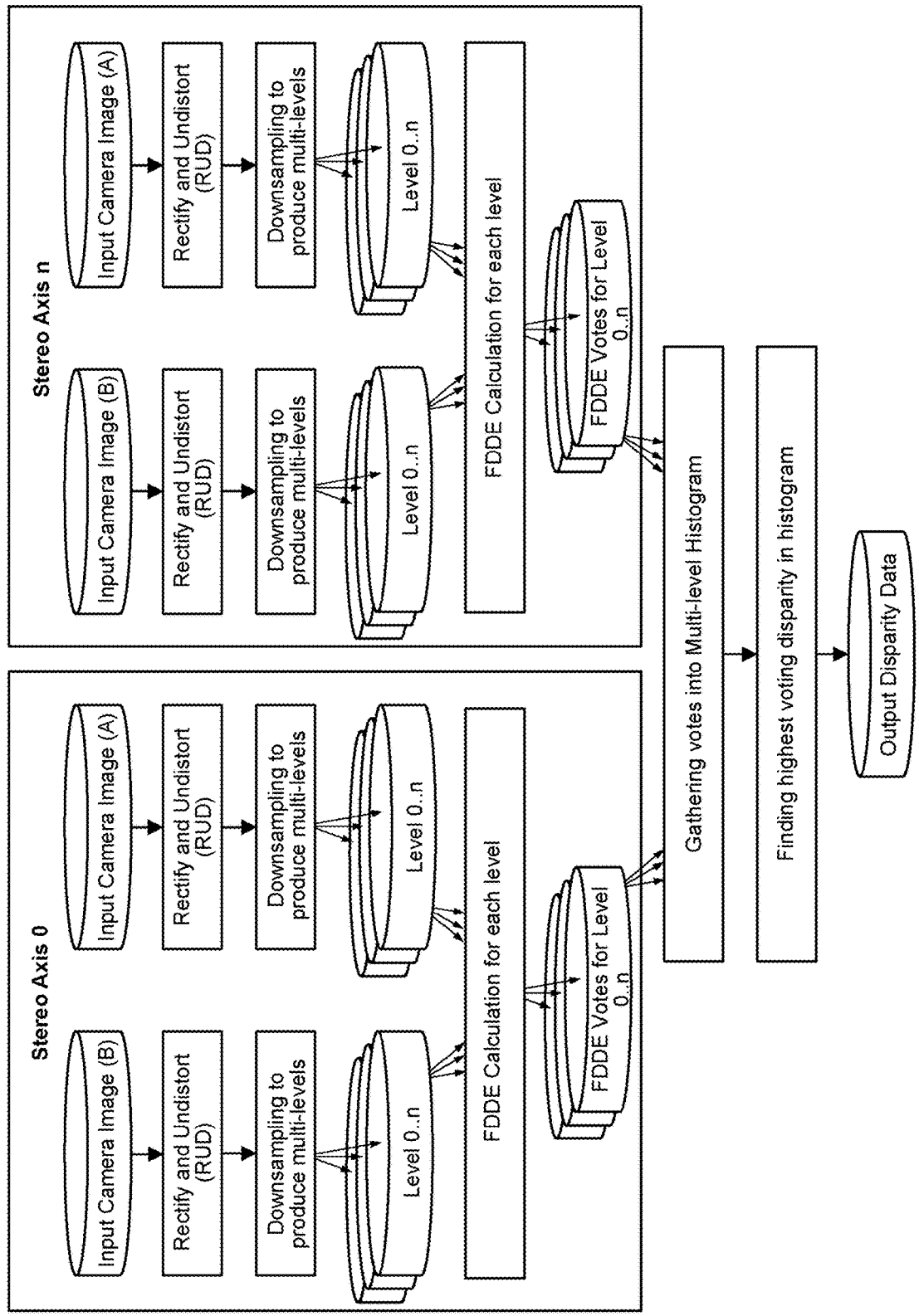

FIG. 33 is a schematic diagram of an exemplary practice of the invention. In particular. FIG. 33 depicts a processing pipeline showing the series of operations between the input camera images, through FDDE calculation and multi-level histogram voting, into a final disparity result. As shown in FIG. 33, multiple stereo axes (e.g., 0 through n) can be included into the multi-level histogram.

Having described multi-level disparity histogram representations in accordance with the invention, the following describes how the multi-level histogram is represented, and how to reliably integrate its results to locate the final, most likely disparity solution.

Representation of the Multi-Level Histogram

FIG. 34 shows a logical representation oldie multi-level histogram after votes have been placed at each level. FIG. 35 shows a physical representation of the same multi-level histogram in numeric arrays in device memory, such as the digital memory units in a conventional smartphone architecture. In an exemplary practice of the invention, the multi-level histogram consists of a series of initially independent histograms at each level of detail. Each histogram bin in a given level represents the votes for a disparity found by the FDDE at that level. Since level[n] has a fraction the resolution as that of level[n−1], each calculated disparity value represents a disparity uncertainty range which is that same fraction as wide. For example, in FIG. 34, each level is half the resolution as the one above it. As such, the disparity uncertainty range represented by each histogram bin is twice as wide as the level before it, Sub-Pixel Shifting of Input Images to Enable Multi-Level Histogram Integration In an exemplary practice of the invention, a significant detail to render the multi-level histogram integration correct involves applying a sub-pixel shift to the disparity values at each level during downsampling. As shown in FIG. 34, if we look at the votes in level[0], disparity but 8, these represent votes for disparity values 8-9. At level[1], the disparity bins are twice as wide. As such, we want to ensure that the histograms remain centered under the level above. Level[1] shows that the same bin represents 7.5 through 9.5. This half-pixel offset is highly significant, because image error can cause the disparity to be rounded to the neighbor bin and then fail to receive support from the level below.

In order to ensure that the histograms remain centered under the level above, an exemplary practice of the invention applies a half pixel shift to only one of the images in the stereo pair at each level of down sampling. This can be done inline within the weights of the filter kernel used to do the downsampling between levels. While it is possible to omit the half pixel shift and use more complex weighting during multi-level histogram summation, it is very inefficient. Performing the half pixel shift during down-sampling only involves modifying the filter weights and adding two extra taps, making it almost "free", from a computational standpoint.

Figure 36:
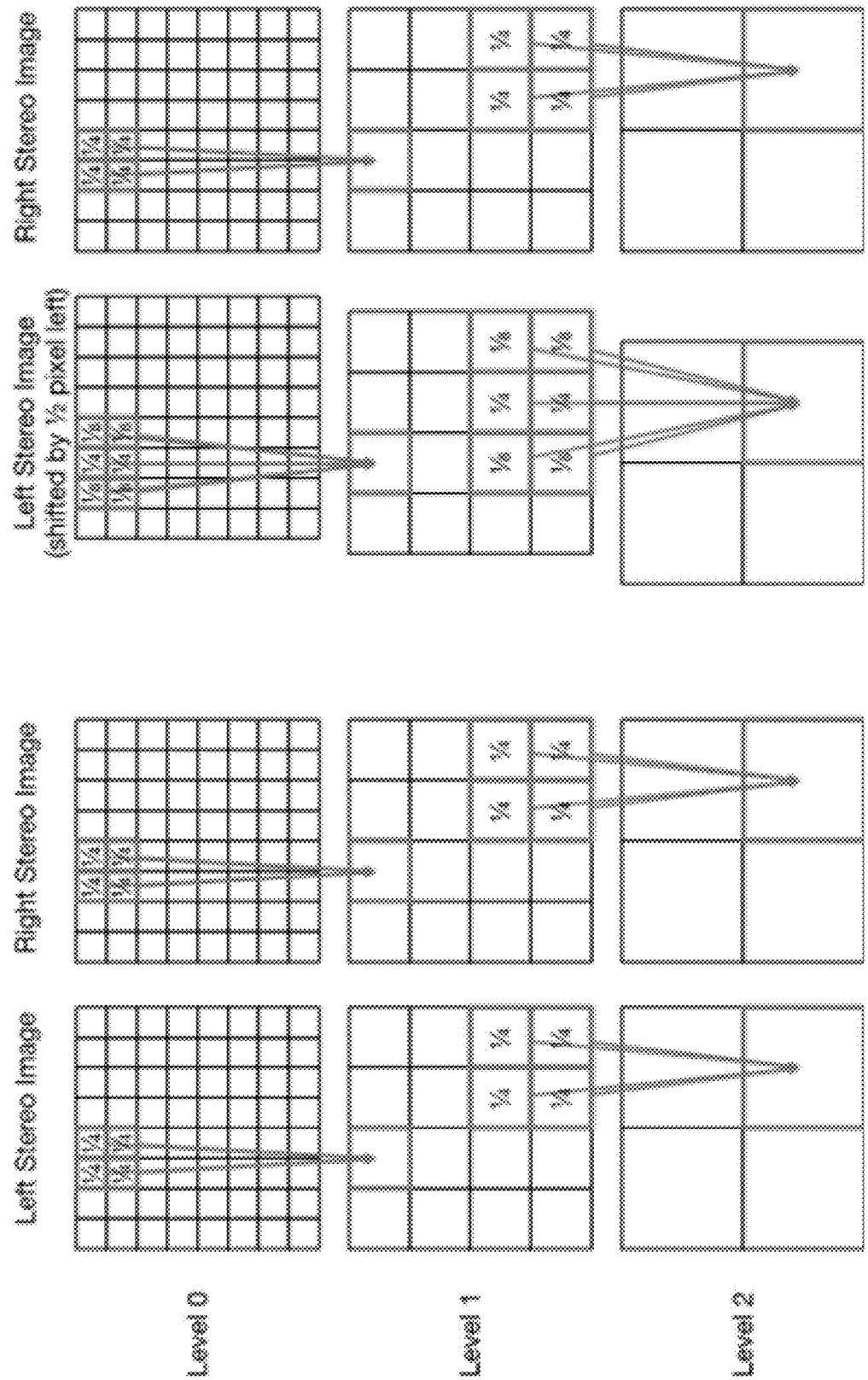
Figure 37:
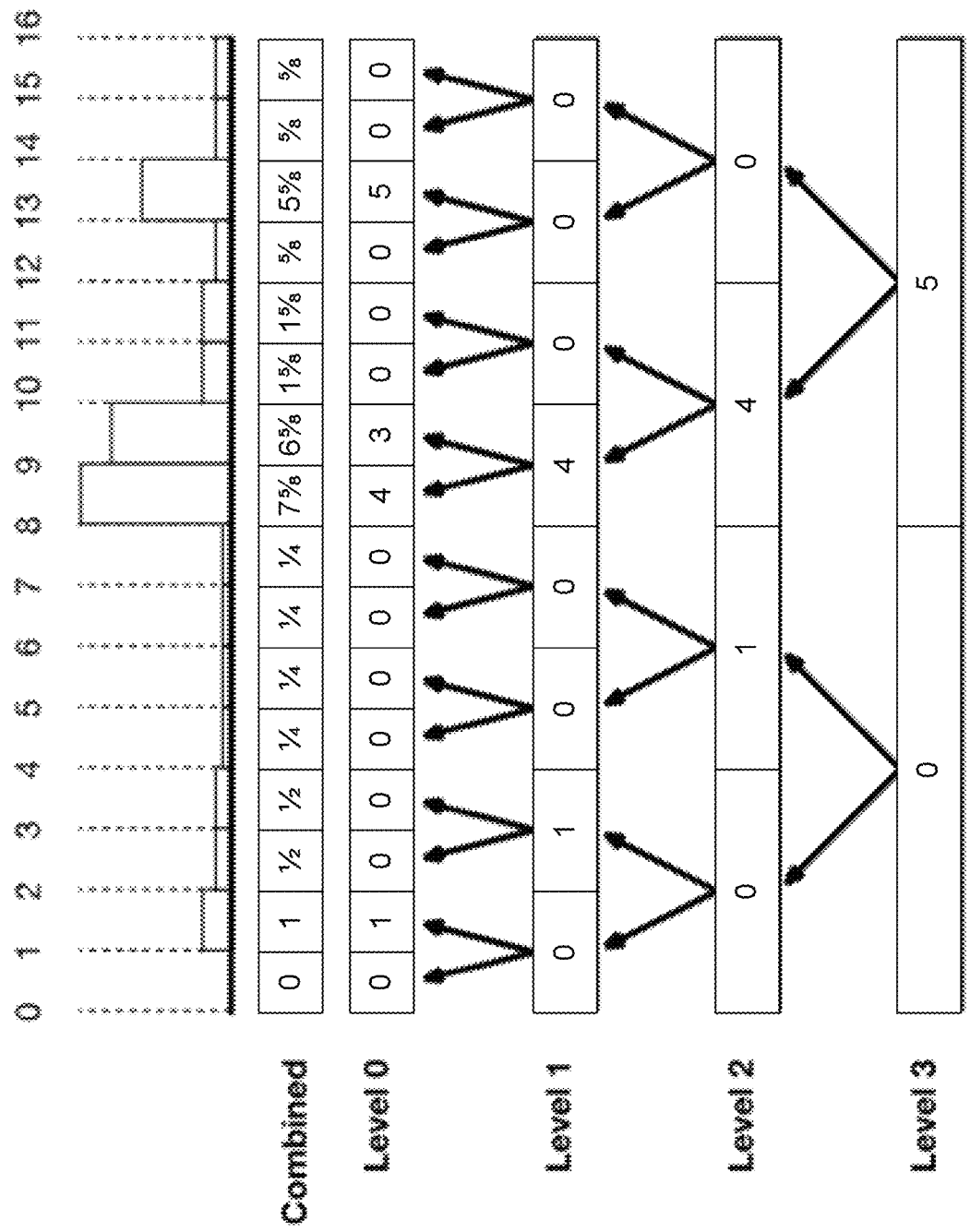

This practice of the invention is further illustrated in FIG. 36, which shows an example of per-level down-sampling according to the invention, using a 2×2 box filter. On the left is illustrated a method without a half pixel shift. On the right of FIG. 36 is illustrated the modified filter with a half pixel shift, in accordance with an exemplary practice of the invention. Note that this half pixel shift should only be applied to one of the image in the stereo pair. This has the effect of disparity values remaining centered at each level in the multi-level histogram during voting, resulting in the configuration shown in FIG. 34, Integration of the Multi-Level Histogram FIG. 37 illustrates an exemplary practice of the invention, showing an example of the summation of the multi-level histogram to produce a combined histogram in which the peak can be found. Provided that the correct sub-pixel shifting has been applied, the histogram integration involves performing a recursive summation across all of the levels as shown in FIG. 37. Typically, only the peak disparity index and number of votes for that peak are needed and thus the combined histogram does not need to be actually stored in memory. In addition, maintaining a summation stack can reduce summation operations and multi-level histogram memory access.

During the summation, the weighting of each level can be modified to control the amount of effect that the lower levels in the overall voting. In the example shown in FIG. 37, the current value at level[n] gets added to two of the bins above it in level[n−1] with a weight of ½ each.

Figure 39:
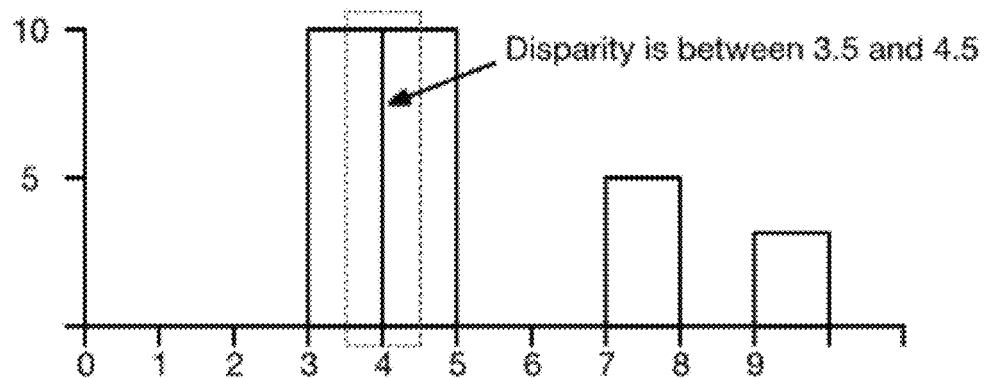
Figure 40:
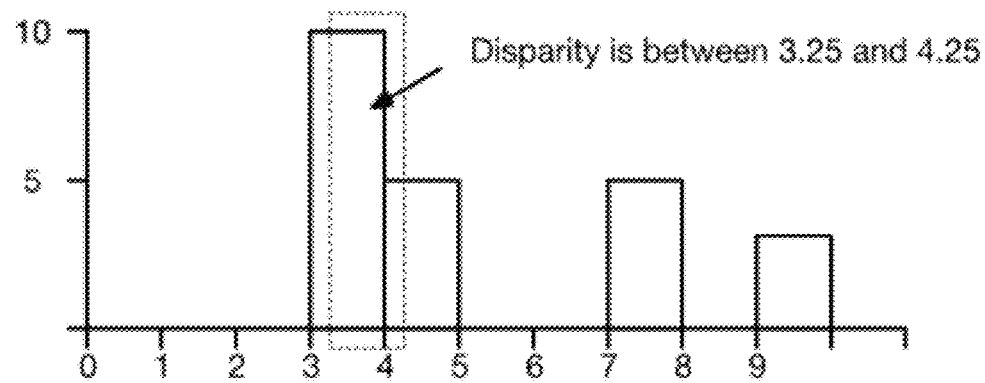

Extraction of Sub-Pixel Disparity information from Disparity Histograms,

An exemplary practice of the invention, illustrated in FIGS. 39-40, builds on the disparity histograms and allows for a higher accuracy disparity estimate to be acquired without requiring any additional SSD steps to be performed, and for only a small amount of incremental math when selecting the optimal disparity from the histogram.

Figure 38:
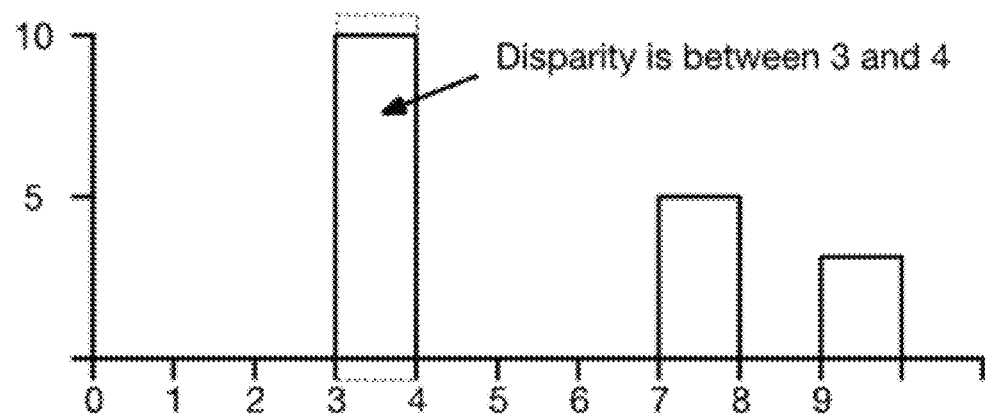

FIG. 38 is a disparity histogram for a typical pixel. In the example, there are 10 possible disparity values, each tested using SSD and then accumulated into the histogram with 10 bins. In this example, there is a clear peak in the 4th bin, which means that the disparity lies between 3 and 4 with a center point of 3.5.

FIG. 39 is a histogram in a situation in which a sub-pixel disparity solution can be inferred from the disparity histogram. We can see that an even number of votes exists in the 3rd and 4th bins. As such, we can say that the true disparity range lies between 3.5 and 4.5 with a center point of 4.0.

FIG. 40 is a histogram that reveals another case in which a sub-pixel disparity solution can be inferred. In this case, the 3rd bin is the peak with 10 votes. Its directly adjacent neighbor is at S votes. As such, we can state that the sub-pixel disparity is between these two and closer to the 3rd bin, ranging from 3.25 to 4.25, using the following equation:

$$SubpixelOffset = \frac{Votes_{2ndBest}}{2(Votes_{Best})}$$

Center-Weighted SSD Method

Another practice of the invention provides a further method of solving the problem where larger kernels in the SSD method tend to favor larger intensity differences with the overall kernel, rather than for the pixel being solved. This method of the invention involves applying a higher weight to the center pixel with a decreasing weight proportional to the distance of the given kernel sample from the center. By doing this, the error function minima will tend to be found closer to the valid solution for the pixel being solved.

Injective Constraint

Yet another aspect of the invention involves the use of an "injective constraint", as illustrated in FIGS. 41-45. When producing a disparity solution for an image, the goal is to produce the most correct results possible. Unfortunately, due to imperfect input data from the stereo cameras, incorrect disparity values will get computed, especially if only using the FDDE data produced via image comparison using SSD, SAD or one of the many image comparison error measurement techniques.

Figure 41:

FIG. 41 shows an exemplary pair of stereoscopic images and the disparity data resulting from the FDDE using SAD with a 3×3 kernel. Warmer colors represent closer objects. A close look at FIG. 41 reveals occasional values which look obviously incorrect. Some of the factors causing these errors include camera sensor noise, image color response differences between sensors and lack of visibility of a common feature between cameras.

In accordance with the invention, one way of reducing these errors is by applying "constraints" to the solution which reduce the set of possible solutions to a more realistic set of possibilities. As discussed elsewhere herein, solving the disparity across multiple stereo axes is a form of constraint, by using the solution on one axis to reinforce or contradict that of another axis. The disparity histograms are another form of constraint by limiting the set of possible solutions by filtering out spurious results in 2D space. Multi-level histograms constrain the solution by ensuring agreement of the solution across multiple frequencies in the image.

The injective constraint aspect of the invention uses geometric rules about how features must correspond between images in the stereo pair to eliminate false disparity solutions. It maps these geometric rules on the concept of an injective function in set theory.

In set theory them are four major categories of function type that map one set of items (the domain) onto another set (the co-domain):

1. Injective, surjective function (also known as a bijection): All elements in the co-domain are reference exactly once by elements in the domain.
2. Injective, non-surjective function: Some elements in the co-domain are references at most once by elements in the domain. This means that not all elements in the co-domain have to be referenced, but no element will be referenced more than once.
3. Non-injective, surjective function: All elements in the co-domain are referenced one or more times by elements in the domain.
4. Non-injective, non-surjective function: Some elements in the co-domain are referenced one or more times by elements in the domain. This means that not all elements in the co-domain have to be referenced.

In the context of feature correspondence, the domain and co-domain are pixels from each of the stereo cameras on an axis. The references between the sets are the disparity values. For example, if every pixel in the domain (image A) had a disparity value of "0", then this means that a perfect bijection exists between the two images, since every pixel in the domain maps to the same pixel in the co-domain.

Given the way that features in an image are shifted between the two cameras, we know that elements in the co-domain (Image B) can only shift in one direction (i.e. disparity values are ≥0) for diffuse features in the scene. When features exist at the same depth they will all shift together at the same rate, maintaining a bijection.

Figure 42:
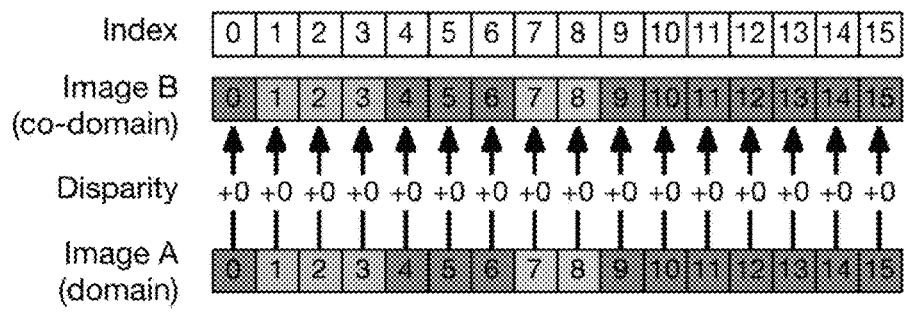

FIG. 42 shows an example of a bijection where every pixel in the domain maps to a unique pixel in the co-domain. In this case, the image features are all at infinity distance and thus do not appear to shift between the camera images.

Figure 43:
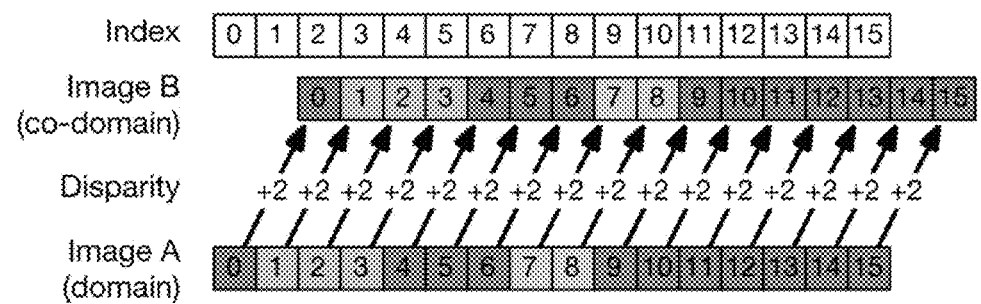

FIG. 43 shows another example of a bijection. In this case all the image features are closer to the cameras, but are all at the same depth and hence shift together.

However, since features will exist at different depths, some features will shift more than others and will sometimes even cross over each other. In this situation, occlusions in the scene will be occurring which means that sometimes, a feature visible in image "A." will be totally occluded by another object in the image "B".

In this situation, not every feature in the co-domain image will be referenced if it was occluded in the domain image. Even still, it is impossible for a feature in the co-domain to be referenced more than one time by the domain. This means that while we cannot enforce a bijective function, we can assert that the function must be injective. This is where the name "injective constraint" is derived.

Figure 44:
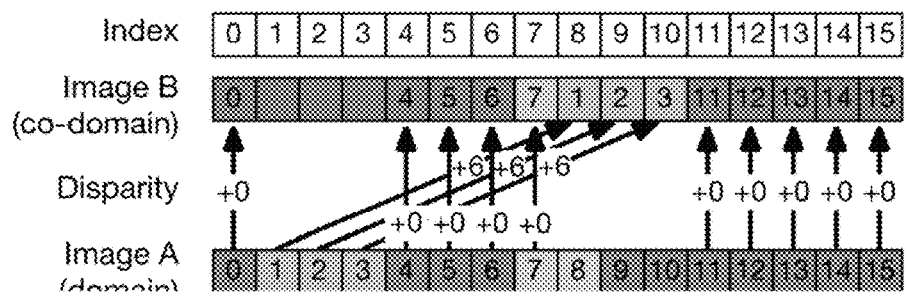
Figure 45:
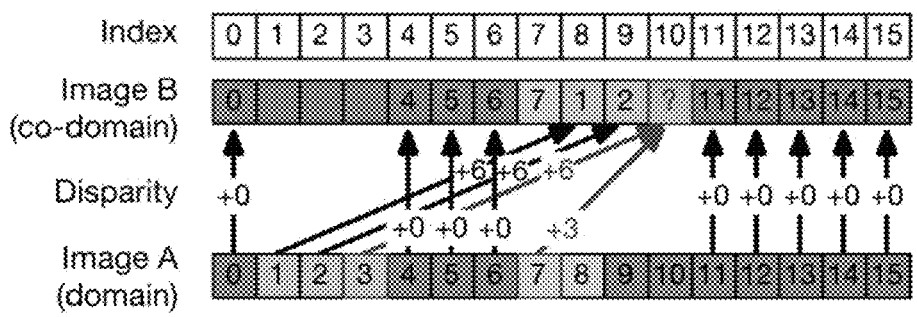

FIG. 44 shows an example of an image with a foreground and background. Note that the foreground moves substantially between images. This causes new features to be revealed in the co-domain that will have no valid reference in the domain. This is still an injective function, hut not a bijection.

In accordance with the invention, now that we know we can enforce this constraint, we are able to use it as a form of error correction in the disparity solution. In an exemplary practice of the invention, a new stage would be inserted in the feature correspondence pipeline (either after the FDDE calculation but before histogram voting, or perhaps after histogram voting) that checks for violations of this constraint. By maintaining a reference count for each pixel in the co-domain and checking to ensure that the reference count never exceeds 1, we can determine that a violation exists. (See, e.g., FIG. 45, which shows an example of a detected violation of the injective constraint.)

In accordance with the invention, if such a violation is detected, there are several ways of addressing it. These approaches have different performance levels, implementation complexity and memory overheads that will suggest which are appropriate in a given situation. They include the following:

1. First come, first served: The first element in the domain to claim an element in co-domain gets priority. If a second element claims the same co-domain element, we invalidate that match and mark it as "invalid". Invalid disparities would be skipped over or interpolated across later in the pipeline.

2. Best match wins: The actual image matching error or histogram vote count are compared between the two possible candidate element in the domain against the contested element, in the co-domain. The one with the best match wins.

Smallest disparity wins: During image reconstruction, typically errors caused by too small a disparity are less noticeable than errors with too high a disparity. As such, if there is contest for a given co-domain element, select the one with the smallest disparity and invalidate the others.

Seek alternative candidates: Since each disparity value is the result of selecting a minimum in the image comparison error function or histogram peak vote count, this means there may be alternative possible matches, which didn't score as well. As such, if there is a contest for a given co-domain element, select the 2nd or 3rd best candidate in that order. This approach may need to iterate several times in order to ensure that all violations are eliminated across the entire domain. If after a given number of fall back attempts, the disparity value could be set to "invalid" as described in (I), This attempt threshold would be a tradeoff between finding the ideal solution and computation time.

Figure 46:
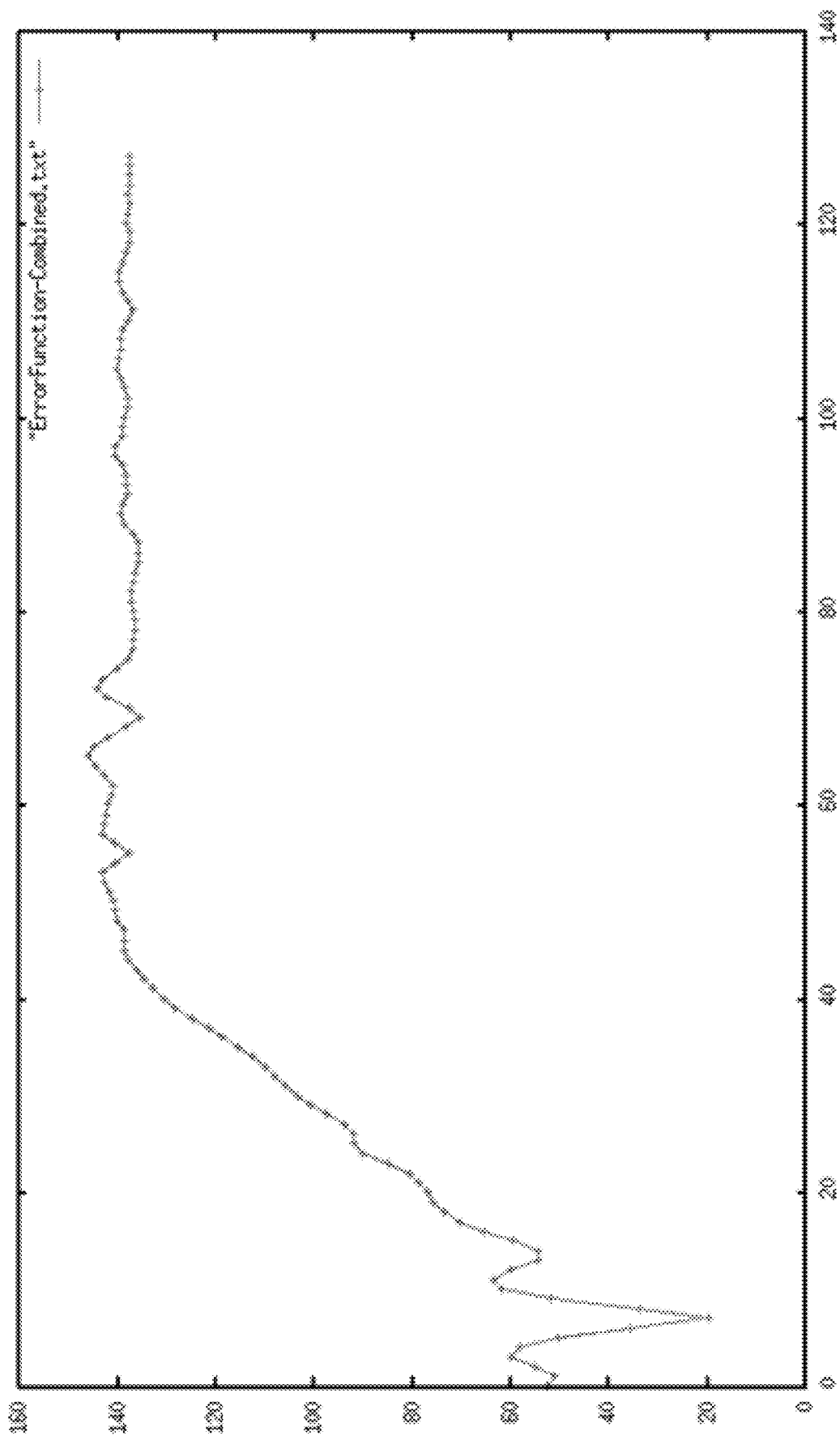
FIG. 46 is a graph in accordance with an aspect of the invention.

The concept of alternative match candidates is illustrated, by way of example, in FIG. 46, which shows a graph of an exemplary Unitize comparison error function. As shown therein, in addition to the global minimum error point, there are other error minimums that could act as alternative match candidates.

The Representation Stage

Disparity and Sample Buffer Index at 2D Control Points

An exemplary practice of the invention involves the use of a disparity value and a sample buffer index at 2D control points. This aspect works by defining a data structure representing a 2D coordinate in image space and containing a disparity value, which is treated as a "pixel velocity" in screen space with respect to a given movement of the view vector.

With a strong disparity solution, that single scalar value can be modulated with a movement vector to slide around a pixel in the source image in any direction in 2D, and it will produce a credible reconstruction of 3D image movement as if it had been taken from that different location.

In addition, the control points can contain a sample buffer index that indicates which of the camera streams to take the samples from. For example, a given feature may be visible in only one of the cameras in which case we will want to change the source that the samples are taken from when reconstructing the final reconstructed image.

Not every pixel must have a control point since the movement of most pixels can be approximated by interpolating the movement of key surrounding pixels. As such, there are several methods that can be used to establish when a pixel should be given a control point. Given that the control points are used to denote an important depth change, the control points should typically be placed along edges in the image, since edges often correspond to depth changes.

Computing edges is a known technique already present in commercially available camera pipelines and image processing. Most conventional approaches are based on the use of image convolution kernels such as the Sobel filter, and its more complex variants and derivatives. These work by taking the first derivative of the image intensity to produce a gradient field indicating the rate of change of image intensity surrounding each pixel. From this a second derivative can be taken, thus locating the peaks of image intensity change and thus the edges as would be perceived by the human vision system.

Extraction of Unique Samples for Streaming Bandwidth Reduction

This aspect of the invention is based on the observation that many of the samples in the multiple camera streams are of the same feature and are thus redundant. With a valid disparity estimate, it can be calculated that a feature is either redundant or is a unique feature from a specific camera and features/samples can be flagged with a reference count of how many of the views "reference" that feature.

Compression Method for Streaming with Video

Using the reference count established above, a system in accordance with the invention can choose to only encode and transmit samples exactly one time. For example, if the system is capturing 4 camera streams to produce the disparity and control points and have produced reference counts, the system will be able to determine whether a pixel is repeated in all the camera views, or only visible in one. As such, the system need only transmit to the encoder the chunk of pixels from each camera that are actually unique. This allows for a bandwidth reduction in a video streaming session.

Head Tracking

Tracking to Control Modulation of Disparity Values

Using conventional head tracking methods, a system in accordance with the invention can establish an estimate of the viewer's head or eye location and/or orientation. With this information and the disparity values acquired from feature correspondence or within the transmitted control point stream, the system can slide the pixels along the head movement vector at a rate that is proportional to the disparity. As such, the disparity forms the radius of a "sphere" of motion for a given feature.

This aspect allows a 3D reconstruction to be performed simply by warping a 2D image, provided the control points are positioned along important feature edges and have a sufficiently high quality disparity estimate. In accordance with this method of the invention, no 3D geometry in the form of polygons or higher order surfaces is required.

Tracking to Control Position of 2D Crop Box Location and Size in Reconstruction In order to create the appearance of an invisible device display, the system of the invention must not only re-project the view from a different view origin, but must account for the fact that as the viewer moves his or her head, they only see an aperture into the virtual scene defined by the perimeter of the device display. In accordance with a practice of the invention, a shortcut to estimate this behavior is to reconstruct the synthetic view based on the view origin and then crop the 2D image and scale it up to fill the view window before presentation, the minima and maxima of the crop box being defined as a function of the viewer head location with respect to the display and the display dimensions.

Hybrid Markerless Head Tracking

An exemplary practice of the V3D invention contains a hybrid 2D/3D head detection component that combines a fast 2D head detector with the 3D disparity data from the multi-view solver to obtain an accurate viewpoint position in 3D space relative to the camera system.

Figure 47A:
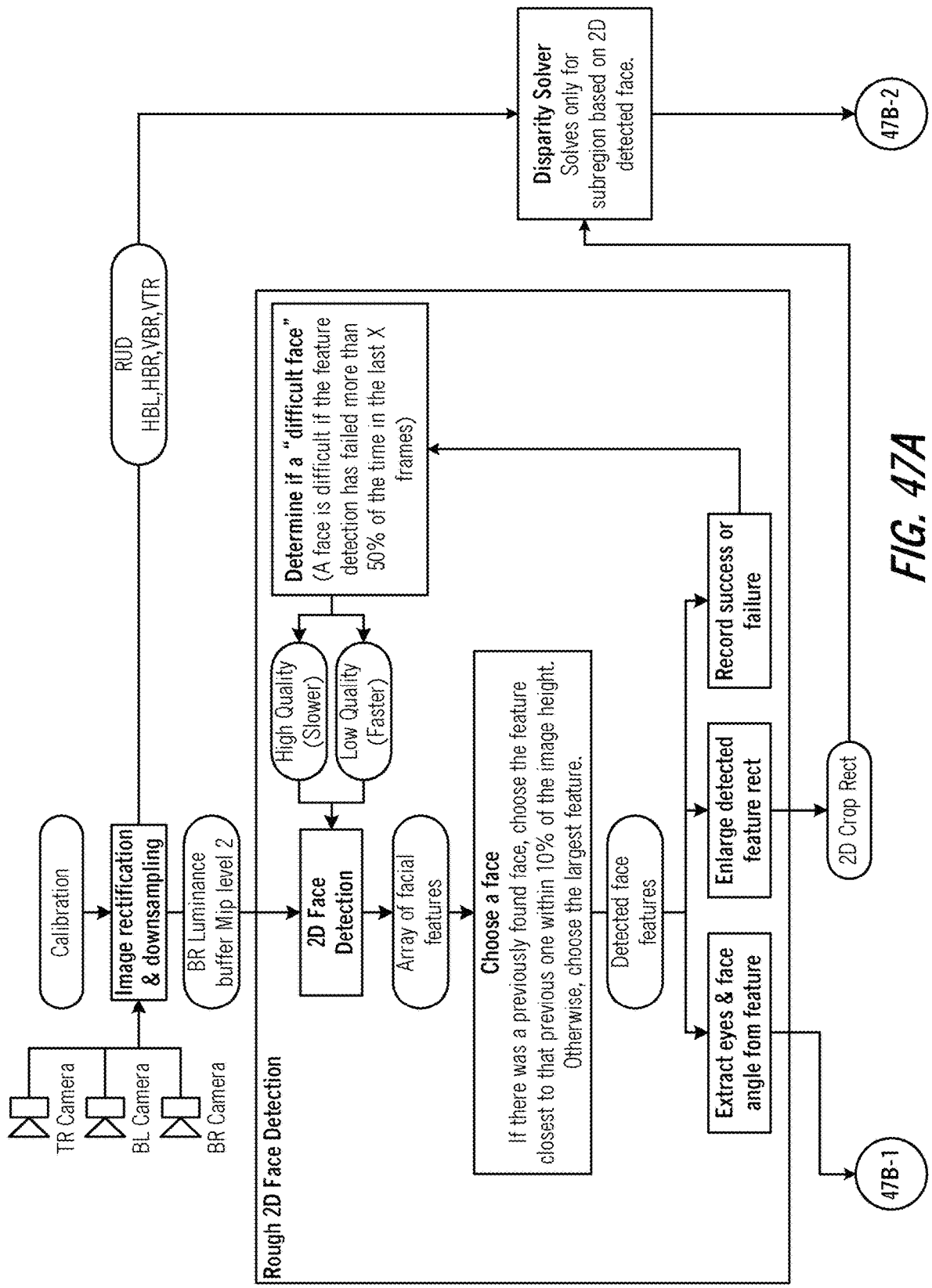
FIGS. 47A, 47B and 48-54 are schematic diagrams illustrating exemplary practices of the invention.
Figure 47B:
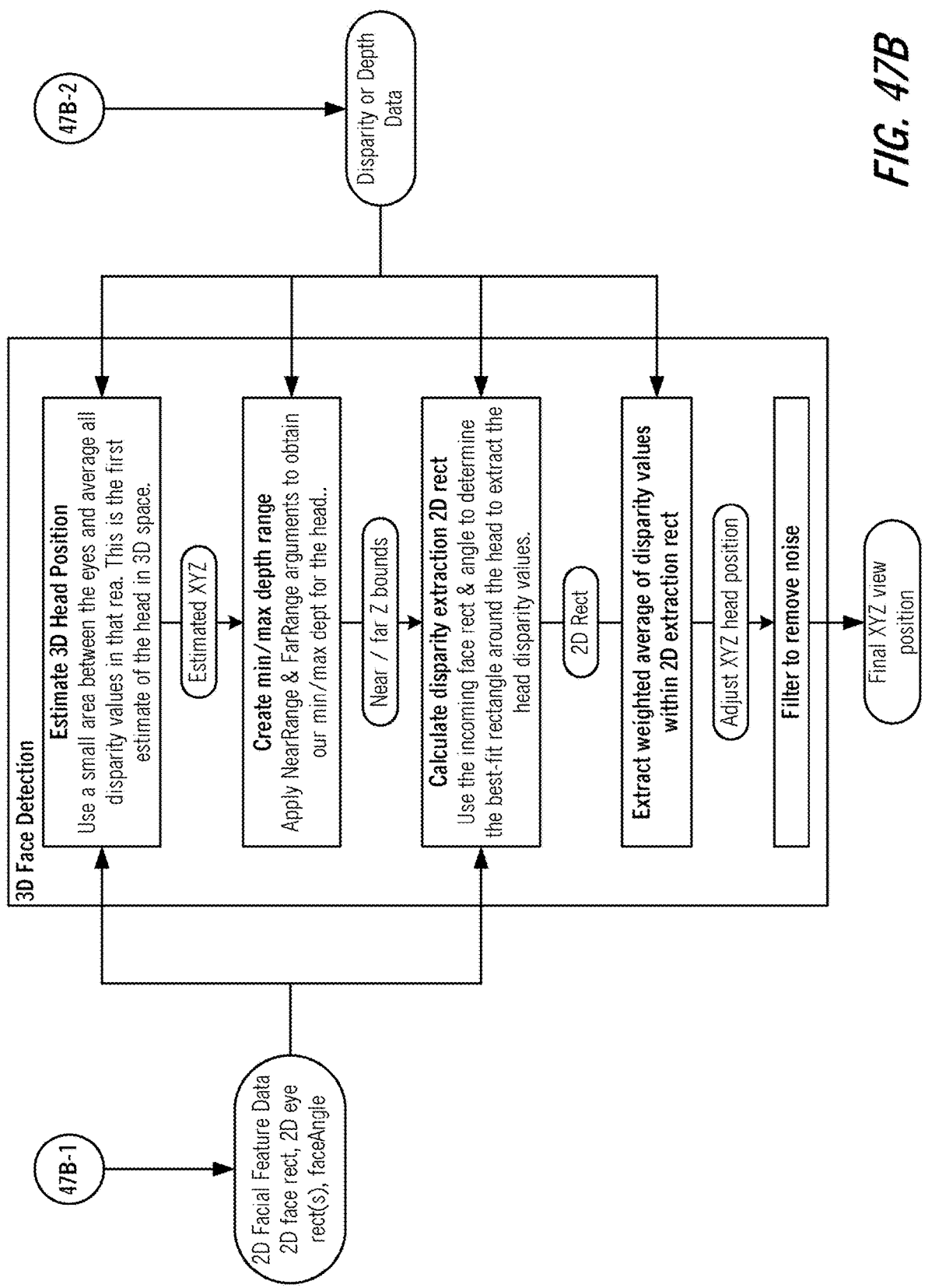

FIGS. 47A-B provide a flow diagram that illustrates the operation of the hybrid markerless head tracking system. As shown in FIGS. 47A-B, starting with an image captured by one of the color cameras, the system optionally converts to luminance and downsamples the image, and then passes it to a basic 2D facial feature detector. The 2D feature detector uses the image to extract an estimate of the head and eye position as well as the face's rotation angle relative to the image plane. These extracted 2D feature positions are extremely noisy from frame to frame which, if taken alone as a 3D viewpoint, would not be sufficiently stable for the intended purposes of the invention. Accordingly, the 2D feature detection is used as a starting estimate of a head position.

The system uses this 2D feature estimate to extract 3D points from the disparity data that exists in the same coordinate system as the original 2D image. The system first determines an average depth for the face by extracting 3D points via the disparity data for a small area located in the center of the face. This average depth is used to determine a reasonable valid depth range that would encompass the entire head.

Using the estimated center of the face, the face's rotation angle, and the depth range, the system then performs a 2D ray march to determine a best-fit rectangle that includes the head. For both the horizontal and vertical axis, the system calculates multiple vectors that are perpendicular to the axis but spaced at different intervals. For each of these vectors, the system tests the 3D points starting from outside the head and working towards the inside, to the horizontal or vertical axis. When a 3D point is encountered that falls within the previously designated valid depth range, the system considers that a valid extent of the head rectangle.

From each of these ray marches along each axis, the system can determine a best-fit rectangle for the head, from which the system then extracts all 3D points that lie within this best-fit rectangle and calculates a weighted average. If the number of valid 3D points extracted from this region pass a threshold in relation to the maximum number of possible 3D points in the region, then there is designated a valid 3D head position result.

Figure 48:
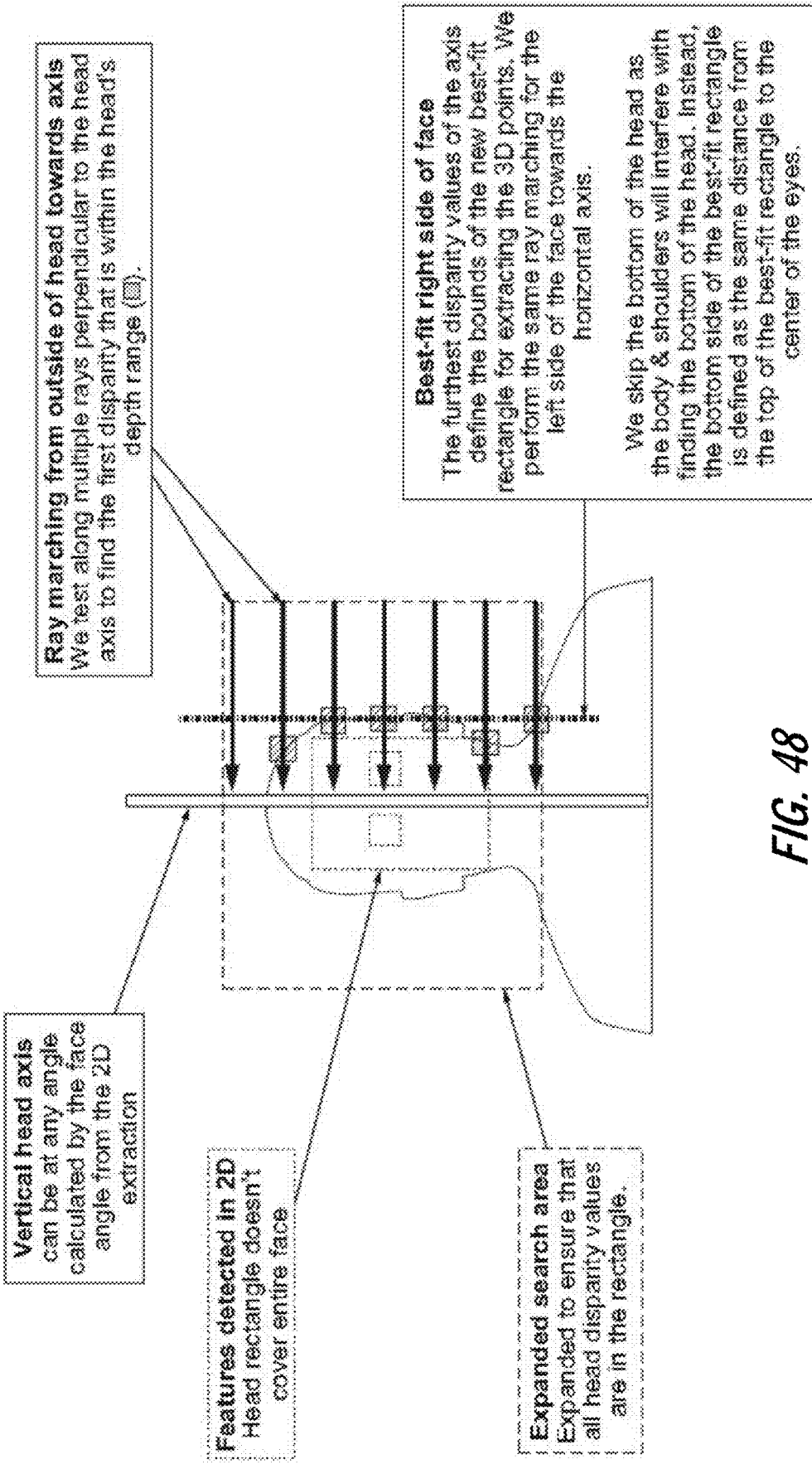

FIG. 48 is a diagram depicting this technique for calculating the disparity extraction two-dimensional rectangle (i.e., the "best-fit rectangle").

To compensate fir noise in the 3D position, the system can interpolate from frame-to-frame based on the time delta that has passed since the previous frame.

Reconstruction

2D Warping Reconstruction of Specific View from Samples and Control Points

This method of the invention works by taking one or more source images and a set of control points as described previously. The control points denote "handles" on the image which we can then move around in 2D space and interpolate the pixels in between. The system can therefore slide the control points around in 2D image space proportionally to their disparity value and create the appearance of an image taken from a different 3D perspective. The following are details of how the interpolation can be accomplished in accordance with exemplary practices of the invention.

Lines

This implementation of 2D warping uses the line drawing hardware and texture filtering available on modern GPU hardware, such as in a conventional smartphone or other mobile device. It has the advantages of being easy to implement, fast to calculate, and avoiding the need to construct complex connectivity meshes between the control points in multiple dimensions.

It works by first rotating the source images and control points coordinates such that the rows or columns of pixels are parallel to the vector between the original image center and the new view vector. For purposes of this explanation, assume the view vector is aligned to image scanlines. Next, the system iterates through each scanline and goes through all the control points for that scanline. The system draws a line beginning and ending at each control point in 2D image space, but adds the disparity multiplied by the view vector magnitude with the x coordinate. The system assigns a texture coordinate to the beginning and end points that is equal to their original 2D location in the source image.

The GPU will draw the line and will interpolate the texture coordinates linearly along the line. As such, image data between the control points will be stretched linearly. Provided control points are placed on edge features, the interpolation will not be visually obvious.

After the system has drawn all the lines, the result is a re-projected image, which is then rotated back by the inverse of the rotation originally applied to align the view vector with the scanlines.

Polygons

This approach is related to the lines but works by linking control points not only along a scanline but also between scanlines. In certain cases, this may provide a higher quality interpolation than lines alone.

Stretch/Slide

This is an extension of the control points data structure and effects the way the reconstruction interpolation is performed, it helps to improve the reconstruction quality on regions of large disparity/depth change. In such regions, for example on the boundary of a foreground and background object, it is not always idea to interpolate pixels between control points, but rather to slide the foreground and background independently of each other. This will open up a void in the image, but this gets filled with samples from another camera view.

The determination of when it is appropriate to slide versus the default stretching behavior can be made by analyzing the disparity histogram and checking for multi-modal behavior, if two strong modes are present, this indicates the control point is on a boundary where it would be better to allow the foreground and background to move independently rather than interpolating depth between them.

Other practices of the invention can include a 2D crop based on head location (see the discussion above relating to head tracking), and rectification transforms for texture coordinates. Those skilled in the art will understand that the invention can be practiced in connection with conventional 2D displays, or various forms of head-mounted stereo displays (HMDs), which may include binocular headsets or lenticular displays.

Digital Processing Environment in which Invention can be Implemented

Those skilled in the art will understand that the above described embodiments, practices and examples of the invention can be implemented using known network, computer processor and telecommunications devices, in which the telecommunications devices can include known forms of cellphones, smartphones, and other known forms of mobile devices, tablet computers, desktop and laptop computers, and known forms of digital network components and server/cloud/network/client architectures that enable communications between such devices.

Those skilled in the art will also understand that method aspects of the present invention can be executed in commercially available digital processing systems, such as servers, PCs, laptop computers, tablet computers, cellphones, smartphones and other forms of mobile devices, as well as known forms of digital networks, including architectures comprising server, cloud, network, and client aspects, for communications between such devices.

The terms "computer software," "computer code product," and "computer program product" as used herein can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the cellphone, smartphone, tablet computer, PC, laptop, computer-driven television, or other digital processing device or system. Various forms of computer readable elements and media are well known in the computing arts, and their selection is left to the implementer.

In addition, those skilled in the art will understand that the invention can be implemented using computer program modules and digital processing hardware elements, including memory units and other data storage units, and including commercially available processing units, memory units, computers, servers, smartphones and other computing and telecommunications devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Jaya, and the like. It will also be understood that method operations shown in the flowcharts can be executed in different orders, and that not alt operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

The Applicant has implemented various aspects and exemplary practices of the present invention, using, among others, the following commercially available elements:

1. A 7"1280×800 IPS display.
2. Three PointGrey Chameleon3 (CM3-U3-13S2C-CS) 1.3 Megapixel camera modules with ⅓" sensor size assembled on a polycarbonate plate with shutter synchronization circuit
3. Sunex DSL377A-650-F/2.8 M12 wide-angle lenses.
4. An intel Core i7-4650U processor which includes on-chip the following
    a. An Intel HD Graphics 5000 Integrated Graphics Processing Unit; and
    b. An Intel QuickSync video encode and decode hardware pipeline.
5. OpenCL API on an Apple Mae OS X operating system to implement, in accordance with exemplary practices of the invention described herein, Image Rectification, Fast Dense Disparity Estimate(s) (FDDE) and Multi-level Disparity Histogram aspects.
6. Apple CoreVideo and VideoToolbox APIs to access QuickSync video compression hardware.

7. OpenCL and OpenGL API(s) for V3D view reconstruction in accordance with exemplary practices of the invention described herein.

Figure 49:
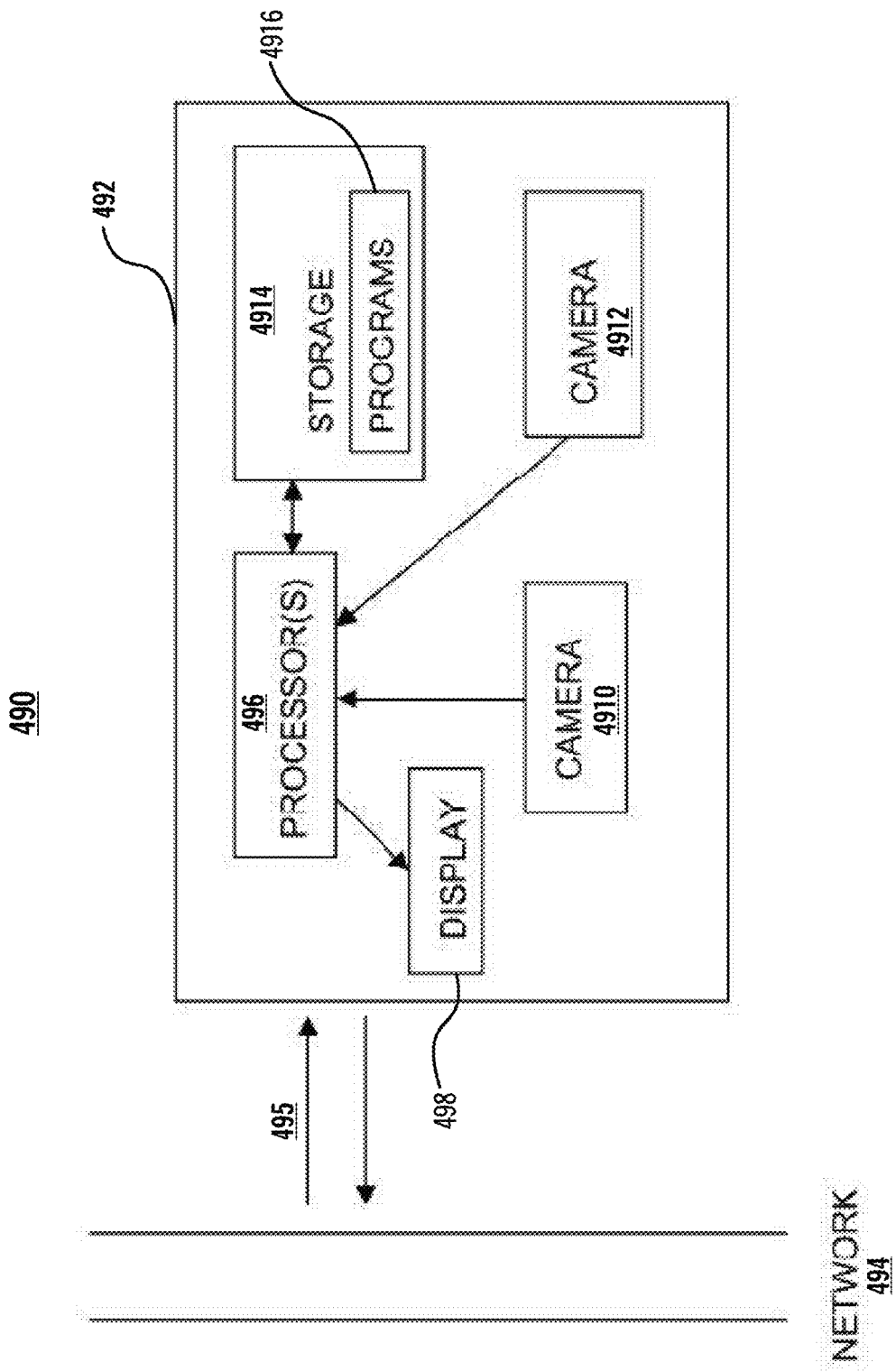
Figure 50:
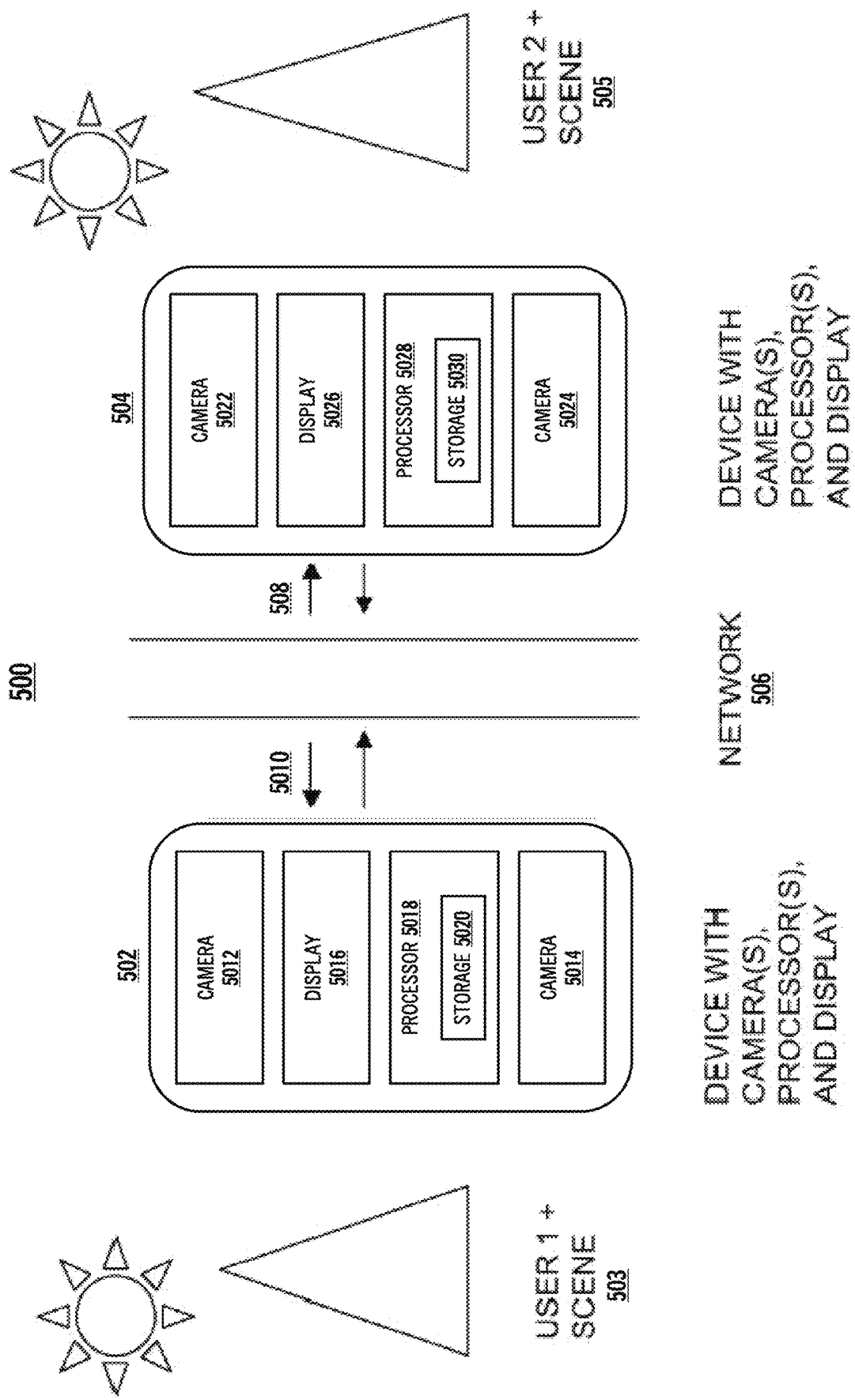
Figure 51:
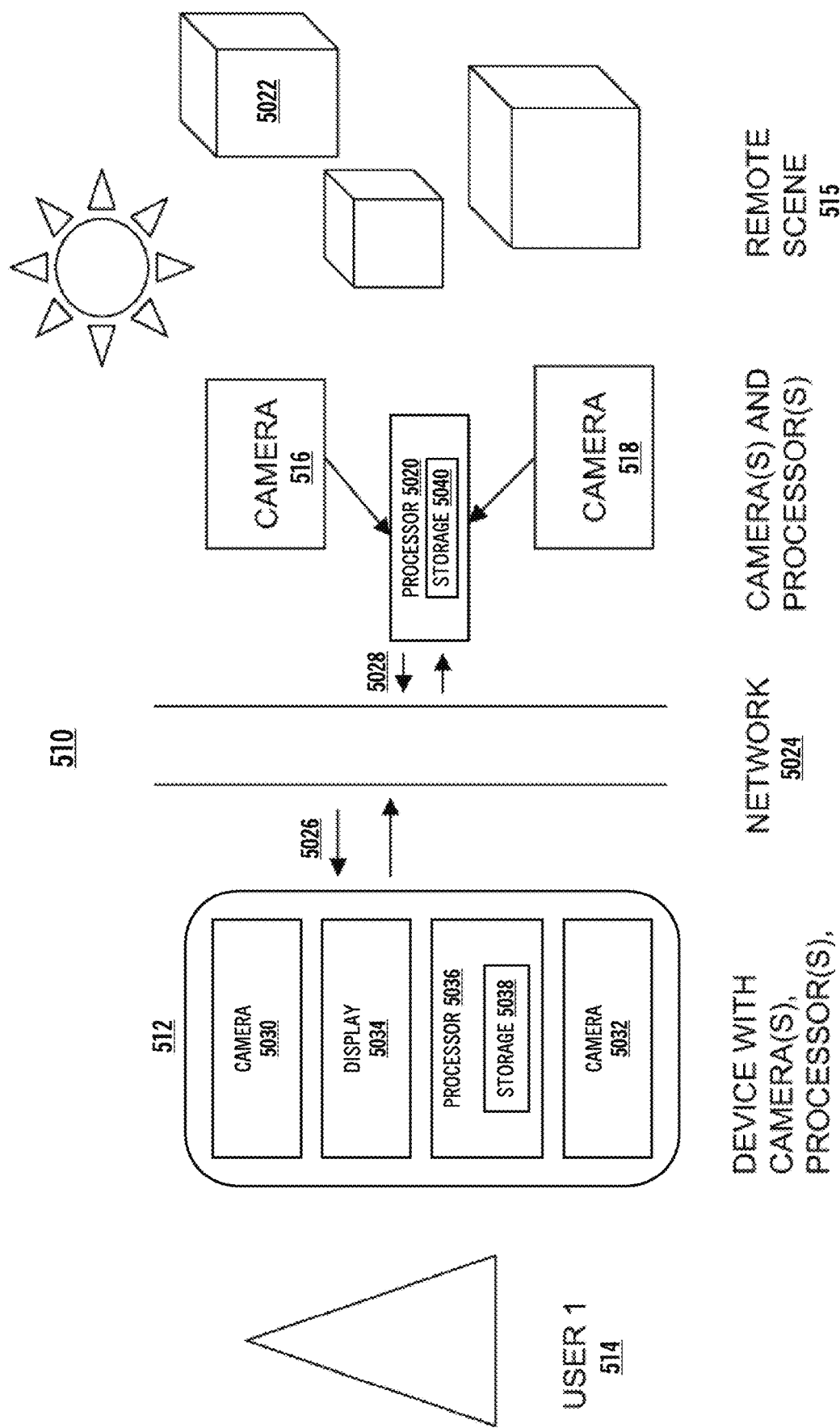
Figure 52:
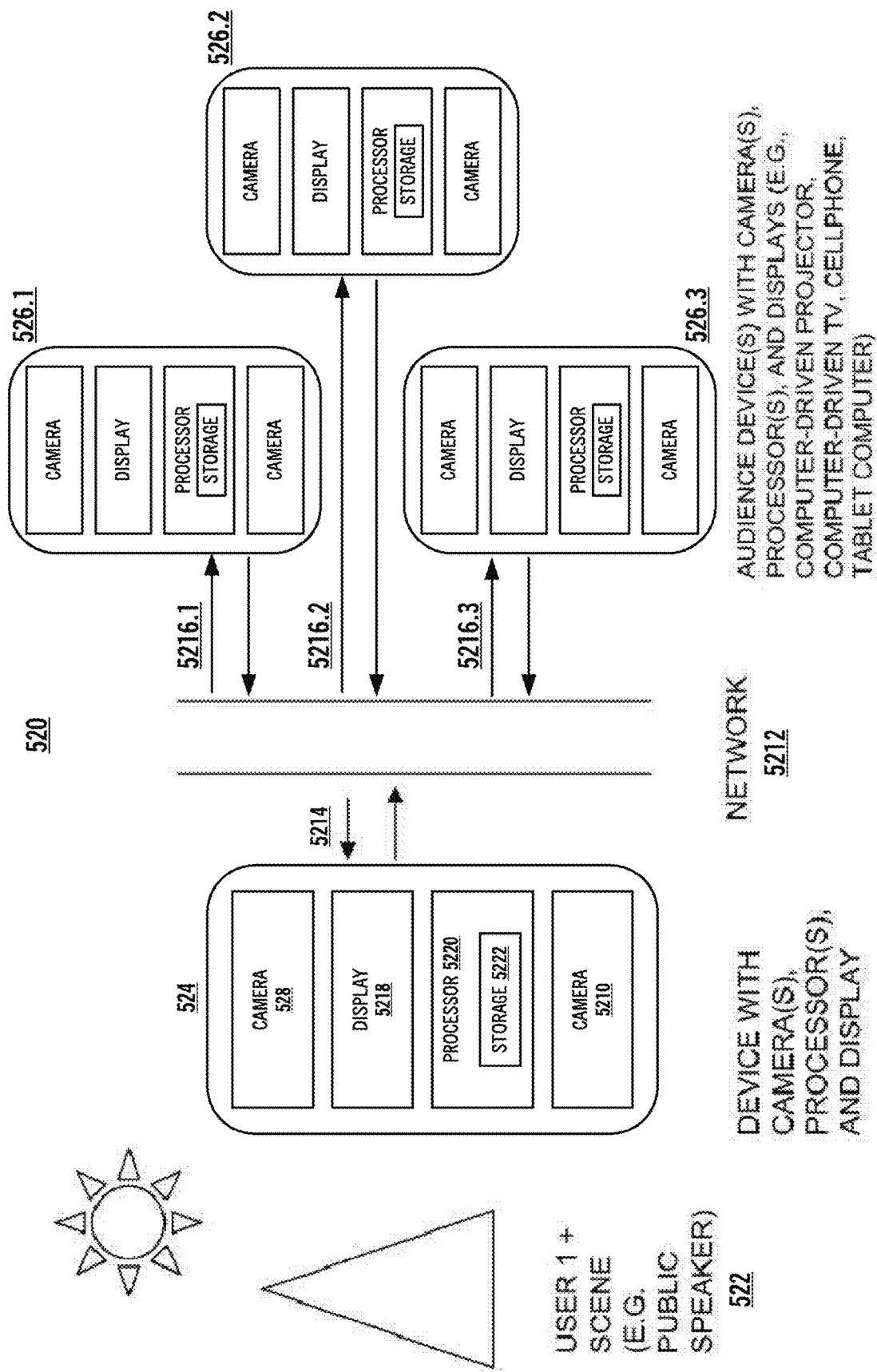
Figure 53:
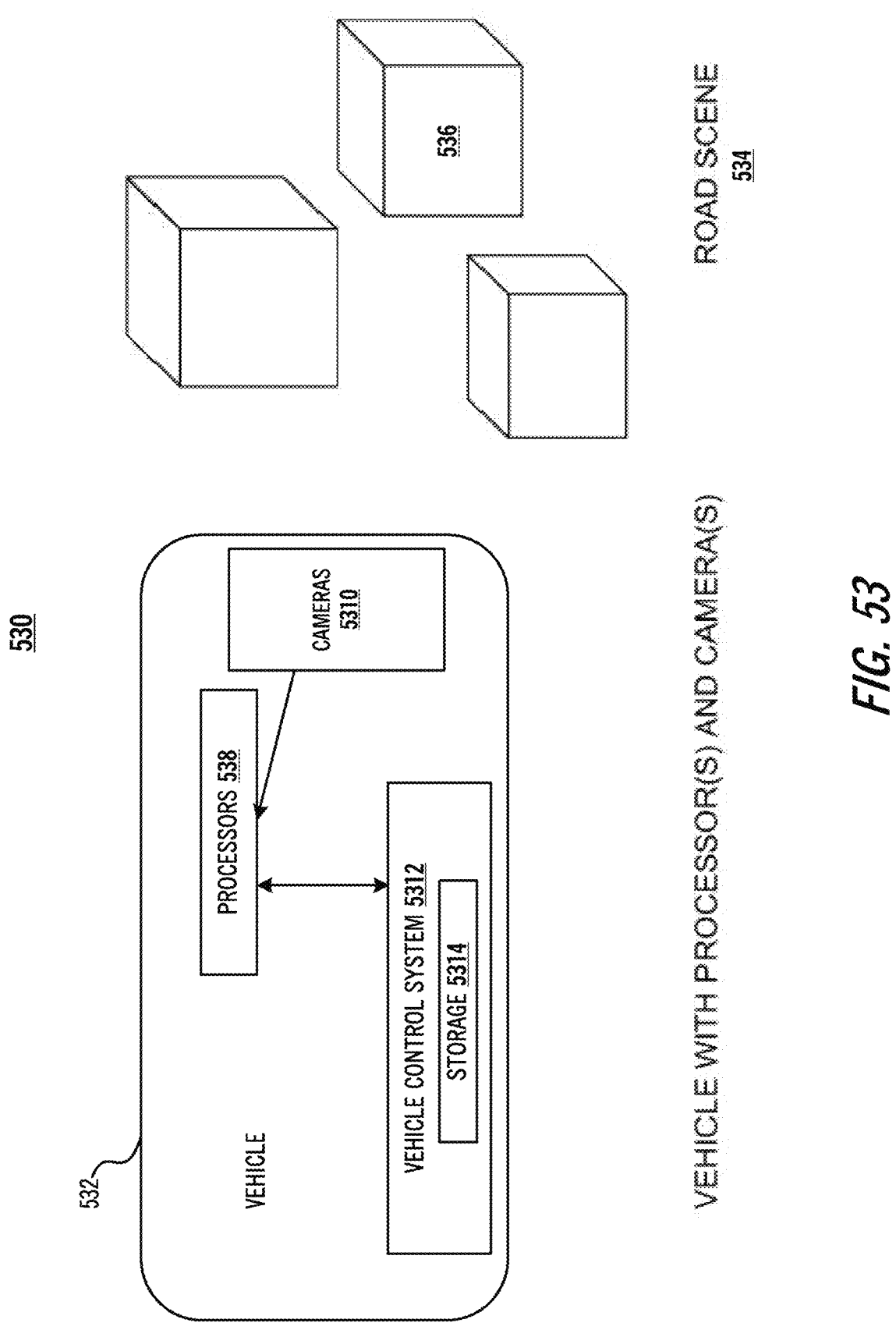
Figure 54:
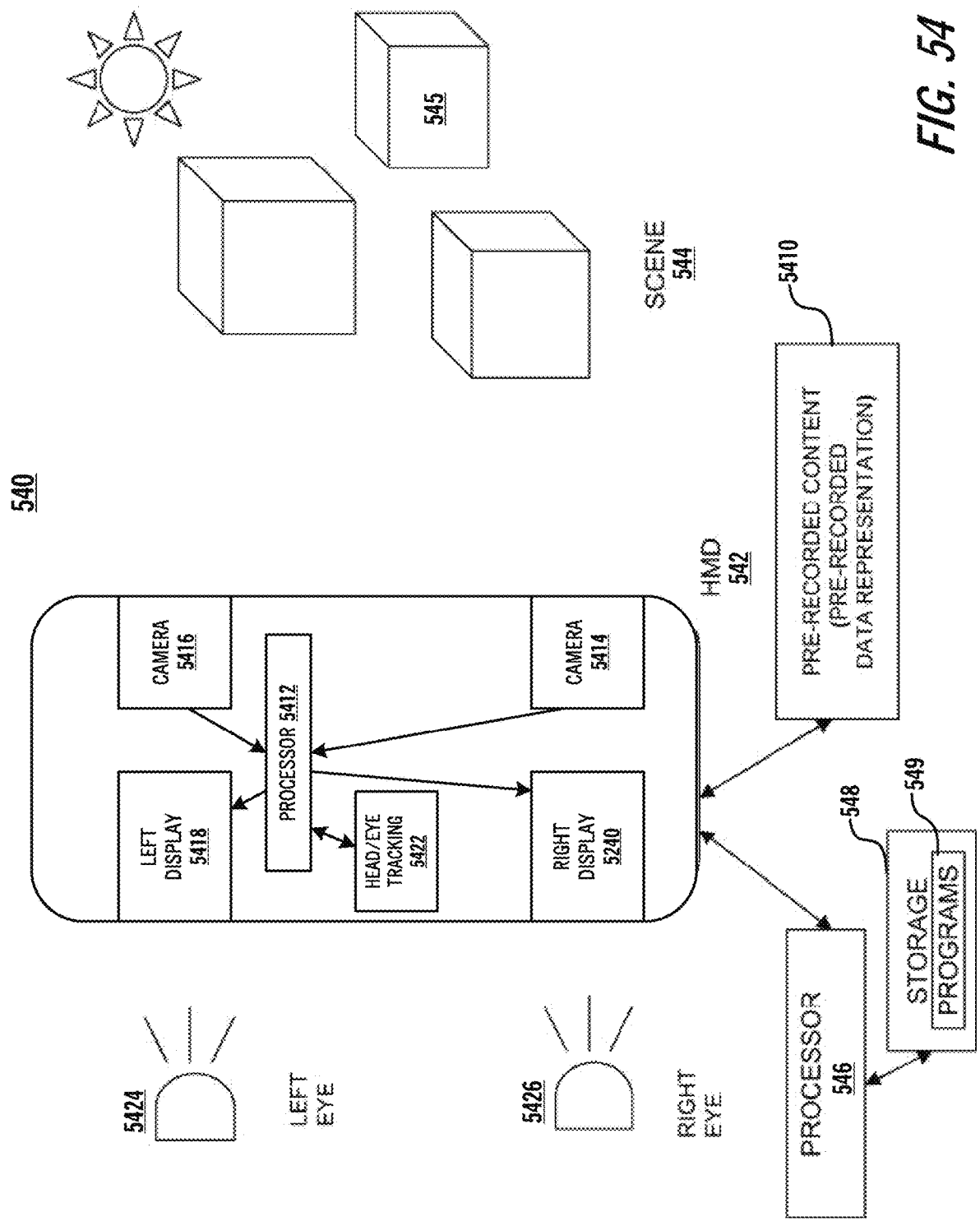

The attached schematic diagrams FIGS. 49-54 depict system aspects of the invention, including digital processing devices and architectures in which the invention can be implemented. By way of example, FIG. 49 depicts a digital processing device, such as a commercially available smartphone, in which the invention can be implemented; FIG. 50 shows a full-duplex, bi-directional practice of the invention between two users and their corresponding devices; FIG. 51 shows the use of a system in accordance with the invention to enable a first user to view a remote scene; FIG. 52 shows a one-to-many configuration in which multiple users (e.g., audience members) can view either simultaneously or asynchronously using a variety of different viewing elements in accordance with the invention; FIG. 53 shows an embodiment of the invention in connection with generating an image data stream for the control system of an autonomous or self-driving vehicle; and FIG. 54 shows the use of a head-mounted display (HMD) in connection with the invention, either in a pass-through mode to view an actual, external scene (shown on the right side of FIG. 54), or to view prerecorded image content.

Referring now to FIG. 49, the commercially available smartphone, tablet computer or other digital processing device 492 communicates with a conventional digital communications network 494 via a communications pathway 495 of known form (the collective combination of device 492, network 494 and communications pathway(s) 495 forming configuration 490), and the device 492 includes one or more digital processors 496, cameras 4910 and 4912, digital memory or storage element(s) 4914 containing, among other items, digital processor-readable and processor-executable computer program instructions (programs) 4916, and a display element 498. In accordance with known digital processing techniques, the processor 496 can execute programs 4916 to carry out various operations, including operations in accordance with the present invention.

Referring now to FIG. 50, the full-duplex, hi-directional practice of the invention between two users and their corresponding devices (collectively forming configuration 500) includes first user and scene 503, second user and scene 505, smartphones, tablet computers or other digital processing devices 502, 504, network 506 and communications pathways 508, 5010, The devices 502, 504 respectively include cameras 5012, 5014, 5022, 5024, displays 5016, 5026, processors 5018, 5028, and digital memory or storage elements 5020, 5030 (which may store processor-executable computer program instructions, and which may be separate from the processors).

The configuration 510 of FIG. 51, in accordance with the invention, for enabling a first user 514 to view a remote scene 515 containing objects 5022, includes smartphone or other digital processing device 5038, which can contain cameras 5030,5032, a display 5034, one or more processor(s) 5036 and storage 5038 (which can contain computer program instructions and which can be separate from processor 5036). Configuration 510 also includes network 5024, communications pathways 5026, 5028, remote cameras 516, 518 with a view of the remote scene 515, processor(s) 5020, and digital memory or storage element(s) 5040 (which can contain computer program instructions, and which can be separate from processor 5020).

The one-to-many configuration 520 of FIG. 52, in which multiple users (e.g., audience members) using smartphones, tablet computers or other devices 526.1, 526.2, 526.3 can view a remote scene or remote first user 522, either simultaneously or asynchronously, in accordance with the invention, includes digital processing device 524, network 5212 and communications pathways 5214, 5216.1, 5216.2, 5216.3. The smartphone or other digital processing device 524 used to capture images of the remove scene or last user 522, and the smartphones or other digital processing devices 526.1, 526.2, 526.3 used by respective viewers/audience members, include respective cameras, digital processors, digital memory or storage element(s) (which may store computer program instructions executable by the respective processor, and which may be separate from the processor), and displays.

The embodiment or configuration 530 of the invention, illustrated in FIG. 53, for generating an image data stream for the control system 5312 of an autonomous or self-driving vehicle 532, can include camera(s) 5310 having a view of scene 534 containing objects 536, processor(s) 538 (which may include or have in communication therewith digital memory or storage elements for storing data and/or processor-executable computer program instructions) in communication with vehicle control system 5312. The vehicle control system 5312 may also include digital storage or memory element(s) 5314, which may include executable program instructions, and which may be separate from vehicle control system 5312.

HMD-related embodiment or configuration 540 of the invention, illustrated in FIG. 54, can include the use of a head-mounted display (HMD) 542 in connection with the invention, either in a pass-through mode to view an actual, external scene 544 containing objects 545 (shown on the right side of FIG. 54), or to view prerecorded image content or data representation 5410. The HMD 542, which can be a purpose-built HMD or an adaptation of a smartphone or other digital processing device, can be in communication with an external processor 546, external digital memory or storage element(s) 548 that can contain computer program instructions 549, and/or in communication with a source of prerecorded content or data representation 5410, The HMD 542 shown in FIG. 54 includes cameras 5414 and 5416 which can have a view of actual scene 544; left and right displays 5418 and 5420 for respectively displaying to a user's left and right eyes 5424 and 5426; digital processor(s) 5412, and a head/eye/face tracking element 5422. The tracking element 5422 can consist of a combination of hardware and software elements and algorithms, described in greater detail elsewhere herein, in accordance with the present invention. The processor element(s) 5412 of the HMD can also contain, or have proximate thereto, digital memory or storage elements, which may store processor-executable computer program instructions.

In each of these examples, illustrated in FIGS. 49-54, digital memory or storage elements can contain digital processor-executable computer program instructions, which, when executed by a digital processor, cause the processor to execute operations in accordance with various aspects of the present invention, Flowcharts of Exemplary Practices of the Invention FIGS. 55-80 are flowcharts illustrating method aspects and exemplary practices of the invention. The methods depicted in these flowcharts are examples only; the organization, order and number of operations in the exemplary practices can be varied; and the exemplary practices and methods can be arranged or ordered differently, and include different functions, whether singly or in combination, while still being within the spirit and scope of the present invention. Items described below in parentheses are, among other aspects, optional in a given practice of the invention.

Figure 55:
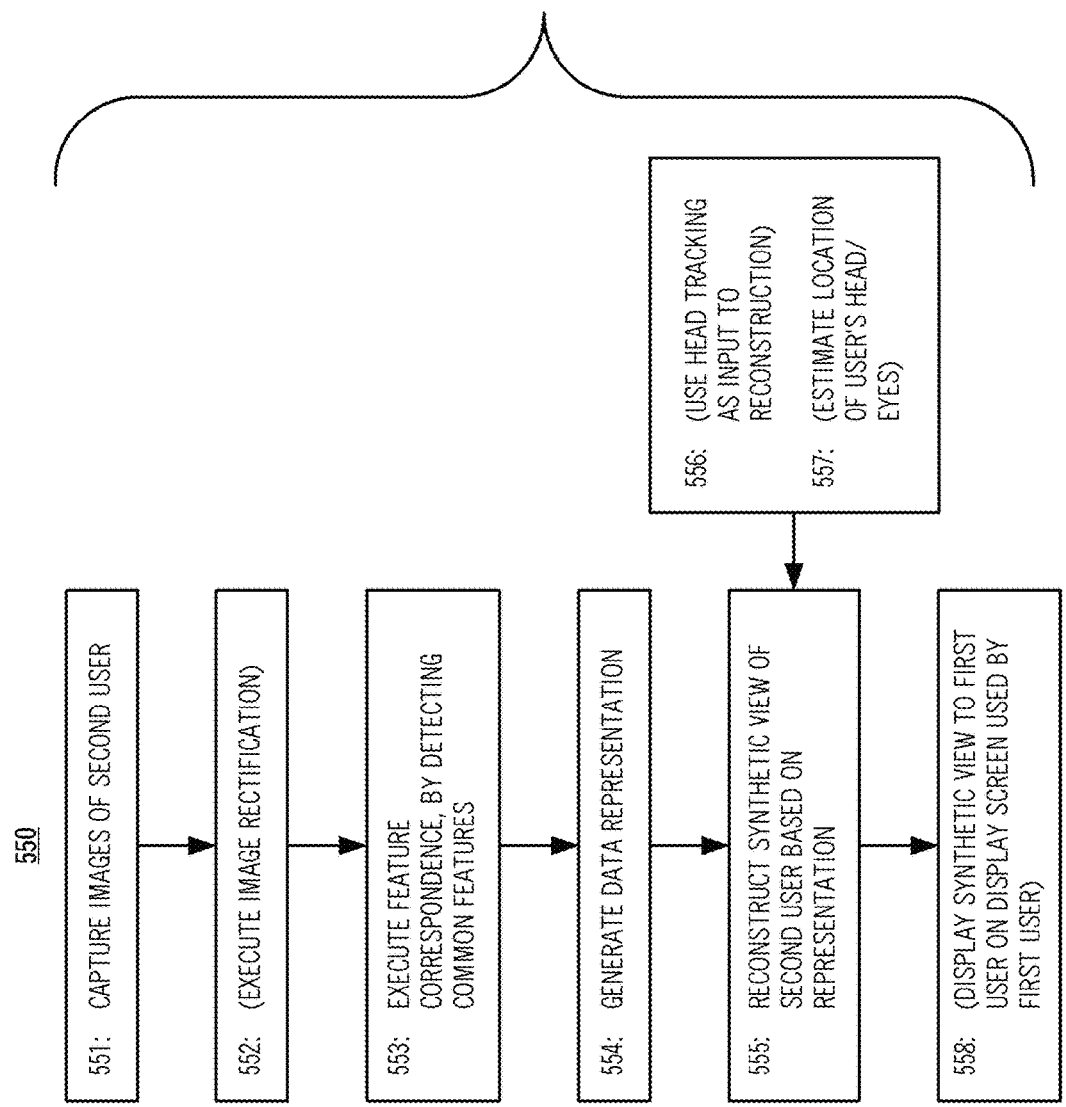

FIG. 55 is a flowchart of a V3D method 550 according to an exemplary practice of the invention, including the following operations:

551: Capture images of second user;
552: Execute image rectification;
553: Execute feature correspondence, by detecting common features;
554: Generate data representation;
555: Reconstruct synthetic view of second user based on representation;
556: Use head tracking as input to reconstruction;
557: Estimate location of user's head/eyes;
558: Display synthetic view to first user on display screen used by first user; and
559: Execute capturing, generating, reconstructing, and displaying such that the first user can have direct virtual eye contact with second user through first user's display screen, by reconstructing and displaying synthetic view of second user in which second user appears to be gazing directly at first user even if no camera has direct eye contact gaze vector to second user;
(Execute such that first user is provided visual impression of looking through display screen as a physical window to second user and visual scene surrounding second user, and first user is provided immersive visual experience of second user and scene surrounding the second user);
(Camera shake effects are inherently eliminated, in that capturing, detecting, generating, reconstructing and displaying are executed such that first user has virtual direct view through his display screen to second User and visual scene surrounding second user; and scale and perspective of image of second user and objects in visual scene surrounding second user are accurately represented to first user regardless of user view distance and angle).

Figure 56:
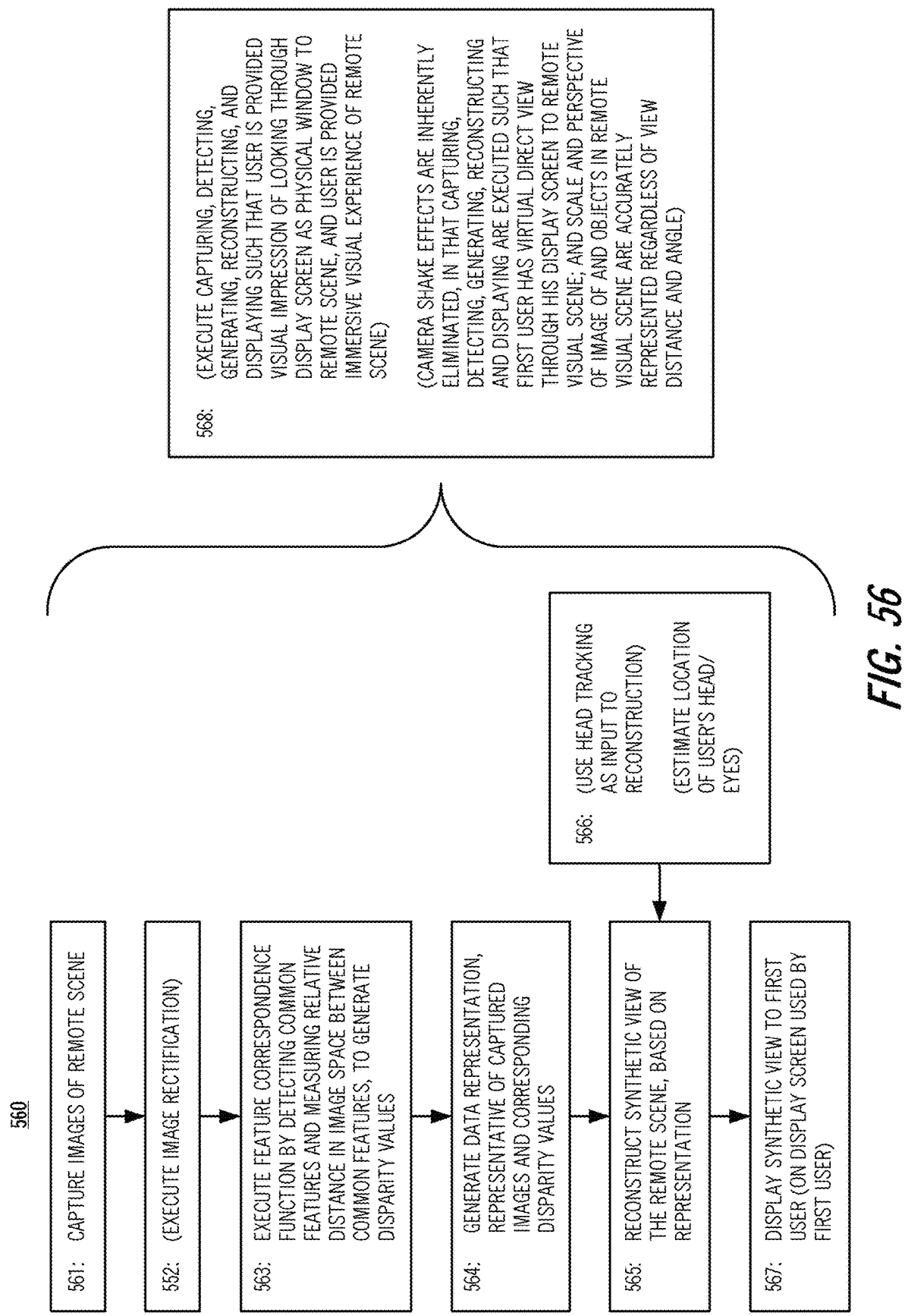

FIG. 56 is a flowchart of another V3D method 560 according to an exemplary practice of the invention, including the following operations:

561: Capture images of remote scene;
562: Execute image rectification;
563: Execute feature correspondence function by detecting common features and measuring relative distance in image space between common features, to generate disparity values;
564: Generate data representation, representative of captured images and corresponding disparity values;
565: Reconstruct synthetic view of the remote scene, based on representation;
566: Use head tracking as input to reconstruction;
567: Display synthetic view to first user (on display screen used by first user);
(Estimate location of user's head/eyes):
568: Execute capturing, detecting, generating, reconstructing, and displaying such that user is provided visual impression of looking through display screen as physical window to remote scene, and user is provided au immersive visual experience of remote scene);
(Camera shake effects are inherently eliminated, in that capturing, detecting, generating, reconstructing and displaying are executed such that first user has virtual direct view through his display screen to remote visual scene; and scale and perspective of image of and objects in remote visual scene are accurately represented regardless of view distance and angle).

Figure 57:
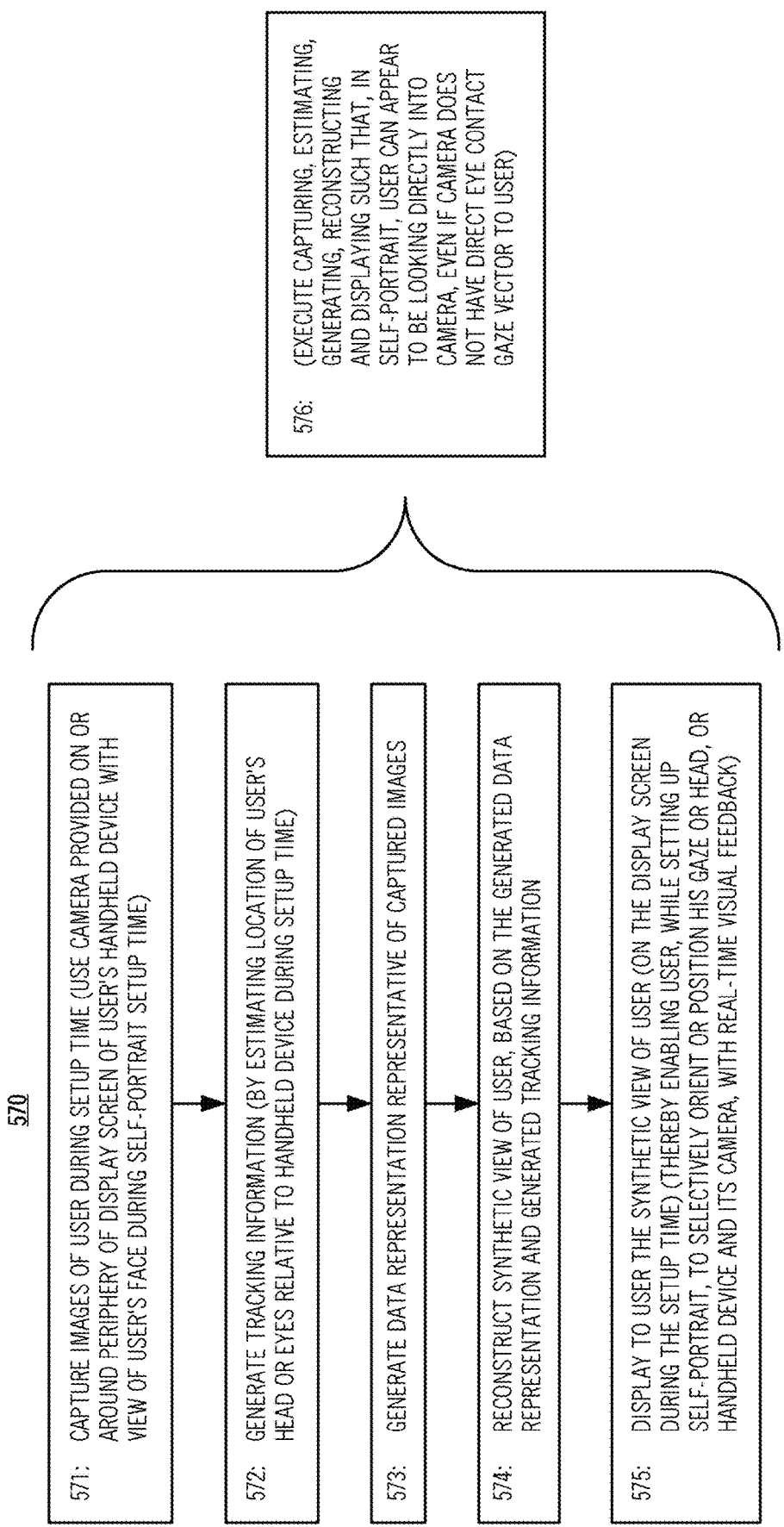

FIG. 57 is a flowchart of a self-portraiture V3D method 570 according to an exemplary practice of the invention, including the following operations:

571: Capture images of user during setup time (use camera provided on or around periphery of display screen of users handheld device with view of user's face during self-portrait setup time);
572: Generate tracking information (by estimating location of user's head or eyes relative to handheld device during setup time);
573: Generate data representation representative of captured images;
574: Reconstruct synthetic view of user, based on the generated data representation and generated tracking information;
575: Display to user the synthetic view of user (on the display screen during the setup time) (thereby enabling user, while setting up self-portrait, to selectively orient or position his gaze or head, or handheld device and its camera, with real-time visual feedback);
576: Execute capturing, estimating, generating, reconstructing and displaying such that, in self-portrait, user can appear to be looking directly into camera, even if camera does not have direct eye contact gaze vector to user.

FIG. 58 is a flowchart of a photo composition V3D method 580 according to an exemplary practice of the invention, including the Following operations;

581: At photograph setup time, capture images of scene to be photographed (use camera provided on a side of user's handheld device opposite display screen side of user's device);
582: Generate tracking information (by estimating location of user's head or eyes relative to handheld device during setup time) (wherein estimating a location of the user's head or eyes relative to handheld device uses at least one camera on display side of handheld device, having a view of user's head or eyes during photograph setup time);
583: Generate data representation representative of captured images:
584: Reconstruct synthetic view of scene, based on generated data representation and generated tracking information (synthetic view reconstructed such that scale and perspective of synthetic view have selected correspondence to user's viewpoint relative to handheld device and scene);
585: Display to user the synthetic view of the scene (on display screen during setup time) (thereby enabling user, while setting up photograph, to frame scene to be photographed, with selected scale and perspective within display flame, with real-time visual feedback) (wherein user can control scale and perspective of synthetic view by changing position of handheld device relative to position of user's head).

Figure 59:
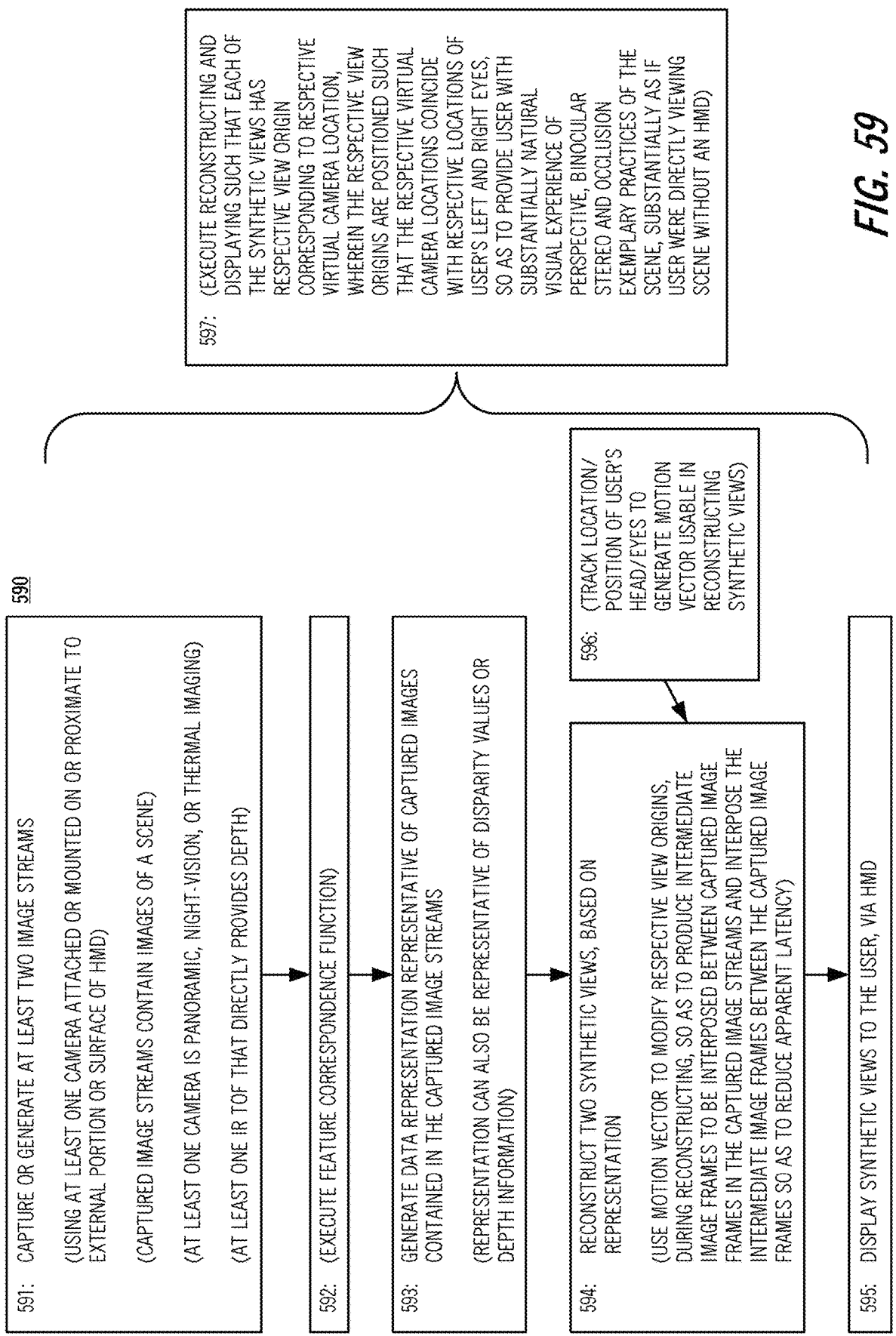

FIG. 59 is a flowchart of an HMD-related V3D method 590 according to an exemplary practice of the invention, including the following operations:

591: Capture or generate at least two image streams;
(using at least one camera attached or mounted on or proximate to external portion or surface, of HMD);
(wherein captured image streams contain images of a scene);

(wherein at least one camera is panoramic, night-vision, or thermal imaging camera);
(at least one IR TOE camera or imaging device that directly provides depth);
592: Execute feature correspondence function;
593: Generate data representation representative of captured images contained in the captured image streams;
(Representation can also be representative of disparity values or depth information);
594: Reconstruct two synthetic views, based on representation:
(use motion vector to modify respective view origins, during reconstructing, so as to produce intermediate image frames to be interposed between captured image frames in the captured image streams and interpose the intermediate image frames between the captured image frames so as to reduce apparent latency);
595: Display synthetic views to the user, via HMD;
596: (Track location/position of user's head/eyes to generate motion vector usable in reconstructing synthetic views);
597: Execute reconstructing and displaying such that each of the synthetic views has respective view origin corresponding to respective virtual camera location, wherein the respective view origins are positioned such that the respective virtual camera locations coincide with respective locations of user's left and right eyes, so as to provide user with substantially natural visual experience of perspective, binocular stereo and occlusion exemplary practices of the scene, substantially as if user were directly viewing scene without an HMI).

Figure 60:
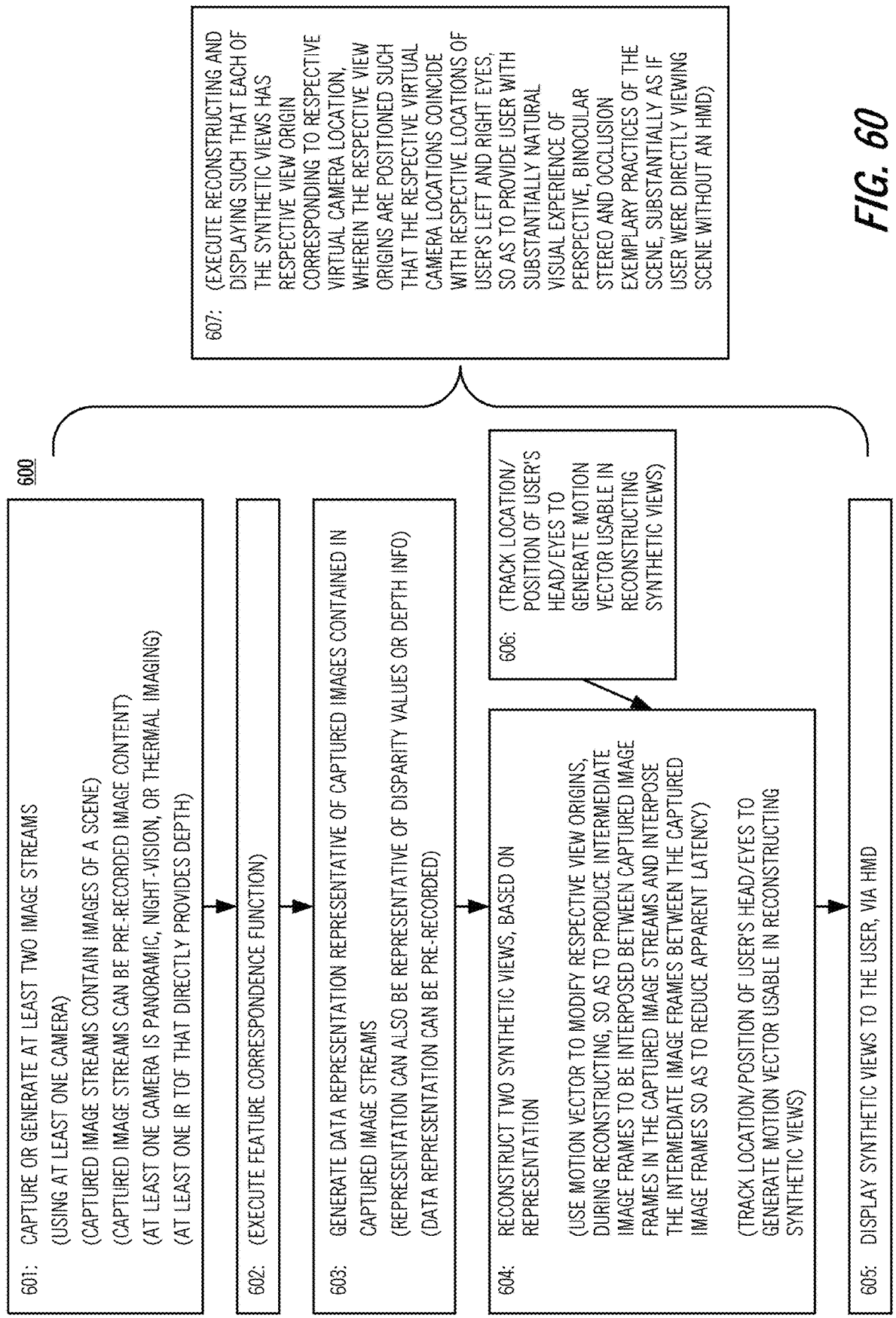

FIG. 60 is a flowchart of another HMD-related V3D method 600 according to an exemplary practice of the invention, including the following operations:
601: Capture or generate at least two image streams;
(using at least one camera);
(wherein captured image streams can contain images of a scene);
(wherein captured image streams can be pre-recorded image content);
(wherein at least one camera is panoramic, night-vision, or thermal imaging);
(wherein at least one IR TOF that directly provides depth);
602: Execute feature correspondence function;
603: Generate data representation representative of captured images contained in captured image streams;
(representation can also be representative of disparity values or depth information);
(data representation can be pre-recorded);
604: Reconstruct two synthetic views, based on representation;
(use motion vector to modify respective view origins, during reconstructing, so as to produce intermediate image frames to be interposed between captured image frames in the captured image streams and interpose the intermediate image frames between the captured image frames so as to reduce apparent latency);
(track location position of user's head/eyes to generate motion vector usable in reconstructing synthetic views);
605: Display synthetic views to the user, via HMD;
606: Execute reconstructing and displaying such that each of the synthetic views has respective view origin corresponding to respective virtual camera location, wherein the respective view origins are positioned such that the respective virtual camera locations coincide with respective locations of user's left and right eyes, so as to provide user with substantially natural visual experience of perspective, binocular stereo and occlusion exemplary practices of the scene; substantially as if user were directly viewing scene without an HMD.

FIG. 61 is a flowchart of a vehicle control system-related method 610 according to an exemplary practice of the invention, including the following operations:
611: Capture images of scene around at least a portion of vehicle (using at least one camera having a view of scene):
612: (Execute image rectification);
613: Execute feature correspondence function;
(by detecting common features between corresponding images captured by the at least one camera and measuring a relative distance in image space between common features, to generate disparity values);
(detect common features between images captured by single camera over time);
(detect common features between corresponding images captured by two or more cameras);
614: Calculate corresponding depth information based on disparity values;
(or obtain depth information using IR TOE camera);
615: Generate from the images and corresponding depth information an image data stream for use by the vehicle control system.

FIG. 62 is a flowchart of another V3D method 620 according, to an exemplary practice of the invention, which can utilize a view vector rotated camera configuration and/or a number of the following operations:
621: Execute image capture;
622: (of other user);
623: (of other user and scene surrounding other user);
624: (of remote scene):
625: (Use single camera (and detect common features between images captured over time));
626: (Use at least one color camera);
627: (Use at least one infrared structured light emitter);
628: (Use at least one camera which is an infra-red time-of-flight camera that directly provides depth information);
629: (Use at least two cameras (and detect common features between corresponding images captured by respective cameras);
6210: (Camera[s] for capturing images of the second user are located at or near the periphery or edges of a display device used by second user, display device used by second user having display screen viewable by second user and having a geometric center; synthetic view of second user corresponds to selected virtual camera location, selected virtual camera location corresponding to point at or proximate the geometric center):
6211: (Use a view vector rotated camera configuration in which the locations of first and second cameras define a line; rotate the line defined by first and second camera locations bra selected amount from selected horizontal or vertical axis to increase number of valid feature correspondences identified in typical real-world settings by feature correspondence function) (first and second cameras positioned relative to each other along epipolar lines);

6212: (Subsequent to capturing of images, rotate disparity values back to selected horizontal or vertical orientation along with captured images);

6213: (Subsequent to reconstructing of synthetic view, rotate synthetic view back to selected horizontal or vertical orientation);

6214: (Capture using exposure cycling);

6215: (Use at least three cameras arranged in substantially L-shaped configuration, such that pair of cameras is presented along first axis and second pair of cameras is presented along second axis substantially perpendicular to first axis).

FIG. 63 is a flowchart of an exposure cycling method 630 according to an exemplary practice of the invention, including the following operations:

631: Dynamically adjust exposure of camera(s) on frame-by-frame basis to improve disparity estimation in regions outside exposed region: take series of exposures, including exposures lighter than and exposures darker than a visibility-optimal exposure; calculate disparity values for each exposure; and integrate disparity values into an overall disparity solution over time, to improve disparity estimation;

632: The overall disparity solution includes a disparity histogram into which disparity values are integrated, the disparity histogram being converged over time, so as to improve disparity estimation;

633: (analyze quality of overall disparity solution on respective dark, mid-range and light pixels to generate variance information used to control exposure settings of the camera(s), thereby to form a closed loop between quality of the disparity estimate and set of exposures requested from camera(s));

634: (overall disparity solution includes disparity histogram: analyze variance of disparity histograms on respective dark, mid-range and light pixels to generate variance information used to control exposure settings of camera(s), thereby to form a closed loop between quality of disparity estimate and set of exposures requested from camera(s)), FIG. 64 is a flowchart of an image rectification method 640 according to an exemplary practice of the invention, including the following operations:

641: Execute image rectification;

642: (to compensate for optical distortion of each camera and relative misalignment of the cameras);

643: (executing image rectification includes applying 2D image space transform);

644: (applying 2D image space transform includes using GPGPU processor running shader program).

FIGS. 65A-B show a flowchart of a feature correspondence method 650 according to an exemplary practice of the invention, which can include a number of the following operations:

651: Detect common features between corresponding images captured by the respective cameras;

652: (Detect common features between images captured by single camera over time: measure relative distance in image space between common features, to generate disparity values);

653: (Evaluate and combine vertical- and horizontal-axis correspondence information);

654: (Apply, to image pixels containing disparity solution, a coordinate transformation to a unified coordinate system (on-rectified coordinate system of the captured images));

655: Use a disparity histogram-based method of integrating data and determining correspondence: constructing disparity histogram indicating the relative probability of a given disparity value being correct for a given pixel;

656: (Disparity histogram functions as probability density function (PDF) of disparity for given pixel, in which higher values indicate higher probability of corresponding disparity range being valid for given pixel);

657: (One axis of disparity histogram indicates given disparity range; second axis of histogram indicates number of pixels in kernel surrounding central pixel in question that are voting for given disparity range);

658: (Votes indicated by disparity histogram initially generated utilizing sum of square differences [SSD] method: executing SSD method with relatively small kernel to produce fast dense disparity map in which each pixel has selected disparity that represents lowest error; then, processing plurality of pixels to accumulate into disparity histogram a tally of number of votes for given disparity in relatively larger kernel surrounding pixel in question);

659: (Transform the disparity histogram into a cumulative distribution function (CDF) from which width of corresponding interquartile range can be determined, to establish confidence level in corresponding disparity solution);

6510: (Maintain a count of number of statistically significant modes in histogram, thereby to indicate modality);

6511: (Use modality as input to reconstruction, to control application of stretch vs. slide reconstruction method)

6512: (Maintain a disparity histogram over selected time interval; and accumulate samples into histogram, to compensate for camera noise or other sources of motion or error);

6513: (Generate fast disparity estimates for multiple independent axes; then combine corresponding, respective disparity histograms to produce statistically more robust disparity solution);

6514: (Evaluate interquartile (IQ) range of CDF of given disparity histogram to produce IQ result; if IQ result is indicative of area of poor sampling signal to noise ratio, due to camera over- or underexposure, then control camera exposure based on IQ result to improve poorly sampled area of given disparity histogram);

6515: (Test for only a small set of disparity values using small-kernel SSD method to generate initial results; populate corresponding disparity histogram with initial results: then use histogram votes to drive further SSD testing within given range to improve disparity resolution over time);

6516: (Extract sub-pixel disparity information from disparity histogram: where histogram indicates a maximum-vote disparity range and an adjacent, runner-up disparity range, calculate a weighted average disparity value based on ratio between number of votes for each of the adjacent disparity ranges);

6517: (The feature correspondence function includes weighting toward a center pixel in a sum of squared differences (SSD) approach: apply higher weight to the center pixel for which a disparity solution is sought, and a lesser weight outside the center pixel, the lesser weight being proportional to distance of given kernel sample from the center);

6518: (The feature correspondence function includes optimizing generation of disparity values on GPGPU computing structures);

6519: (Refine correspondence information over time);

6520: (Retain a disparity solution over a time interval, and continue to integrate disparity solution values for each image frame over the time interval, to converge on improved disparity solution by sampling over time);

6521: (Fill unknowns in a correspondence information set with historical data obtained, from previously captured images: if a given image feature is detected in an image captured by one camera, and no corresponding image feature is found in a corresponding image captured by another camera, then utilize data for a pixel corresponding to the given image feature, from a corresponding, previously captured image), FIG. 66 is a flowchart of a method 660 for generating a data representation, according; to an exemplary practice of the invention, which can include a number of the following operations:

661: Generate data structure representing 2D coordinates of control point in image space, and containing a disparity value treated as a pixel velocity in screen space with respect to a given movement of a given view vector; and utilize the disparity value in combination with movement vector to slide a pixel in a given source image in selected directions, in 2D, to enable a reconstruction of 3D image movement;

662: (Each camera generates a respective camera stream; and the data structure contains a sample buffer index, stored in association with control point coordinates, that indicates which camera stream to sample in association with given control point);

663: (Determine whether a given pixel should be assigned a control point);

664: (Assign control paints along image edges: execute computations enabling identification of image edges);

665: (Flag a given image feature with a reference count indicating how many samples reference the given image feature, to differentiate a uniquely referenced image feature, and a sample corresponding to the uniquely referenced image feature, from repeatedly referenced image features, and utilize reference count, extracting unique samples, to enable reduction in bandwidth requirements);

666: (Utilize the reference count to encode and transmit a given sample exactly once, even if a pixel or image feature corresponding to the sample is repeated in multiple camera views, to enable reduction in bandwidth requirements).

FIGS. 67A-B Show a flowchart of an image reconstruction method 670, according to an exemplary practice of the invention, which can include a number of the following operations;

671: Reconstruct synthetic view based on data representation and tracking information; execute 3d image reconstruction by warping 2D image, using control points: sliding given pixel along a head movement vector at a displacement rate proportional to disparity, based on tracking information and disparity values;

672: (wherein disparity values are acquired from feature correspondence function or control point data stream);

673: (Use tracking information to control 2D crop box: synthetic view is reconstructed based on view origin; and then cropped and scaled to fill user's display screen view window; define minima and maxima of crop box as function of user's head location with respect to display screen and dimensions of display screen view window);

674: (Execute 2D warping reconstruction of selected view based on selected control points: designate set of control points, respective control points corresponding to respective, selected pixels in a source image; slide control points in selected directions in 2D space, wherein the control points are slid proportionally to respective disparity values; interpolate data values for pixels between the selected pixels corresponding to the control points; to create a synthetic view of the image from a selected new perspective in 3D space);

675: (Rotate source image and control point coordinates so that rows or columns of image pixels are parallel to the vector between the original source image center and the new view vector defined by the selected new perspective);

676: (Rotate the source image and control point coordinates to align the view vector to image scanlines; iterate through each scanline and each control point for a given scanline, generating a line element beginning and ending at each control point in 2D image space, with the addition of the corresponding disparity value multiplied by the corresponding view vector magnitude with the corresponding x-axis coordinate; assign a texture coordinate to the beginning and ending points of each generated line element, equal to their respective, original 2D location in the source image; interpolate texture coordinates linearly along each line element; to create a resulting image in which image data between the control points is linearly stretched);

677: (Rotate resulting image back by the inverse of the rotation applied to align the view vector with the scanlines);

678: (Link control points between scanlines, as well as along scanlines, to create polygon elements defined by control points, across which interpolation is executed);

679: (For a given source image, selectively slide image foreground and image background independently of each other: sliding is utilized in regions of large disparity or depth change):

6710: (Determine whether to utilize sliding: evaluate disparity histogram to detect multi-modal behavior indicating that given control point is on an image boundary for which allowing foreground and background to slide independent of each other presents better solution than interpolating depth between foreground and background; disparity histogram functions as probability density function (PDF) of disparity for a given pixel, in which higher values indicate higher probability of the corresponding disparity range being valid for the given pixel);

6711; (Use at least one sample integration function table (sift), the sift including a table of sample integration functions for one or more pixels in a desired output resolution of an image to be displayed to the user: a given sample integration function maps an input view origin vector to at least one known, weighted 21) image sample location in at least one input image buffer).

FIG. 68 is a flowchart of a display method 680, according to an exemplary practice of the invention, which can include a number of the following operations:

681: Display synthetic view to user on display screen;

682: (Display synthetic view to user on a 2D display screen; update display in real-time, based on tracking information, so that display appears to the user to be a window into a 3d scene responsive to user's head or eye location;

683: (Display synthetic view to user on binocular stereo display device);

684: (Display synthetic view to user on lenticular display that enables auto-stereoscopic viewing).

FIG. 69 is a flowchart of a method 690 according to an exemplary practice of the invention, utilizing a multi-level disparity histogram, and which can also include the following:

691: Capture images of scene, using at least first and second cameras having a view of the scene, the cameras being arranged along an axis to configure a stereo camera pair having a camera pair axis;

692: Execute feature correspondence function by detecting common features between corresponding images captured by the respective cameras and measuring a relative distance in image space between the common features, to generate disparity values, the feature correspondence function including constructing a multi-level disparity histogram indicating the relative probability of a given disparity value being comet for a given pixel, and the constructing of a multi-level disparity histogram includes executing a fast dense disparity estimate (FDDE) image pattern matching operation on successively lower-frequency downsampled versions of the input stereo images, the successively lower-frequency downsampled versions constituting a set of levels of FDDE histogram votes:

692.1 Each level is assigned a level number, and each successively higher level is characterized by a lower image resolution;

692.2 (Downsampling is provided by reducing image resolution via low-pass filtering);

692.3 (Downsampling includes using a weighted summation of a kernel in level [n−1] to produce a pixel value in level and the normalized kernel center position remains the same across all levels);

692.4 (For a given desired disparity solution at full image resolution, the FDDE votes for every image level are included in the disparity solution);

692.5 Maintain in a memory unit a summation stack, for executing summation operations relating to feature correspondence);

693: Generate a multi-level histogram including a set of initially independent histograms at different levels of resolution:

693.1: Each histogram bin in a given level represents votes for a disparity determined by the FDDE at that level;

693.2: Each histogram bin in a given level has an associated disparity uncertainty range, and the disparity uncertainty range represented by each histogram bin is a selected multiple wider than the disparity uncertainty range of a bin in the preceding level;

694: Apply a sub-pixel shift to the disparity values at each level during downsampling, to negate rounding error effect: apply half pixel shift to only one of the images in a stereo pair at each level of downsampling

694.1: Apply sub-pixel shift implemented inline, within the weights of die filter kernel utilized to implement the downsampling from level to level;

695: Execute histogram integration, including executing a recursive summation across all the FDDE levels:

695.1: During summation, modify the weighting of each level to control the amplitude of the effect of lower levels in overall voting, by applying selected weighting coefficients to selected levels;

696: Infer a sub-pixel disparity solution from the disparity histogram, by calculating a sub-pixel offset based on the number of votes for the maximum vote disparity range and the number of votes for an adjacent, runner-up disparity range.

FIG. 70 is a flowchart of a method 700 according to an exemplary practice of the invention, RUD image space and including the following operations:

701: Capture images of scene, using at least first and second cameras having a view of the scene, the cameras being arranged along an axis to configure a stereo camera pair having a camera pair axis, and for each camera pair axis, execute image capture using the camera pair to generate image data;

702: Apply/execute rectification and undistorting transformations to transform the image data into RUD image space:

703: Iteratively downsample to produce multiple, successively lower resolution levels;

704: Execute FDDE calculations for each level to compile FDDE votes for each level;

705: Gather FDDE disparity range votes into a multi-level histogram;

706: Determine the highest ranked disparity range in the multi-level histogram;

707: Process the multi-level histogram disparity data to generate a final disparity result.

FIG. 71 is a flowchart of a method 710 according to an exemplary practice of the invention, utilizing an injective constraint aspect and including the following operations:

711: Capture images of a scene, using at least first and second cameras having a view of the scene, the cameras being arranged along an axis to configure a stereo camera pair;

712: Execute a feature correspondence function by detecting common features between corresponding images captured by the respective cameras and measuring a relative distance in image space between the common features, to generate disparity values, the feature correspondence function including: generating a disparity solution based on the disparity values, and applying, an injective constraint to the disparity solution based on domain and co-domain, wherein the domain comprises pixels for a given image captured by the first camera and the co-domain comprises pixels for a corresponding image captured by the second camera, to enable correction of error in the disparity solution in response to violation of the injective constraint, and wherein the injective constraint is that no element in the co-domain is referenced more than once by elements in the domain.

FIG. 72 is a flowchart of a method 720 for applying an injective constraint, according to an exemplary practice of the invention, including the following operations:

721: Maintain a reference count for each pixel in the co-domain;

722: Does reference count for the pixels in the co-domain exceed "1"?;

723: If the count exceeds "1":

724: Signal a violation and respond to the violation with a selected error correction approach.

FIG. 73 is a flowchart of a method 730 relating to error correction approaches based on injective constraint, according to an exemplary practice of the invention, including one or more of the following:

731: First-come, first-served: assign priority to the first element in the domain to claim an element in the co-domain, and if a second element in the domain claims the same co-domain element, invalidating that subsequent match and designating that subsequent match to be invalid:

732: Best match wins: compare the actual image matching error or corresponding histogram vote count between the two possible candidate elements in the domain against the contested element in the co-domain, and designate as winner the domain candidate with the best match;

733: Smallest disparity wins: if there is a contest between candidate elements in the domain for a given co-domain element, wherein each candidate element has a corresponding disparity, selecting the domain candidate with the smallest disparity and designating the others as invalid;

734: Seek alternative candidates: select and test the next best domain candidate, based on a selected criterion, and iterating the selecting and testing until the violation is eliminated or a computational time limit is reached.

FIG. 74 is a flowchart of a head/eye/face location estimation method 740 according to an exemplary practice of the invention, including the following operations:

741: Capture images of the second user, using at least one camera having a view of the second user's face;

742: Execute a feature correspondence function by detecting common features between corresponding images captured by the at least one camera and measuring a relative distance in image space between the common features, to generate disparity values;

743: Generate a data representation, representative of the captured images and the corresponding disparity values;

744: Estimate a three-dimensional (3D) location of the first user's head, face or eyes, to generate tracking information, which can include the following:

744.1: Pass a captured image of the first user, the captured image including the first user's head and face, to a two-dimensional (2D) facial feature detector that utilizes the image to generate a first estimate of head and eye location and a rotation angle of the face relative to an image plane;

744.2: Use an estimated center-of-face position, face rotation angle, and head depth range based on the first estimate, to determine a best-fit rectangle that includes the head;

744.3: Extract from the best-fit rectangle all 3D points that lie within the best-fit rectangle, and calculate therefrom a representative 3D head position;

744.4: If the number of valid 3D points extracted from the best-fit rectangle exceeds a selected threshold in relation to the maximum number of possible 3D points in the region, then signal a valid 3D head position result 745: Reconstruct a synthetic view of the second user, based on the representation, to enable a display to the first user of a synthetic view of the second user in which the second user appears to be gazing directly at the first user, including reconstructing the synthetic view based on the generated data representation and the generated tracking information.

FIG. 75 is a flowchart of a method 750 providing further optional operations relating to the 3D location estimation shown in FIG. 74, according to an exemplary practice of the invention, including the following:

751: Determine, from the first estimate of head and eye location and face rotation angle, an estimated center-of-face position;

752: Determine an average depth value for the face by extracting three-dimensional (3D) points via the disparity values for a selected, small area located around the estimated center-of-face position;

753: Utilize the average depth value to determine a depth range that is likely to encompass the entire head;

754: Utilize the estimated center-of-face position, face rotation angle, and depth range to execute a second ray march to determine a best-fit rectangle that includes the head;

755: Calculate, for both horizontal and vertical axes, vectors that are perpendicular to each respective axis but spaced at different interval;

756: For each of the calculated vectors, test the corresponding 3D points starting from a posit on outside the head region and working inwards, to the horizontal or vertical axis;

757: When a 3D point is encountered that falls within the determined depth range, denominate that point as a valid extent of a best-fit head rectangle;

758: From each ray march along each axis, determine a best-fit rectangle for the head, and extracting therefrom all 3D points that lie within the best-fit rectangle, and calculating therefrom a weighted average;

759: If the number of valid 3D points extracted from the best-fit rectangle exceed a selected threshold in relation to the maximum number of possible 3D points in the region, signal a valid 3D head position result.

FIG. 76 is a flowchart of optional sub-operations 760 relating to 3D location estimation, according to an exemplary practice of the invention, which can include a number of the following;

761: Downsample captured image before passing it to the 2D facial feature detector.

762: Interpolate image data from video frame to video frame, based on the time that has passed from a given video frame from a previous video frame, 763: Convert image data to luminance values, FIG. 77 is a flowchart of a method 770 according to an exemplary practice of the invention, utilizing URUD image space and including the following operations:

771: Capture images of a scene, using at least three cameras having a view of the scene, the cameras being arranged in a substantially "l"-shaped configuration wherein a first pair of cameras is disposed along a first axis and second pair of cameras is disposed along a second axis intersecting with, but angularly displaced from, the first axis, wherein the first and second pairs of cameras share a common camera at or near the intersection of the first and second axis, so that the first and second pairs of cameras represent respective first and second independent stereo axes that share a common camera;

772: Execute a feature correspondence function by detecting common features between corresponding images captured by the at least three cameras and measuring a relative distance in image space between the common features, to generate disparity values;

773; Generate a data representation, representative of the captured images and the corresponding disparity values;

774: Utilize an unrectified, undistorted (URUD) image space to integrate disparity data for pixels between the first and second stereo axes, thereby to combine disparity data from the first and second axes, wherein the URUD space is an image space in which polynomial lens distortion has been removed from the image data but the captured image remains unrectified. FIG. 78 is a flowchart of a method 780 relating to optional operations in RUD/URUD image space according to an exemplary practice of the invention, including the following operations:

781: Execute a stereo correspondence operation on the image data in a rectified, undistorted (RUD) image space, and storing resultant disparity data in a RUD space coordinate system;

782: Store the resultant disparity data in a URUD space coordinate system;

783: Generate disparity histograms from the disparity data in either RUD or URUD space; and store the disparity histograms in a unified URUD space coordinate system (and apply a URUD to RUD coordinate transformation to obtain per-axis disparity values), FIG. 79 is a flowchart of a method 790 relating to private disparity histograms according to an exemplary practice of the invention, including the following operations:

791: Capture images of a scene using at least one camera having a view of the scene;

792: Execute a feature correspondence function by detecting common features between corresponding images captured by the at least one camera and measuring a relative distance in image space between the common features, to generate disparity values, using a disparity histogram method to integrate data and determine correspondence, which can include:

792.1; Construct a disparity histogram indicating the relative probability of a given disparity value being correct for a given pixel;

791.2: Optimize generation of disparity values on a GPU computing structure, by generating, in the GPU computing structure, a plurality of output pixel threads and for each output pixel thread, maintaining a private disparity histogram in a storage element associated with the GPU computing structure and physically proximate to the computation units of the GPU computing structure;

793: Generate a data representation, representative of the captured images and the corresponding disparity values.

FIG. 80 is a flowchart, of a method 800 further relating to private disparity histograms according to an exemplary practice of the invention, including the following operations:

801: Store the private disparity histogram such that each pixel thread writes to and reads from the corresponding private disparity histogram on a dedicated portion of shared local memory in the GPU:

802: Organize shared local memory in the GPU at least in part into memory words; the private disparity histogram is characterized by a series of histogram bins indicating the number of votes for a given disparity range; and if a maximum possible number of votes in the private disparity histogram is known, multiple histogram bins can be packed into a single word of the shared local memory, and accessed using bitwise GPU access operations.

Facial Signature Aspects of the Invention

Identification, authentication or matching of a user or subject, by the user's facial features, can be useful in a wide range of settings. These may include controlling or limiting access to systems, enabling rapid or simplified access to systems or to a particular user account or user profile on a system, or other security purposes. Exemplary practices and embodiments of the invention enable such identification, authentication or matching, by generating a Facial Signature based on images of the user's or subject's face, or face and head, as described in greater detail below.

The following discussion and the corresponding, accompanying drawing figures, relate to exemplary Facial Signature aspects, embodiments and practices of the invention.

Those skilled in the art will understand that the digital processor elements of the embodiments of the invention depicted in the accompanying drawing figures, such as in, but not limited to, FIGS. 1, 7-13, 18, 33, and 47-49, can be employed to execute the Facial Signature functions of exemplary practices and embodiments of the invention described herein, including image capture, image rectification, feature correlation/disparity value processing, and Facial Signature generation functions. By way of example, the Facial Signature aspects of the invention can be executed on otherwise conventional processing elements and platforms provided by or associated with known forms of desktop computers, laptop computers, tablet computers, smartphones, and associated additional or peripheral hardware elements, such as cameras, suitably configured in accordance with exemplary practices of the invention.

Identification and Matching/Authentication Example

In an exemplary practice of the invention, the front-end aspects of the V3D processing pipeline described above, i.e. aspects of Image Capture, Image Rectification and Feature Correspondence, are employed, but instead of constructing a representation intended for 3D streaming of a scene for visualizing it from different views (see, e.g., FIGS. 7 and 8, depicting exemplary practices and embodiments of the V3D invention), the V3D process front-end can be configured to construct a "Facial Signature" for the purposes of subsequently identifying an individual person, or user of a system or resource, in a secure manner that is substantially more difficult to forge than a regular 2D facial image.

FIG. 85 is a flowchart of an exemplary practice of the Facial Signature aspects using V3D process elements of the invention, including capturing images of the user's or subject's face (851), executing image rectification to compensate for camera optical distortion and alignment (852), executing feature correspondence to produce disparity/depth values (853), eliminating the image background (854), and generating a facial signature data representation (855).

The enhanced level of security provided by the Facial Signature aspect of the invention is enabled in part because the depth stereo estimation of the V3D method of the invention described in this document requires all of the facial features to be presented to the camera(s) at the correct distance ratios between the cameras or from the structured light or time-of-flight sensor. Creating a forgery would require an accurate physical model of the lace in the real world. By requiring multiple poses, the forgers challenge of constructing an accurate 3D model becomes highly impractical.

Figure 81:
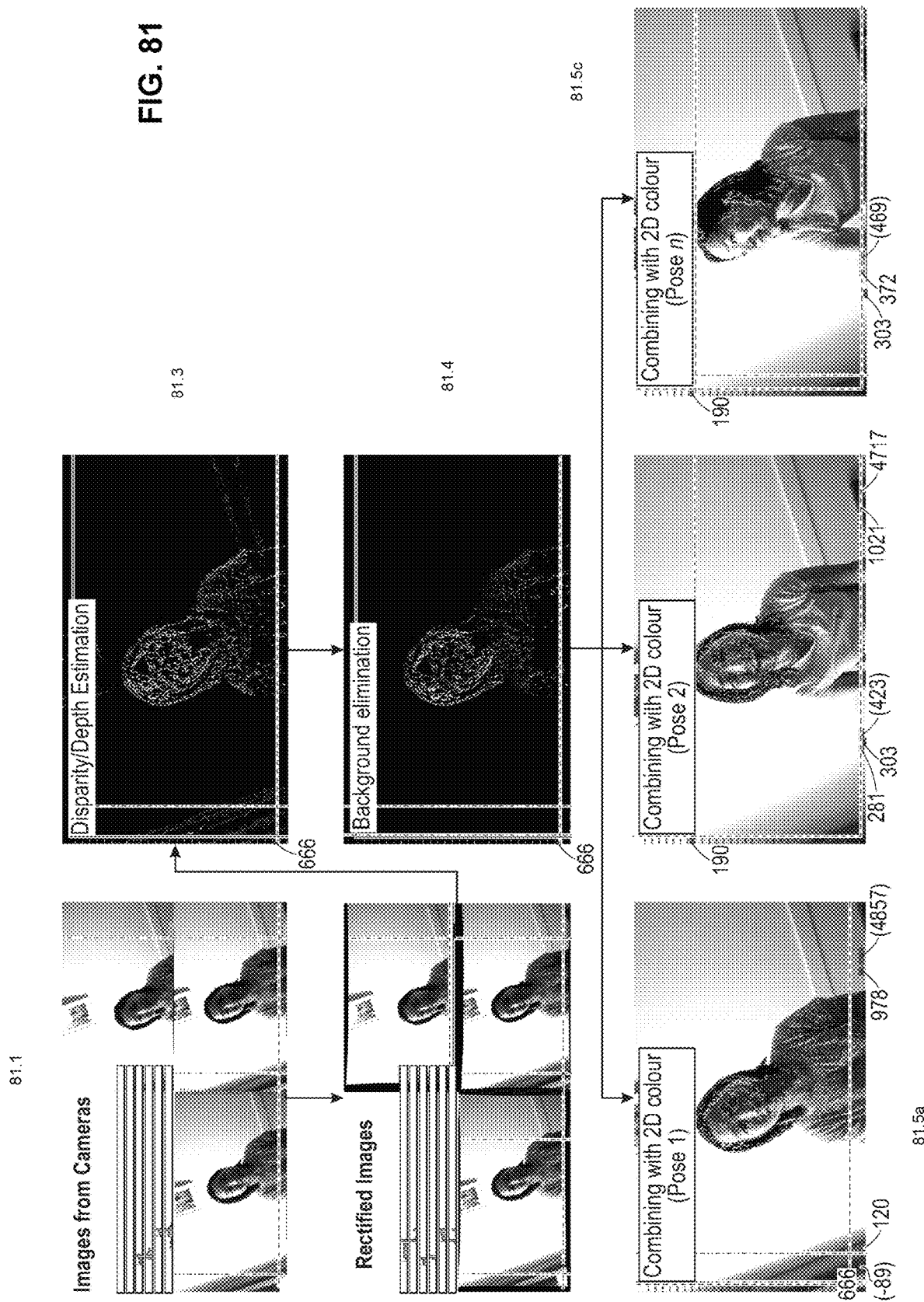
FIG. 81 is a schematic flow diagram depicting processing of images to generate a Facial Signature in accordance with an exemplary practice of the invention.

By way of example, FIG. 81 illustrates an exemplary practice of the Facial Signature aspect of the invention, including obtaining images from the camera(s) (81.1), generating rectified images (81.2), executing disparity/depth estimation (81.3), executing background elimination (81.4), and combining with 2D color information (81.5*a*, 81.5*b*, 81.5*c*), which can occur using multiple poses of the human user/subject, as described in greater detail below.

In this configuration, the facial signature could be a combination of the 3D facial contour information and the regular 2D image from one or more of the cameras. A system or process in accordance with the Facial Signature aspect of the invention could either store the 3D contour data in the signature, or simply use the 2D image of the face but use the 3D facial contours just to confirm that the image(s) depict an actual human face with credible 3D proportions that was viewed by the cameras at the same location as the 2D image.

A method in accordance with the Facial Signature aspect can also include an enrollment phase in which the human user or subject would be requested, by the system, to move his or her head into different orientations, and, optionally, strike a number of alternative facial poses, such as "smile" or "wink", so that the system can establish a robust scan (or multiple scans) of the human subject's facial proportions. In an exemplary practice of the invention, an enrolled Facial Signature is generated from these scans.

During the matching process, a few seconds of images of the user's or subject's head can be captured in real-time, resulting in hundreds of individual captures, each slightly different, and then correlated with the facial signature to confirm a match.

Facial Signature Implementation Examples

Exemplary practices of the invention, including the facial signature aspects of the invention, can be configured for a variety of purposes, including, but not limited to, the following:

Reliable Identification of a Unique Individual:

The facial signature generated from the depth information extracted from the V3D front-end can be used to identify a specific individual. Such an identification would be more reliable than a conventional 2D identification system due to the ability to take into account the actual 3D coordinates of facial features with respect to other facial features. It would also be much more difficult to spoof, or forge. Conventional 2D facial identification systems can be easily spoofed by presenting an image of the real-users face from a display or hard-copy. However, because the disparity or depth detection algorithms of the present invention actually compute the distance to real world features from multiple perspectives, a Facial Signature process or system in accordance with the invention would eliminate such vulnerabilities.

Security Factor in an Authentication System:

The facial signature aspects of the invention can be combined with other security factors, such as a fingerprint or a pass-code, to provide a high level of security for accessing a user account on a device or system, or for other authentication purposes.

In a Hybrid Configuration with a Conventional 2D Face Identification System:

Although the 3D contour data could alone be used to identify a face, combining it with the existing 2D image from one or more cameras would add further security.

In addition to a full 2D and 3D scan authentication, it would be possible to implement a simpler approach by fully identifying the human user or subject, via the 2D image, and using the facial signature only to confirm that an actual human-proportioned face was presented at an overlapping location of the 2D match. This would eliminate the possibility of forgery by presenting a fake 2D image of the person being spoofed, since the depth detecting system would perceive a flat image, rather than the correct 3D contours, and reject the attempted forgery.

Using a 2D Bounding Rectangle to Reduce Search Space:

Existing 2D facial detection systems return one or more rectangles or "boxes" defining the 2D extent of a human subject's face location. In an exemplary practice of the present invention, a 2D facial detection operation could be executed, and then used to minimize the amount of processing required for the 3D calculation by limiting the calculations to within that box. Utilizing the 2D facial detection operation in this manner can reduce the system's power consumption, and reduce the time required for facial recognition on a given device.

Forgery Protection Through Multiple Poses in the Facial Signature:

It is theoretically possible to construct a 3D sculpture or 3D print of a person's head to spoof a visual authentication system. However, this possibility can be eliminated by using multiple poses from a large number of captured image frames to confirm identity. This can be implemented by employing a high-performance depth detection system that can scan many poses in a short time frame, and requiring the user or subject to perform head movements or facial expression changes.

Enrollment Process:

As part of the system, a user would train the device by generating a unique facial signature. In an exemplary practice of the invention, the system would request the user to present a series of desired head movements relative to the device, or a series of facial expressions, suck as "smile" or "wink." In an exemplary practice of the invention, an enrolled Facial Signature is generated from these scans. By collecting a series of possible poses, the signature would have higher dimensionality than would a single pose.

Matching Process:

With a properly trained system, the matching process could simply observe or capture images of the user for a few seconds, and with a sufficiently high-performance depth detection system, would capture many frames of 3D and 2D data. In accordance with the invention, this would be correlated with the facial signature captured during the enrollment process, and a probability of match score would be generated. This score would then be compared with a threshold to confirm or deny an identity match.

Evolving or Updating the Facial Signature Over Time:

Although the facial features of a human user or subject typically will remain relatively constant over time, changes will occur over time, due to changing head and facial hair, ageing, and other factors. Accordingly, in an exemplary practice of the invention, the facial signature itself is updated or evolved over time. In particular, an exemplary practice of the facial signature method of the invention includes updating or evolving the facial signature itself on every successful match, or on every nth successful match, Where n is a selected integer, in order to accommodate these changes.

Histogram Based Facial Signature Representation:

In accordance with the invention, one method of representing the facial signature is in the form of one or more combined histograms taken directly from the summation of per-pixel disparity histograms within the feature correspondence calculation, or generated from depth data from a sensor capable of directly perceiving depth. These combined, histograms represent the normalized relative proportion of facial feature depths across a plane, parallel to the user's face.

Figure 82:
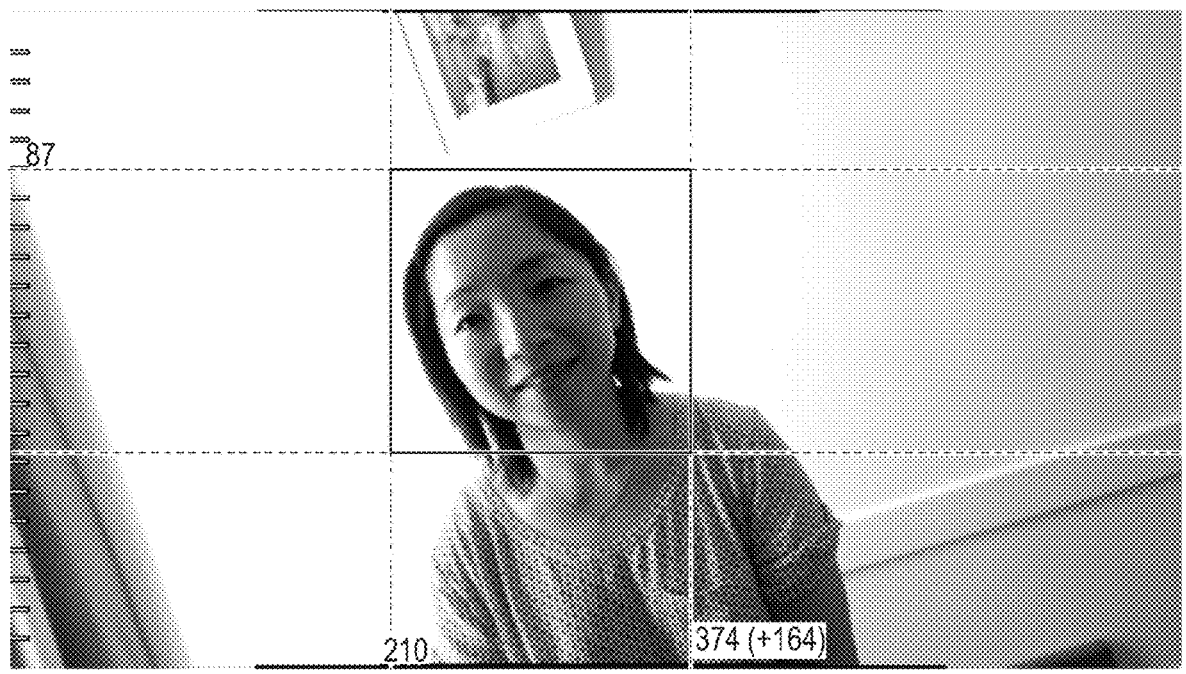
FIGS. 82-83 show an exemplary image processed in accordance with an exemplary practice of the Facial Signature aspects of the invention, where
Figure 83:
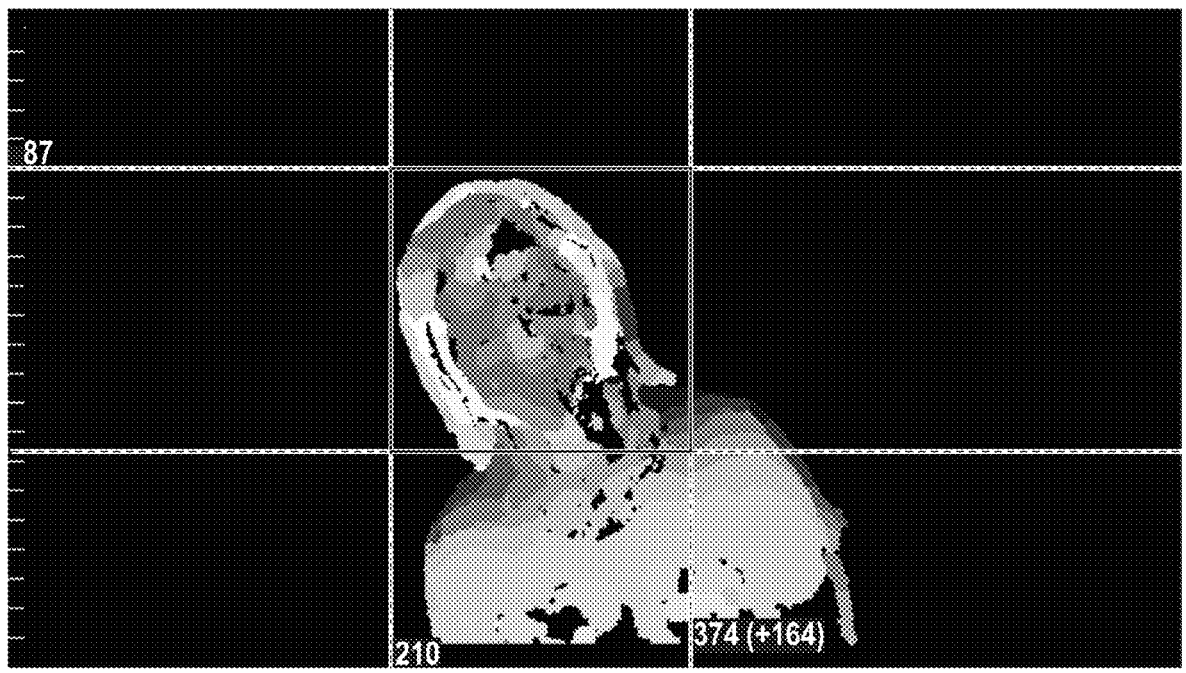
Figure 84:
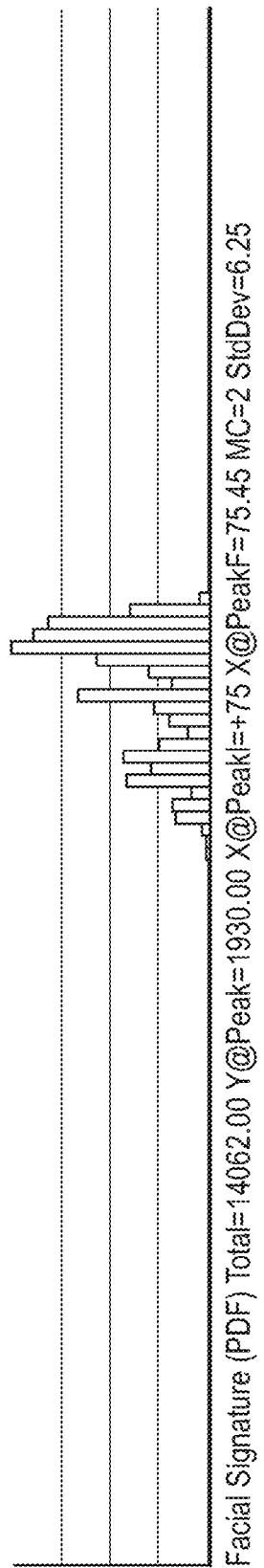
FIG. 84 shows a histogram representation corresponding to the image(s) of FIGS. 82-83, generated in accordance with an exemplary practice of the Facial Signature aspects of the invention.

In this regard, FIGS. 82-83 show an exemplary image processed in accordance with an exemplary practice of the Facial Signature aspects of the invention. FIG. 82 is an example of an image of a human user or subject captured by at least one camera, and FIG. 83 is an example of a representation of image data, corresponding to the image of FIG. 82, processed in accordance with an exemplary practice of the invention. FIG. 84 shows a histogram representation corresponding to the images) of FIGS. 82-83, generated in accordance with an exemplary practice of the Facial Signature aspects of the invention.

As shown in the histogram of FIG. 84 (which corresponds to the image(s) of FIGS. 82 and 83), the X-axis of the histogram would represent a disparity (or depth) range, and the Y-axis would represent the normalized count of image samples that fell within that range. During the populating of the histogram, a conventional 2D face detector can be employed to provide a face rectangle and location of the basic facial features, such as eyes, nose and mouth. See, e.g., FIG. 83, which indicates, among other aspects, a rectangle surrounding the human subject's face. Only samples within the facial rectangle surrounding the face would be accumulated into the combined histogram, along with a rejection of samples falling outside the statistical majority of those within the facial rectangle, in order to remove background samples. In addition, the disparity and depth points could be projected into a canonical coordinate system defined by a plane constructed from the basic facial features.

During the enrollment process, the histogram would be accumulated over several frames over a period of time, but each set of samples would be transformed to always be on the facial plane. This allows for many samples of the facial depth relationships to be captured into one or more combined histograms, potentially for a series of poses. This is analogous to taking a mold of a user's or subject's face, but by using statistical processes in accordance with the invention.

During identification, the same process would be performed on the candidate user's face. Once a candidate identification histogram is captured, it would be subtracted from the set of enrolled histograms and the vector distance would constitute a matching score. By comparing the matching score against a programmable threshold, access could be granted or denied.

In addition, this method could be used in isolation or paired in a hybrid configuration with conventional 2D image matching of the face to provide a further authentication factor.

Flowcharts of Exemplary Practices of the Facial Signature Aspects of the Invention FIGS. 85-88 are flowcharts illustrating method aspects and exemplary practices of the invention. The methods depicted in these flowcharts are examples only; the organization, order and number of operations in the exemplary practices can be varied; and the exemplary practices and methods can be arranged or ordered differently, and include different functions, whether singly or in combination, while still being within the spirit and scope of the present invention, items described below in parentheses are, among other aspects, optional in a given practice of the invention.

FIG. 85 is a flowchart of a method 850 for generating a facial signature data representation, according to an exemplary practice of the invention, which can include a number of the following operations:

851: Capture images of user's or subject's face or face and head:
  851.1: (using at least one camera having a view of the user's face);
  851.2: can use multiple cameras);
  851.3: (can include T-O-F or structured light camera);

852: Execute image rectification function to compensate for camera optical distortion and alignment:
 853: Execute feature correspondence function(s):
  853.1: Detect common features between corresponding images captured by camera(s) or single camera over time;
  853.2: Generate disparity/depth values and feature correspondence data representation representative of captured images and corresponding disparity/depth values;
 854: Eliminate background portion(s) of image;
 855: Generate facial signature data representation (can be histogram-based representation).

FIG. 86 is a flowchart of further method aspects 860 for generating a facial signature data representation, according to an exemplary practice of the invention, which can include a number of the following operations:

860.1: (The Method or System can utilize stereo depth estimation to verify that human facial features are presented to camera(s) at correct distance ratios between camera(s) or from Structured light or time-of-flight sensor);
 860.2: (The aspect of identifying a human user or subject takes into account actual 3D coordinates of facial features with respect to other facial features);
 860.3: (The feature correspondence function or depth detection function includes computing distances between facial features from multiple perspectives);
 860.4: (The facial signature can be combination of 3D facial contour information and 2D image data from one or more camera(s));
 860.5: (3D contour data can be stored in facial signature data representation);
 860.6: (A facial signature generated in accordance with the invention can be utilized as a security factor in an authentication system, either alone or in combination with other security factors);
 806.7: (Update a facial signature on every successful match, or on every n successful matches, where n is a selected integer);
 860.8: (3D facial contour data can be combined with 2D image data from one or more cameras in a conventional 2D face identification system, to create a hybrid 3D/2D face identification system);
 860.9: (3D facial contour data can be used to confirm that a face having credible 3D human facial proportions was presented to the camera(s) at an overlapping spatial location of captured 2D image(s)):
 860.10: (A 2D bounding rectangle, defining a 2D extent of the human user's or subject's face location, can be used to limit search space and limit calculations to a region defined by the rectangle, thereby increasing speed of recognition and reducing power consumption);
 860.11: (The facial signature data representation can be a histogram-based facial signature data representation).

FIG. 87 is a flowchart of method aspects 870 for venerating a histogram-based facial signature data representation, according to an exemplary practice of the invention, which can include a number of the following operations:

870.1: (The facial signature is represented as one or more histograms obtained from a summation of per-pixel disparity histograms within feature correspondence calculation, or generated from depth data from a sensor capable of directly perceiving depth);
 870.2; (The histogram represents normalized relative proportion of facial feature depths across a plane parallel to the user's or subject's face);

870.3: (The X-axis of histogram represents a given disparity or depth range; the Y-axis represents normalized count of image samples that fall within given range);

870.4: (During population of the histogram, a conventional 2D face detector can provide a face rectangle and location of basic facial features; and only samples within face rectangle are accumulated into histogram);

870.5: (Samples falling outside a statistical majority of samples within the face rectangle can be rejected, so as to remove background samples (defining "background" as anything outside the statistical majority of samples within the face rectangle));

870.6: (Disparity and depth points can be projected into a canonical coordinate system defined by a plane geometrically constructed from or defined by basic facial features such as eyes, nose, mouth);

870.7: (The histogram representation can be used in combination with conventional 2D face matching to provide an additional authentication factor).

Figure 88:
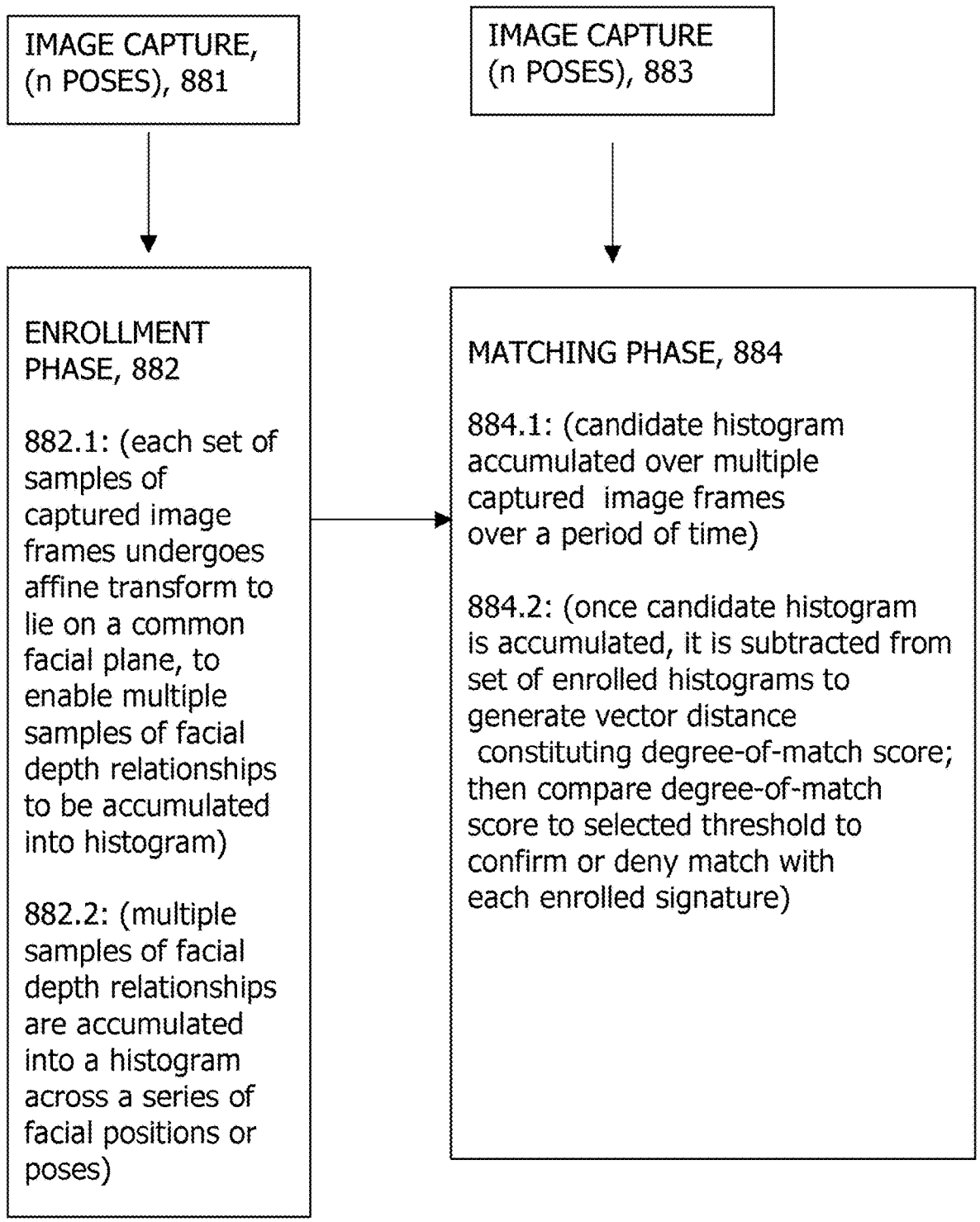

FIG. 88 is a flowchart of a facial signature method aspect 880, including enrollment and matching phases of an exemplary facial signature method in accordance with the invention, which can include a number of the following operations:

881: Capture images (using at least one camera) for the enrollment phase (can utilize and require a selected number (n) poses of the human user or subject);

882: Execute enrollment phase functions:
  882.1: (Each set of samples of captured image frames undergoes an affine transform to lie on a common facial plane, to enable multiple samples of facial depth relationships to be accumulated into a histogram);
  882.2: (Multiple samples of facial depth relationships are accumulated into a histogram across a series of facial positions or poses);

883: Capture images (using at least one camera) for the matching phase (can utilize and require a selected number (n) poses of the human user or subject);

884: Execute matching, phase functions:
  884.1: (Candidate histogram is accumulated over multiple captured image frames over a period of time);
  884.2: (Once candidate histogram is accumulated, it is subtracted from a set of enrolled histograms to generate vector distance constituting degree-of-match score; then compare degree-of-match score to selected threshold to confirm or deny match with each enrolled signature).

CONCLUSION

While the foregoing description and the accompanying drawing figures provide details that enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

We claim:

1. A method of generating a facial signature for use in identifying a human user or subject, the method comprising:

(A.) capturing multiple two-dimensional images of a given user's or subject's face, the capturing comprising utilizing at least one camera having a view of the given user's or subject's face to capture multiple two-dimensional camera images of the given user's or subject's face;

(B.) executing an image rectification function to compensate for optical distortion and alignment of the at least one camera;

(C.) executing a feature correspondence function by detecting common features between corresponding two-dimensional camera images of the given user's or subject's face captured by the at least one camera and measuring a relative distance in image space between the common features, to generate (i) disparity values and (ii) a feature correspondence data representation representative of (1) the multiple captured camera images of the given user's or subject's face and (2) the corresponding disparity values, wherein executing the feature correspondence function comprises computing distances between features in corresponding two-dimensional camera images of the given user's or subject's face from multiple perspectives; and (D.) utilizing the feature correspondence data representation to generate a facial signature data representation of the given user's or subject's face, the facial signature data representation being usable to accurately identify the given user or subject in a secure, difficult to forge manner;

wherein the capturing comprises utilizing at least two cameras, each having a view of the given user's or subject's face; and wherein executing a feature correspondence function comprises detecting common features between corresponding images captured by the respective cameras;

wherein generating a facial signature data representation further comprises executing an enrollment phase, the enrollment phase comprising:

prompting the given user or subject to present to the cameras a plurality of selected head movements or positions, or a series of selected facial poses, and collecting image frames from a plurality of head positions or facial poses for use in generating the facial signature data representation representative of the given user or subject; and further comprising executing a matching phase, the matching phase comprising:

utilizing the cameras to capture, over an interval of time, a plurality of frames of 3D and 2D data representative of the given user's or subject's face;

correlating the captured data with the facial signature data representation generated during the enrollment phase, thereby to generate a probability of match score; and comparing the probability of match score with a selected threshold value, thereby to confirm or deny an identity match.

2. The method of claim 1 wherein:
(A) the capturing comprises utilizing a single camera having a view of the given user's or subject's face; and
(B) executing a feature correspondence function comprises detecting common features between images captured by the single camera over time and measuring a relative distance in image space between the common features, to generate disparity values.

3. The method of claim 1 further comprising:
during the enrollment phase, generating an enrolled facial signature data representation containing data corresponding to multiple image scans of a given user's or subject's face, the multiple image scans corresponding to a plurality of the given user's or subject's head positions or facial poses; and during the matching phase, requiring at least a minimum number of captured image frames corresponding to different facial or head positions matching the multiple scans within the enrolled signature.

4. The method of claim 1 further comprising: generating a histogram based facial signature data representation, whereby a facial signature comprises at least one histogram.

5. The method of claim 4 wherein the facial signature comprises at least one histogram derived from a summation of pixel-based disparity histograms within the feature correspondence function.

6. The method of claim 4 wherein the facial signature comprises at least one histogram derived from depth data from a sensor capable of sensing depth.

7. The method of claim 4 wherein the at least one histogram represents the normalized relative proportion of facial feature depths across a plane parallel to the given user's or subject's face.

8. The method of claim 4 wherein the X-axis of a given histogram represents a given disparity or depth range, and the Y-axis of the histogram represents the normalized count of image samples that fall within the given range.

9. The method of claim 4 further comprising rejecting samples falling outside the statistical majority of samples within the face region, so as to remove background samples.

10. The method of claim 4 wherein, during population of a given histogram, a 2D face detector determines a face region, and wherein only samples within the face region are accumulated into the histogram.

11. The method of claim 4 wherein, during an enrollment phase, a histogram is accumulated over multiple captured image frames over a period of time.

12. The method of claim 4 wherein, during an enrollment phase, multiple samples of facial depth relationships are accumulated into a histogram across a series of facial positions or poses.

13. The method of claim 4 wherein, during a matching phase, a candidate histogram is accumulated over multiple captured image frames over a period of time.

14. The method of claim 4 wherein the histogram based facial signature data representation is used in combination with 2D face matching to provide an additional authentication factor.

15. The method of claim 1 wherein the feature correspondence function further comprises:
constructing a multi-level disparity histogram indicating the relative probability of a given disparity value being correct for a given pixel.

16. The method of claim 15 wherein constructing a multi-level disparity histogram comprises:
executing a Fast Dense Disparity Estimate (FDDE) image pattern matching operation on successively lower-frequency downsampled versions of the input stereo images, the successively lower-frequency downsampled versions constituting a set of levels of FDDE histogram votes.

17. A system for generating a facial signature for use in identifying a human user or subject, the system comprising:
(A) a digital processing resource comprising at least one digital processor; and
(B) at least one camera operable to have a view of a given user's or subject's face;
the digital processing resource being configured to:
(1) capture multiple two-dimensional images of the given user's or subject's face, utilizing the at least one camera to capture multiple two-dimensional camera images of the given user's or subject's face;
(2) execute an image rectification function to compensate for optical distortion and alignment of the at least one camera;
(3) execute a feature correspondence function by detecting common features between corresponding two-dimensional camera images of the given user's or subject's face captured by the at least one camera and measuring a relative distance in image space between the common features, to generate (i) disparity values and (ii) a feature correspondence data representation representative of (a) the multiple captured camera images of the given user's or subject's face and (b) the corresponding disparity values, wherein executing the feature correspondence function comprises computing distances between features in corresponding two-dimensional camera images of the given user's or subject's face from multiple perspectives; and
(4) utilize the feature correspondence data representation to generate a facial signature data representation of the given user's or subject's face, the facial signature data representation being usable to accurately identify the given user or subject in a secure, difficult to forge manner;
wherein the capturing comprises utilizing at least two cameras, each having a view of the given user's or subject's face; and wherein executing a feature correspondence function comprises detecting common features between corresponding images captured by the respective cameras;
wherein generating a facial signature data representation further comprises executing an enrollment phase, the enrollment phase comprising:
prompting the given user or subject to present to the cameras a plurality of selected head movements or positions, or a series of selected facial poses, and collecting image frames from a plurality of head positions or facial poses for use in generating the facial signature data representation representative of the given user or subject; and
further comprising executing a matching phase, the matching phase comprising:
utilizing the cameras to capture, over an interval of time, a plurality of frames of 3D and 2D data representative of the given user's or subject's face;
correlating the captured data with the facial signature data representation generated during the enrollment phase, thereby to generate a probability of match score; and
comparing the probability of match score with a selected threshold value, thereby to confirm or deny an identity match.

18. A non-transitory digital processor-readable medium useable in a digital processing system, the digital processing system comprising a digital processing resource comprising at least one digital processor, the digital processing resource being operable to communicate with at least one camera operable to have a view of a given human user's or subject's face, the digital processor-readable medium comprising digital processor-executable program instructions, which, when executed in the digital processing resource, cause the digital processing resource to:
(1) capture multiple two-dimensional images of the given user's or subject's face, utilizing the at least one camera to capture multiple two-dimensional camera images of the given user's or subject's face;

(2) execute an image rectification function to compensate for optical distortion and alignment of the at least one camera;

(3) execute a feature correspondence function by detecting common features between corresponding two-dimensional camera images of the given user's or subject's face captured by the at least one camera and measuring a relative distance in image space between the common features, to generate (i) disparity values and (ii) a feature correspondence data representation representative of (a) the multiple captured camera images of the given user's or subject's face and (b) the corresponding disparity values, wherein executing the feature correspondence function comprises computing distances between features in corresponding two-dimensional camera images of the given user's or subject's face from multiple perspectives; and (4) utilize the feature correspondence data representation to generate a facial signature data representation of the given user's or subject's face, the facial signature data representation being usable to accurately identify the given user or subject in a secure, difficult to forge manner;

wherein the capturing comprises utilizing at least two cameras, each having a view of the given user's or subject's face; and wherein executing a feature correspondence function comprises detecting common features between corresponding images captured by the respective cameras;

wherein generating a facial signature data representation further comprises executing an enrollment phase, the enrollment phase comprising:

prompting the given user or subject to present to the cameras a plurality of selected head movements or positions, or a series of selected facial poses, and collecting image frames from a plurality of head positions or facial poses for use in generating the facial signature data representation representative of the given user or subject; and further comprising executing a matching phase, the matching phase comprising:

utilizing the cameras to capture, over an interval of time, a plurality of frames of 3D and 2D data representative of the given user's or subject's face;

correlating the captured data with the facial signature data representation generated during the enrollment phase, thereby to generate a probability of match score; and comparing the probability of match score with a selected threshold value, thereby to confirm or deny an identity match.

\* \* \* \* \*